US008274231B2

(12) United States Patent
Yang

(10) Patent No.: US 8,274,231 B2
(45) **Date of Patent: *Sep. 25, 2012**

(54) CURRENT REGULATOR DRIVE CIRCUIT SHUNTING CURRENT BY VOLTAGE-DIVIDING LOAD

(76) Inventor: Tai-Her Yang, Dzan-Hwa (TW)

( * ) Notice: Subject to any disclaimer, the term of this patent is extended or adjusted under 35 U.S.C. 154(b) by 140 days.

This patent is subject to a terminal disclaimer.

(21) Appl. No.: 12/839,516

(22) Filed: Jul. 20, 2010

(65) Prior Publication Data

US 2011/0199007 A1 Aug. 18, 2011

Related U.S. Application Data

(63) Continuation-in-part of application No. 12/656,749, filed on Feb. 16, 2010.

(51) Int. Cl.
*H05B 37/02* (2006.01)
*H02J 4/00* (2006.01)

(52) U.S. Cl. .................... 315/185 R; 315/307; 315/291; 307/31

(58) Field of Classification Search .............. 315/185 R, 315/307, 291; 307/31, 32, 38, 39, 41; 323/223, 323/267, 222, 271, 328; 362/249.05, 800
See application file for complete search history.

(56) References Cited

U.S. PATENT DOCUMENTS 7,564,229 B2 * 7/2009 Odell .......................... 323/267
7,643,322 B1 * 1/2010 Varga et al. .................... 363/97
7,880,451 B2 * 2/2011 Odell .......................... 323/267
8,110,835 B2 * 2/2012 Kumar et al. .................. 257/79

* cited by examiner

*Primary Examiner* — Vibol Tan
(74) *Attorney, Agent, or Firm* — Bacon & Thomas, PLLC

(57) ABSTRACT

The present invention is through the power control unit, which is connected with the voltage-dividing load in parallel, to perform shunt regulation for the current passing through the voltage-dividing load, the shunt regulation means of the power control unit is that the power control unit increases or decreases the current passing through the voltage-dividing load.

44 Claims, 11 Drawing Sheets

CURRENT REGULATOR DRIVE CIRCUIT SHUNTING CURRENT BY VOLTAGE-DIVIDING LOAD

CROSS-REFERENCE TO RELATED APPLICATION

This application is a Continuation-In-Part of my patent application, Ser. No. 12/656,749, filed on Feb. 16, 2010.

BACKGROUND OF THE INVENTION (a) Field of the Invention

The present invention relates to a current regulator drive circuit shunting current by voltage-dividing load, wherein a main load and a voltage-dividing load connect in series; a power control unit, serving to perform regular shunt or manual control, control through inputting external signals, or feedback control through detected signals detected by a voltage detector and/or a current detector to the voltage-dividing load, connects in parallel with a voltage-dividing load for performing a shunt regulation; and when the voltage controller and/or the current detector are selected to be installed, the installation is processed at input ends of an AC or DC power source, or at two ends of one of the main load and the voltage-dividing load or the total load of the two loads connected in series, and/or a load current detector is installed at output end of the power source or at load end, depending on signals detected by the voltage detector and/or the current detector, if the voltage detected by the voltage detector and/or the current detected by the current detector is lower than a predetermined value, the power control unit is operated to increase the current passing through the main load; and if the voltage detected by the voltage detector and/or the current detected by the current detector is higher than a predetermined value, the power control unit is operated to decrease the current passing through the main load.

(b) Description of the Prior Art

The conventional control method for limiting the current of the load driven by AC or DC power is often to turn on or cut off the switch connected with the load in series for current limiting regulation; when the ON-OFF control over the switch is implemented, the current change is significant, thus the shortcomings include that the lamps will show changes in light and shade if the load is lighting instrument, and a larger electromagnetic interference is formed if the load current is directly controlled though full-voltage PWM.

SUMMARY OF THE INVENTION

The present invention provides a current regulator drive circuit shunting current by voltage-dividing load. A power control unit connects in parallel with a voltage-dividing load for performing shunt regulation to the current passing through the voltage-dividing load. The shunt regulation means of the power control unit is that the power control unit increases or decreases the current passing through the voltage-dividing load. Because only impedances at two ends of the voltage-dividing load connected in parallel with the power control unit are altered, the load current pulsation is smaller, so if the load is, e.g. a lighting instrument, changes of light and shade is smaller and the formed electromagnetic interference is also smaller.

DESCRIPTION OF MAIN COMPONENT SYMBOLS

Figure 1:
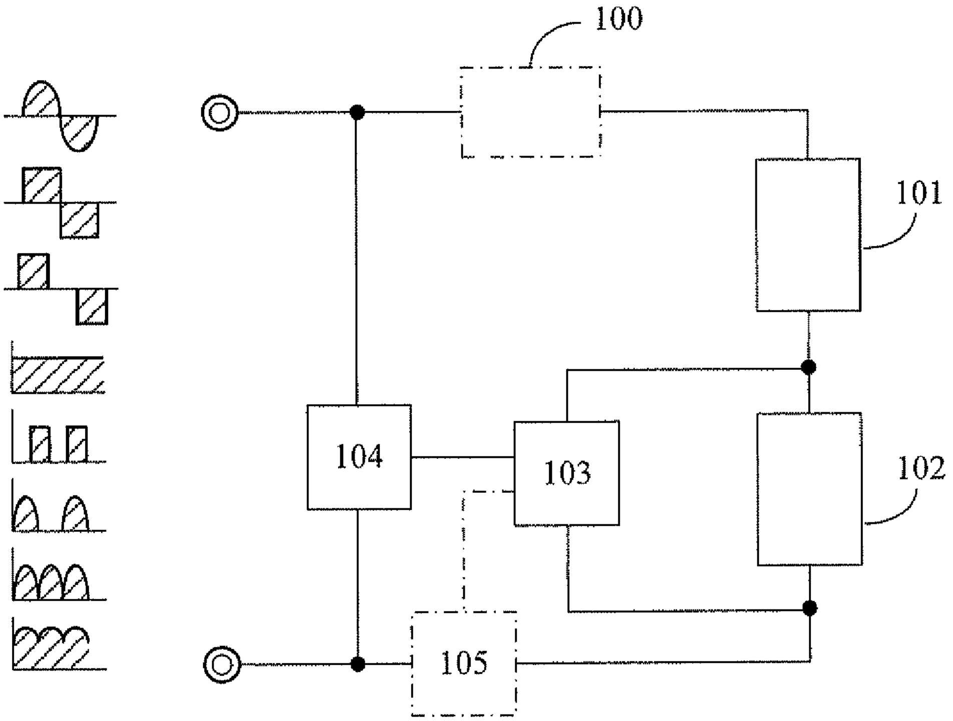
FIG. 1 is a schematic view showing the circuit blocks of the constitutive principle for the present invention.

100、200、300、400、500、600、700、800、900、1000、1100、1200、1300、1400、1500、1600、1700、1800、1900、2000、2100、2200: Current equalizing impedance

101、1001、1101、1201、1301、1401、1501、1601、1701、1801、1901、2001、2101、2201: Main load

102: Voltage-dividing load

103、603、903、1003: Power control unit

104、404、604、904、1004、1104、1204、1304、1404、1504、1604、1704、1804、1904、2004、2104、2204: Voltage detector

105、405、605、905、1005、1105、1205、1305、1405、1505、1605、1705、1805、1905、2005、2105、2205: Current detector

201、701: DC main load

202: DC voltage-dividing load

203、403、703、1103、1203、1303、1403、1503、1603、1703、1803、1903、2003、2103、2203: DC power control device

204、704: DC voltage detector

205、705: DC current detector

301、801: AC main load

302: AC voltage-dividing load

303、503、803: AC power control device

304、504、804: AC voltage detector

305、505、805: AC current detector
401: Main light-emitting diode (LED)
402: Voltage-dividing light-emitting diode (LED)
501: AC main light-emitting diode (LED)
502: AC voltage-dividing light-emitting diode (LED)
601: Electrothermal main load
602: Electrothermal voltage-dividing load
702: Voltage-dividing Zener diode
802: Voltage-dividing two-way Zener diode
901: AC-DC main load
902: Rectifier diode
1002: Voltage-dividing impedance
1102: Inductive voltage-dividing impedance component
1106、1206、1306、1406、1506、1606、1706、1806、1906、2006、2106、2206: Flywheel diode
1202: Voltage-dividing impedance component of inductive series resistance
12021、13021、14021、16021、17021、18021、20021、21021、22021: Inductive impedance component
12022、14022、16022、18022、20022、22022: Resistance
1302: Voltage-dividing impedance component of inductive series LED
13023、104023、17023、18023、21023、22023: LED
1402: Voltage-dividing impedance component of inductive series resistance and series LED
1502: Inductive voltage-dividing impedance component
1507、1607、1707、1807、1907、2007、2107、2207: Shield diode
1602: Voltage-dividing impedance component of inductive series resistance
1702: Voltage-dividing impedance component of inductive series LED
1802: Voltage-dividing impedance component of inductive series resistance and series LED
1902: Inductive voltage-dividing impedance component
2002: Inductive voltage-dividing impedance component
2102: Voltage-dividing impedance component of inductive series LED
2202: Voltage-dividing impedance component of inductive series resistance and series LED

DETAILED DESCRIPTION OF THE PREFERRED EMBODIMENTS

The conventional control method for limiting the current of the load driven by AC or DC power is often to turn on or cut off the switch connected with the load in series for current limiting regulation; when the ON-OFF control over the switch is implemented, the current change is significant, thus the shortcomings include that the lamps will show changes in light and shade if the load is lighting instrument, and a larger electromagnetic interference is formed if the load current is directly controlled though full-voltage PWM.

The present invention relates to a current regulator drive circuit shunting current by voltage-dividing load, wherein a main load and a voltage-dividing load connect in series; a power control unit, serving to perform regular shunt or manual control, control through inputting external signals, or feedback control through detected signals detected by a voltage detector and/or a current detector to the voltage-dividing load, connects in parallel with a voltage-dividing load for performing a shunt regulation; and when the voltage controller and/or the current detector are selected to be installed, the installation is processed at input ends of an AC or DC power source, or at two ends of one of the main load and the voltage-dividing load or the total load of the two loads connected in series, and/or a load current detector is installed at output end of the power source or at load end, depending on signals detected by the voltage detector and/or the current detector, if the voltage detected by the voltage detector and/or the current detected by the current detector is lower than a predetermined value, the power control unit is operated to increase the current passing through the main load; and if the voltage detected by the voltage detector and/or the current detected by the current detector is higher than a predetermined value, the power control unit is operated to decrease the current passing through the main load.

The present invention provides a current regulator drive circuit shunting current by voltage-dividing load. A power control unit connects in parallel with a voltage-dividing load for performing shunt regulation to the current passing through the voltage-dividing load. The shunt regulation means of the power control unit is that the power control unit increases or decreases the current passing through the voltage-dividing load. Because only impedances at two ends of the voltage-dividing load connected in parallel with the power control unit are altered, the load current pulsation is smaller, so if the load is, e.g. a lighting instrument, changes of light and shade is smaller and the formed electromagnetic interference is also smaller.

The current regulator drive circuit shunting current by voltage-dividing load is applied to the load driven by AC power source or DC power source.

As shown in FIG. 1, which is a schematic view showing the circuit blocks of the constitutive principle for the present invention, the main components including:

- current equalizing impedance (100): related to a current equalizing impedance (100) connected with the main load (101) in series, which is constituted by the inductor or coil with inductive impedance, or constituted by the impedance connecting the capacitor and the inductor or coil in parallel for being in parallel resonance with the ripple frequency of the passing current, arranged to reduce the ripple value of the current passing through the current equalizing impedance (100); the current equalizing impedance (100) is optionally installed upon demanded;
- main load (101): related to a main load driven by AC, DC, or pulsating DC power, which is constituted by one or more than one kind of main loads, including electric energy to luminous energy main load, electric energy to thermal energy main load, electrical energy to mechanical energy main load, electrical energy to chemical energy main load, or electrical energy to acoustic energy main load;
- voltage-dividing load (102): related to a voltage-dividing load, which is same or different with the main load (101), driven by AC, DC, or pulsating DC power, constituted by one or more than one kind of voltage-dividing loads including electric energy to luminous energy voltage-dividing load, electric energy to thermal energy voltage-dividing load, electrical energy to mechanical energy voltage-dividing load, electrical energy to chemical energy voltage-dividing load, or electrical energy to acoustic energy voltage-dividing load, connected with the main load (101) in series, and connected with the power control unit (103) in parallel, for being driven by electric energy, and for the current passing through the voltage-dividing load (102) to be shunted regulation by the power control unit (103);
- power control unit (103): constituted by electromechanical switch device, solid-state semiconductor-type switch device, or solid-state semiconductor-type linear variable impedance device; when DC power source is utilized to perform chopping control, the power control unit (103)

is operated to perform shunt regulation of alternate chopping frequency, or shunt regulation of PWM (Pulse Width Modulation) of chopping conduction time ratio, or shunt regulation of PWM of alternate chopping frequency and chopping conduction time ratio at the same time; when a two-way periodical alternate polarity power source is used, the power control unit (103) is operated to perform shunt regulation of conductive phase angle; when an DC power source or two-way periodical alternate polarity power source is used, the power control unit (103) is operated to perform shunt regulation of switch type turn-on or cut-off, or the linear impedance value of the power control unit (103) is regulated so as to operate the power control unit (103) to perform shunt regulation to the current passing through the voltage-dividing load (102);

In the current regulator drive circuit shunting current by voltage-dividing load, control means of the power control unit (103) includes one or more than one of the following control means including: 1) being controlled through installation of the voltage detector (104); 2) being controlled through installation of the current detector (105); 3) being controlled through installation of the voltage detector (104) and the current detector (105); 4) being controlled through setting circuit to perform regular shunt to the voltage-dividing load; 5) being controlled through a manually-operated control interface device to perform shunt regulation to the voltage-dividing load; 6) being controlled through inputting external signals to perform shunt regulation to the voltage-dividing load;

when one or both of the voltage detector (104) and the current detector (105) are selected to be installed for performing shunt regulation to the power control unit (103), the configurations and operational functions of the voltage detector (104) and the current detector (105) are as followings:

voltage detector (104): related to a voltage detector constituted by electromechanical and/or solid-state electronic components, for detecting the supply voltage, or the value of the voltage at two ends of one or both of the main load (101) and the power control unit (103), or of the total load of the both connected in series, to regulate the power control unit (103) over the following functions, including:

if the voltage detected by the voltage detector (104) is lower than a predetermined value, the power control unit (103) is operated to perform shunt regulation for increasing the current passing through the main load (101); or if the voltage detected by the voltage detector (104) is higher than a predetermined value, the power control unit (103) is operated to perform shunt regulation for decreasing the current passing through the main load (101); and current detector (105): related to a current detector constituted by electromechanical and/or solid-state electronic components, for detecting the value of one or more than one current passing through the main load (101), the voltage-dividing load (102) and the power control unit (103), to regulate the power control unit (103) over the following functions, including:

if the current detected by the current detector (105) is lower than a predetermined value, the power control unit (103) is operated to perform shunt regulation for increasing the current passing through the main load (101); or if the current detected by the current detector (105) is higher than a predetermined value, the power control unit (103) is operated to perform shunt regulation for decreasing the current passing through the main load (101).

Figure 2:
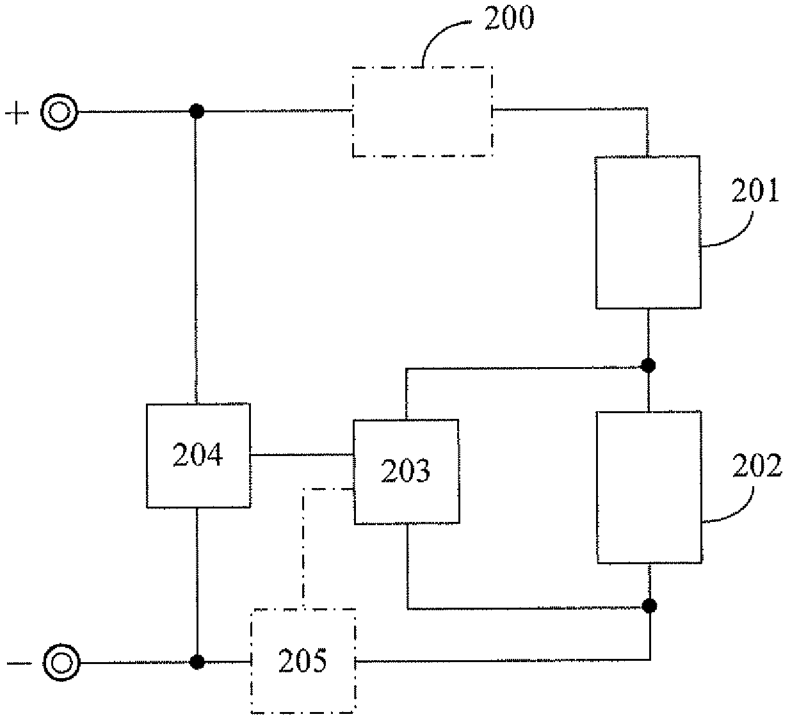
FIG. 2 is a schematic view showing the circuit blocks of the present invention applied to DC power source.

As shown in FIG. 2, which is a schematic view showing the circuit blocks of the present invention applied to DC power source, the main components including:

current equalizing impedance (200): related to a current equalizing impedance (200) connected with the DC main load (201) in series, which is constituted by the inductor or coil with inductive impedance, or constituted by the impedance connecting the capacitor and the inductor or coil in parallel for being in parallel resonance with the ripple frequency of the passing current, arranged to reduce the ripple value of the current passing through the current equalizing impedance (200); the current equalizing impedance (200) is optionally installed upon demanded;

DC main load (201): related to a main load driven by DC or pulsating DC power, which is constituted by one or more than one kind of main loads, including DC electric energy to luminous energy main load, DC electric energy to thermal energy main load, DC electrical energy to mechanical energy main load, DC electrical energy to chemical energy main load, or DC electrical energy to acoustic energy main load;

DC voltage-dividing load (202): related to a voltage-dividing load, which is same or different with the DC main load (201), driven by DC or pulsating DC power, constituted by one or more than one kind of voltage-dividing loads including DC electric energy to luminous energy voltage-dividing load, DC electric energy to thermal energy voltage-dividing load, DC electrical energy to mechanical energy voltage-dividing load, DC electrical energy to chemical energy voltage-dividing load, or DC electrical energy to acoustic energy voltage-dividing load, connected with the DC main load (201) in series, and connected with the DC power control device (203) in parallel, for being driven by electric energy, and for the current passing through the DC voltage-dividing load (202) to be shunted regulation by the DC power control device (203);

DC power control device (203): constituted by electromechanical switch device, solid-state semiconductor-type switch device, or solid-state semiconductor-type linear variable impedance device, when DC power source is utilized to perform chopping control, the DC power control device (203) is operated to perform shunt regulation of alternate chopping frequency, or shunt regulation of PWM (Pulse Width Modulation) of chopping conduction time ratio, or shunt regulation of PWM of alternate chopping frequency and chopping conduction time ratio at the same time; or the DC power control device (203) is operated to perform shunt regulation of switch type turn-on or cut-off, or the linear impedance value of the DC power control device (203) is regulated so as to operate the DC power control device (203) to perform shunt regulation for the current passing through the DC voltage-dividing load (202);

In the current regulator drive circuit shunting current by voltage-dividing load, control means of the DC power control device (203) includes one or more than one of the following control means including: 1) being controlled through installation of the DC voltage detector (204); 2) being controlled through installation of the DC current detector (205); 3) being controlled through installation of the DC voltage detector (204) and the DC current detector (205); 4) being controlled through setting circuit to perform regular shunt to the voltage-dividing load; 5) being controlled through a manually-operated control interface device to perform shunt regulation to the voltage-dividing load; 6) being controlled through inputting external signals to perform shunt regulation to the voltage-dividing load;

when one or both of the DC voltage detector (204) and the DC current detector (205) are selected to be installed for performing shunt regulation to the DC power control device (203), the configurations and operational functions of the DC voltage detector (204) and the DC current detector (205) are as followings:

DC voltage detector (204): related to a DC voltage detector constituted by electromechanical and/or solid-state electronic components, for detecting the DC supply voltage, or the value of the voltage at two ends of one or both of the DC main load (201) and the DC power control device (203), or of the total load of the both connected in series, to regulate the DC power control device (203) over the following functions, including:

if the voltage detected by the DC voltage detector (204) is lower than a predetermined value, the DC power control device (203) is operated to perform shunt regulation for increasing the current passing through the DC main load (201); or if the voltage detected by the DC voltage detector (204) is higher than a predetermined value, the DC power control device (203) is operated to perform shunt regulation for decreasing the current passing through the DC main load (201); and DC current detector (205): related to a DC current detector constituted by electromechanical and/or solid-state electronic components, for detecting the value of one or more than one current passing through the DC main load (201), the DC voltage-dividing load (202) and the DC power control device (203), to regulation the DC power control device (203) over the following functions, including:

if the current detected by the DC current detector (205) is lower than a predetermined value, the DC power control device (203) is operated to perform shunt regulation for increasing the current passing through the DC main load (201); or if the current detected by the DC current detector (205) is higher than a predetermined value, the DC power control device (203) is operated to perform shunt regulation for decreasing the current passing through the DC main load (201).

Figure 3:
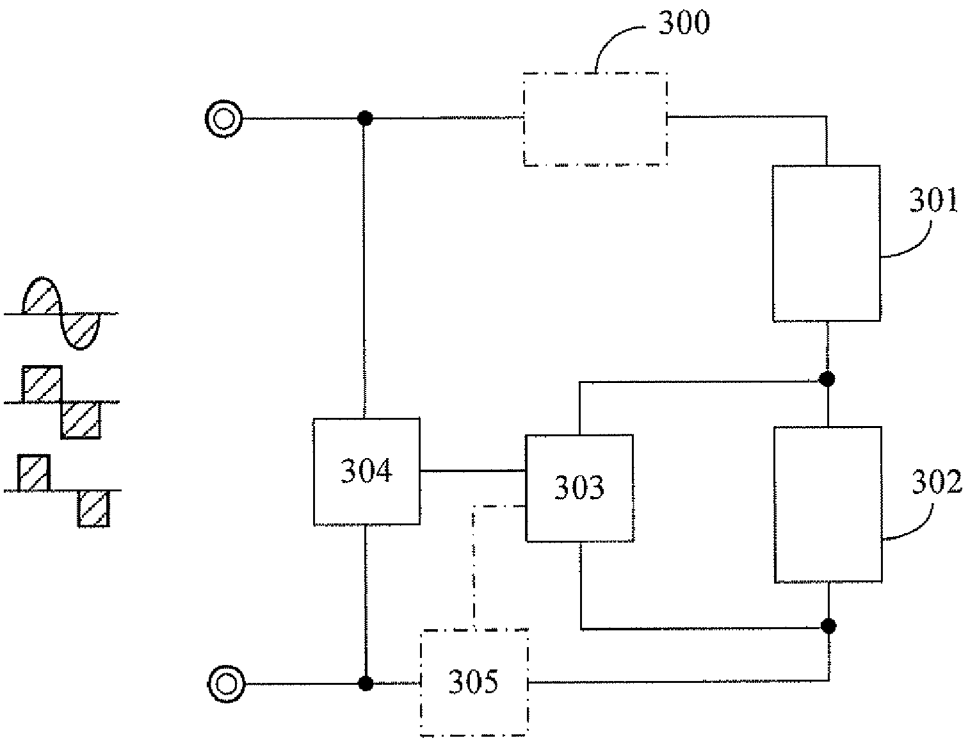
FIG. 3 is a schematic view showing the circuit blocks of the present invention applied to AC power source.

As shown in FIG. 3, which is a schematic view showing the circuit blocks of the present invention applied to AC power source, the main components including:

current equalizing impedance (300): related to a current equalizing impedance (300) connected with the AC main load (301) in series, which is constituted by the inductor or coil with inductive impedance, or constituted by the impedance connecting the capacitor and the inductor or coil in parallel for being in parallel resonance with the ripple frequency of the passing current, arranged to reduce the ripple value of the current passing through the current equalizing impedance (300); the current equalizing impedance (300) is optionally installed upon demanded;

AC main load (301): related to a main load driven by AC power, including one or more than one kind of main loads including AC electric energy to luminous energy main load, AC electric energy to thermal energy main load, AC electrical energy to mechanical energy main load, AC electrical energy to chemical energy main load, or AC electrical energy to acoustic energy main load;

AC voltage-dividing load (302): related to a voltage-dividing load, which is same or different with the AC main load (301), driven by AC power, constituted by one or more than one kind of voltage-dividing loads including AC electric energy to luminous energy voltage-dividing load, AC electric energy to thermal energy voltage-dividing load, AC electrical energy to mechanical energy voltage-dividing load, AC electrical energy to chemical energy voltage-dividing load, or AC electrical energy to acoustic energy voltage-dividing load, connected with the AC main load (301) in series, and connected with the AC power control device (303) in parallel, for being driven by electric energy, and for the current passing through the AC voltage-dividing load (302) to be shunted regulation by the AC power control device (303);

AC power control device (303): constituted by electromechanical switch device, solid-state semiconductor-type switch device, or solid-state semiconductor-type linear variable impedance device, for being controlled by the AC power control device (303) to perform shunt regulation of conductive phase angle, or shunt regulation of switch type turn-on or cut-off, or the linear impedance value of the AC power control device (303) is regulated to perform shunt regulation for the current passing through the AC voltage-dividing load (302);

In the current regulator drive circuit shunting current by voltage-dividing load, control means of the AC power control device (303) includes one or more than one of the following control means including: 1) being controlled through installation of the AC voltage detector (304); 2) being controlled through installation of the AC current detector (305); 3) being controlled through installation of the AC voltage detector (304) and the AC current detector (305); 4) being controlled through setting circuit to perform regular shunt to the voltage-dividing load; 5) being controlled through a manually-operated control interface device to perform shunt regulation to the voltage-dividing load; 6) being controlled through inputting external signals to perform shunt regulation to the voltage-dividing load;

when one or both of the AC voltage detector (304) and the AC current detector (305) are selected to be installed for performing shunt regulation to the AC power control unit (303), the configurations and operational functions of the AC voltage detector (304) and the AC current detector (305) are as followings:

AC voltage detector (304): related to a AC voltage detector constituted by electromechanical and/or solid-state electronic components, for detecting the AC supply voltage, or the value of the voltage at two ends of one or both of the AC main load (301) and the AC power control device (303), or of the total load of the both connected in series, to regulate the AC power control device (303) over the following functions, including:

if the voltage detected by the AC voltage detector (304) is lower than a predetermined value, the AC power control unit (303) is operated to perform shunt regulation for increasing the current passing through the AC main load (301); or if the voltage detected by the AC voltage detector (304) is higher than a predetermined value, the AC power control unit (303) is operated to perform shunt regulation for decreasing the current passing through the AC main load (301); and AC current detector (305): related to a current detector constituted by electromechanical and/or solid-state electronic components, for detecting the value of one or more than one current passing through the AC main load (301), the AC voltage-dividing load (302) and the AC power control unit (303), to regulate the AC power control unit (303) over the following functions, including:

if the current detected by the AC current detector (305) is lower than a predetermined value, the AC power control unit (303) is operated to perform shunt regulation for increasing the current passing through the AC main load (301); or if the current detected by the AC current detector (305) is higher than a predetermined value, the AC power control unit (303) is operated to perform shunt regulation for decreasing the current passing through the AC main load (301).

The current regulator drive circuit shunting current by voltage-dividing load of the present invention is widely applied to the load driven by various types of electric energy, the common application cases provided as following.

Figure 4:
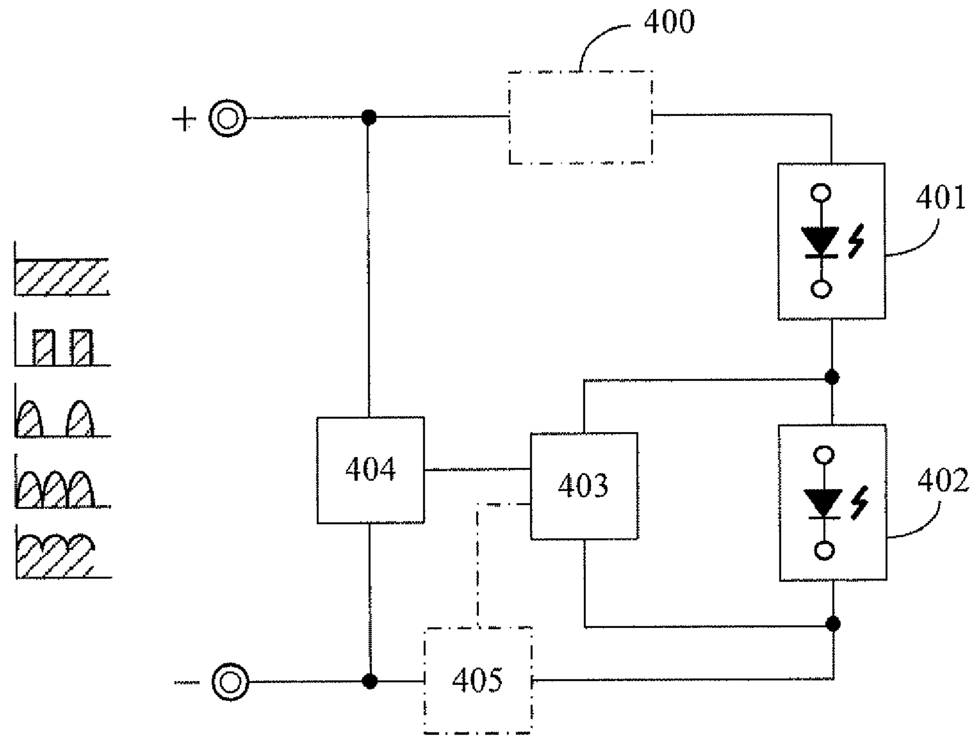
FIG. 4 is a schematic view showing the circuit blocks of the 1$^{st}$ embodiment of the present invention.

As shown in FIG. 4, which is a schematic view of the 1st embodiment of the present invention for applying to the light-emitting diode (LED) driven by DC power source, the main components including:

current equalizing impedance (400): related to a current equalizing impedance (400) connected with the main light-emitting diode (LED) (401) in series, which is constituted by the inductor or coil with inductive impedance, or constituted by the impedance connecting the capacitor and the inductor or coil in parallel for being in parallel resonance with the ripple frequency of the passing current, arranged to reduce the ripple value of the current passing through the current equalizing impedance (400); the current equalizing impedance (400) is optionally installed upon demanded;

main light-emitting diode (LED) (401): constituted by one or more LEDs connected in series, connected in parallel, or connected in series-parallel, for being driven by DC power or pulsating DC power;

voltage-dividing light-emitting diode (LED) (402): constituted by one or more LEDs connected in series, connected in parallel, or connected in series-parallel, to be connected with the main light-emitting diode (LED) (401) in series, and to be connected with DC power control device (403) in parallel, for being driven by DC power or pulsating DC power, and for the current passing through the voltage-dividing light-emitting diode (LED) (402) to be shunted regulation by the DC power control device (403);

DC power control device (403): constituted by electromechanical switch device, solid-state semiconductor-type switch device, or solid-state semiconductor-type linear variable impedance device, to be connected with two ends of the voltage-dividing light-emitting diode (LED) (402) in parallel; when DC power source is utilized to perform chopping control, the DC power control device 403 is operated to perform shunt regulation of alternate chopping frequency, or shunt regulation of PWM (Pulse Width Modulation) of chopping conduction time ratio, or shunt regulation of PWM of alternate chopping frequency and chopping conduction time ratio at the same time; or the DC power control device 403 is operated to perform shunt regulation of switch type turn-on or cut-off, or the linear impedance value of the DC power control device 403 is regulated so as to operate the DC power control device 403 to perform shunt regulation for the current passing through the voltage-dividing light-emitting diode (LED) (402);

In the current regulator drive circuit shunting current by voltage-dividing load, control means of the DC power control device (403) includes one or more than one of the following control means including: 1) being controlled through installation of the voltage detector (404); 2) being controlled through installation of the current detector (405); 3) being controlled through installation of the voltage detector (404) and the current detector (405); 4) being controlled through setting circuit to perform regular shunt to the voltage-dividing load; 5) being controlled through a manually-operated control interface device to perform shunt regulation to the voltage-dividing load; 6) being controlled through inputting external signals to perform shunt regulation to the voltage-dividing load;

when one or both of the voltage detector (404) and the current detector (405) are selected to be installed for performing shunt regulation to the DC power control device (403), the configurations and operational functions of the voltage detector (404) and the current detector (405) are as followings:

Voltage detector (404): related to a DC voltage detector constituted by electromechanical and/or solid-state electronic components, for detecting the DC supply voltage, or the value of the voltage at two ends of one or both of the main light-emitting diode (LED) (401) and the DC power control device (403), or of the total load of the both connected in series, to regulate the DC power control device (403) over the following functions, including:

if the voltage detected by the voltage detector (404) is lower than a predetermined value, the DC power control device (403) is operated to perform shunt regulation for increasing the current passing through the main light-emitting diode (LED) (401); or if the voltage detected by the voltage detector (404) is higher than a predetermined value, the DC power control device (403) is operated to perform shunt regulation for decreasing the current passing through main light-emitting diode (LED) (401); and current detector (405): related to a current detector constituted by electromechanical and/or solid-state electronic components, for detecting the value of one or more than one current passing through the main light-emitting diode (LED) (401), the voltage-dividing light-emitting diode (LED) (402) and the DC power control device (403), to regulation the DC power control device (403) over the following functions, including:

if the current detected by the current detector (405) is lower than a predetermined value, the DC power control device (403) is operated to perform shunt regulation for increasing the current passing through the main light-emitting diode (LED) (401); or if the current detected by the current detector (405) is higher than a predetermined value, the DC power control device (203) is operated to perform shunt regulation for decreasing the current passing through the main light-emitting diode (LED) (401).

Figure 5:
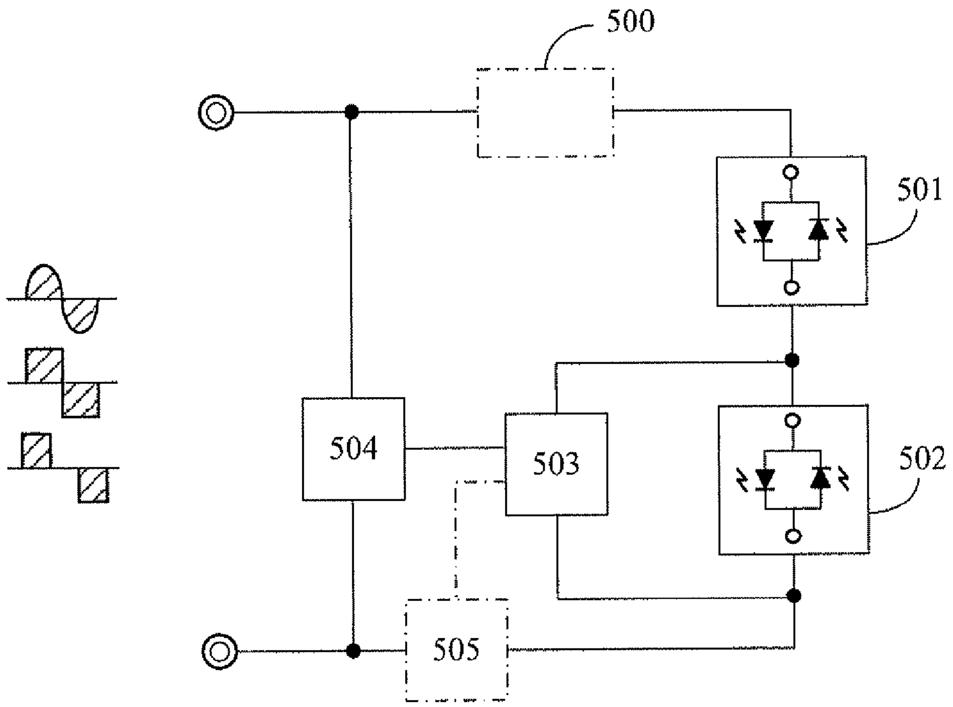
FIG. 5 is a schematic view showing the circuit blocks of the 2$^{nd}$ embodiment of the present invention.

As shown in FIG. 5, which is a schematic view of the 2nd embodiment of the present invention for applying to the AC LED driven by AC power source, the main components including:

current equalizing impedance (500): related to a current equalizing impedance (500) connected with the AC main light-emitting diode (LED) (501) in series, which is constituted by the inductor or coil with inductive impedance, or constituted by the impedance connecting the capacitor and the inductor or coil in parallel for being in parallel resonance with the ripple frequency of the passing current, arranged to reduce the ripple value of the current passing through the current equalizing impedance (500); the current equalizing impedance (500) is optionally installed upon demanded;

AC main light-emitting diode (LED) (501): constituted by one or more AC LEDs connected in series, connected in parallel, or connected in series-parallel, in which AC LED is constituted by two or more LEDs parallel connected in reverse polarity, for being driven by AC power;

AC voltage-dividing light-emitting diode (LED) (502): constituted by one or more AC LEDs connected in series, connected in parallel, or connected in series-parallel, in which AC LED is constituted by two or more LEDs parallel connected in reverse polarity, to be connected with the AC main light-emitting diode (LED) (501) in series, and to be connected with AC power control device (503) in parallel, for being driven by AC power, and for the current passing through the AC voltage-dividing light-emitting diode (LED) (502) to be shunted regulation by the AC power control device (503);

AC power control device (503): constituted by electromechanical switch device, solid-state semiconductor-type switch device, or solid-state semiconductor-type linear variable impedance device, to be connected with two ends of the AC voltage-dividing light-emitting diode (LED) (502) in parallel, for being controlled by the AC power control device (503), to perform shunt regulation of conductive phase angle, or shunt regulation of switch type turn-on or cut-off, or the linear impedance value of the AC power control device (503) is regulated to perform shunt regulation for the current passing through the AC voltage-dividing light-emitting diode (LED) (502);

In the current regulator drive circuit shunting current by voltage-dividing load, control means of the AC power control unit (503) includes one or more than one of the following control means including: 1) being controlled through installation of the AC voltage detector (504); 2) being controlled through installation of the AC current detector (505); 3) being controlled through installation of the AC voltage detector (504) and the AC current detector (505); 4) being controlled through setting circuit to perform regular shunt to the voltage-dividing load; 5) being controlled through a manually-operated control interface device to perform shunt regulation to the voltage-dividing load; 6) being controlled through inputting external signals to perform shunt regulation to the voltage-dividing load;

when one or both of the AC voltage detector (504) and the AC current detector 505 are selected to be installed for performing shunt regulation to the AC power control unit 503, the configurations and operational functions of the AC voltage detector (504) and the AC current detector 505 are as followings:

AC voltage detector (504): related to a AC voltage detector constituted by electromechanical and/or solid-state electronic components, for detecting the AC supply voltage, or the value of the voltage at two ends of one of the AC main light-emitting diode (LED) (501) and the AC power control device (503), or of the total load of the both connected in series, to regulate the AC power control device (503) over the following functions, including:

if the voltage detected by the AC voltage detector (504) is lower than a predetermined value, the AC power control device (503) is operated to perform shunt regulation for increasing the current passing through the AC main light-emitting diode (LED) (501); or if the voltage detected by the AC voltage detector (504) is higher than a predetermined value, the AC power control device (503) is operated to perform shunt regulation for decreasing the current passing through the AC main light-emitting diode (LED) (501); and AC current detector (505): related to a current detector constituted by electromechanical and/or solid-state electronic components, for detecting the value of one or more than one current passing through the AC main light-emitting diode (LED) (502) and the AC power control device (503), to regulate the AC power control unit (503) over the following functions, including:

if the current detected by the AC current detector (505) is lower than a predetermined value, the AC power control device (503) is operated to perform shunt regulation for increasing the current passing through the AC main light-emitting diode (LED) (501); or if the current detected by the AC current detector (505) is higher than a predetermined value, the AC power control device (503) is operated to perform shunt regulation for decreasing the current passing through the AC main light-emitting diode (LED) (501).

Figure 6:
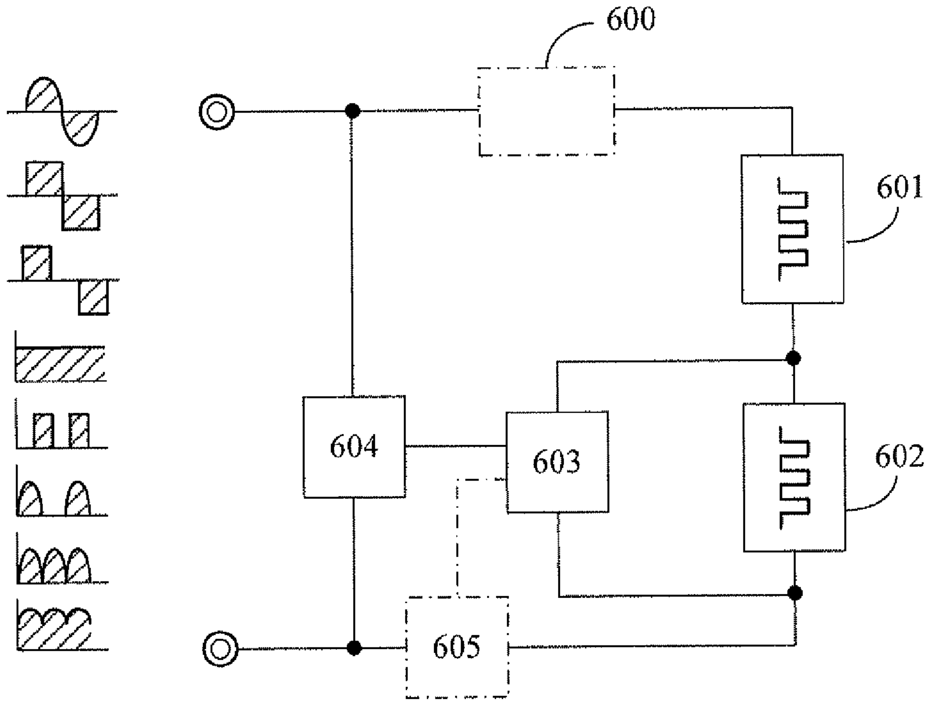
FIG. 6 is a schematic view showing the circuit blocks of the 3$^{rd}$ embodiment of the present invention.

As shown in FIG. 6, which is a schematic view of the 3$^{rd}$ embodiment of the present invention for applying to electrothermal device driven by AC or DC power source, the main components including:

current equalizing impedance (600): related to a current equalizing impedance (600) connected with the electrothermal main load (601) in series, which is constituted by the inductor or coil with inductive impedance, or constituted by the impedance connecting the capacitor and the inductor or coil in parallel for being in parallel resonance with the ripple frequency of the passing current, arranged to reduce the ripple value of the current passing through the current equalizing impedance (600); the current equalizing impedance (600) is optionally installed upon demanded;

electrothermal main load (601): related to a AC or DC power driven main load, which converts electric energy to thermal energy;

electrothermal voltage-dividing load (602): constituted by a AC or DC power driven electrothermal voltage-dividing load, which converts electric energy to thermal energy, to be connected with the electrothermal main load (601) in series, and connected with the power control unit (603) in parallel, for being driven by electric energy, and for the current passing through the electrothermal voltage-dividing load (602) to be shunted regulation by the power control unit (603);

power control unit (603): constituted by electromechanical switch device, solid-state semiconductor-type switch device, or solid-state semiconductor-type linear variable impedance device; when DC power source is utilized to perform chopping control, the power control unit 603 is operated to perform shunt regulation of alternate chopping frequency, or shunt regulation of PWM (Pulse Width Modulation) of chopping conduction time ratio, or shunt regulation of PWM of alternate chopping frequency and chopping conduction time ratio at the same time; when a two-way periodical alternate polarity power source is used, the power control unit (603) is operated to perform shunt regulation of conductive phase angle; when an DC power source or two-way periodical alternate polarity power source is used, the power control unit (603) is operated to perform shunt regulation of switch type turn-on or cut-off, or the linear impedance value of the power control unit (603) is regulated so as to operate the power control unit (603) to perform shunt regulation to the current passing through the electrothermal voltage-dividing load (602);

In the current regulator drive circuit shunting current by voltage-dividing load, control means of the power control unit (603) includes one or more than one of the following control means including: 1) being controlled through installation of the voltage detector (604); 2) being controlled through installation of the current detector (605); 3) being controlled through installation of the voltage detector (604) and the current detector (605); 4) being controlled through setting circuit to perform regular shunt to the voltage-dividing load; 5) being controlled through a manually-operated control interface device to perform shunt regulation to the voltage-dividing load; 6) being controlled through inputting external signals to perform shunt regulation to the voltage-dividing load;

when one or both of the voltage detector (604) and the current detector (605) are selected to be installed for performing shunt regulation to the power control unit (603), the configurations and operational functions of the voltage detector (604) and the current detector (605) are as followings:

voltage detector (604): related to a voltage detector constituted by electromechanical and/or solid-state electronic components, for detecting the supply voltage, or the value of the voltage at two ends of one or both of the electrothermal main load (601) and the power control unit (603), or of the total load of the both connected in series, to regulate the power control unit (603) over the following functions, including:

if the voltage detected by the voltage detector (604) is lower than a predetermined value, the power control unit (603) is operated to perform shunt regulation for increasing the current passing through the electrothermal main load (601); or if the voltage detected by the voltage detector (604) is higher than a predetermined value, the power control unit (603) is operated to perform shunt regulation for decreasing the current passing through the electrothermal main load (601); and current detector (605): related to a current detector constituted by electromechanical and/or solid-state electronic components, for detecting the value of one or more than one current passing through the electrothermal main load (601), the electrothermal voltage-dividing load (602) and the power control unit (603), to regulate the power control unit (603) over the following functions, including:

if the current detected by the current detector (605) is lower than a predetermined value, the power control unit (603) is operated to perform shunt regulation for increasing the current passing through the electrothermal main load (601); or if the current detected by the current detector (605) is higher than a predetermined value, the power control unit (603) is operated to perform shunt regulation for decreasing the current passing through the electrothermal main load (601).

Figure 7:
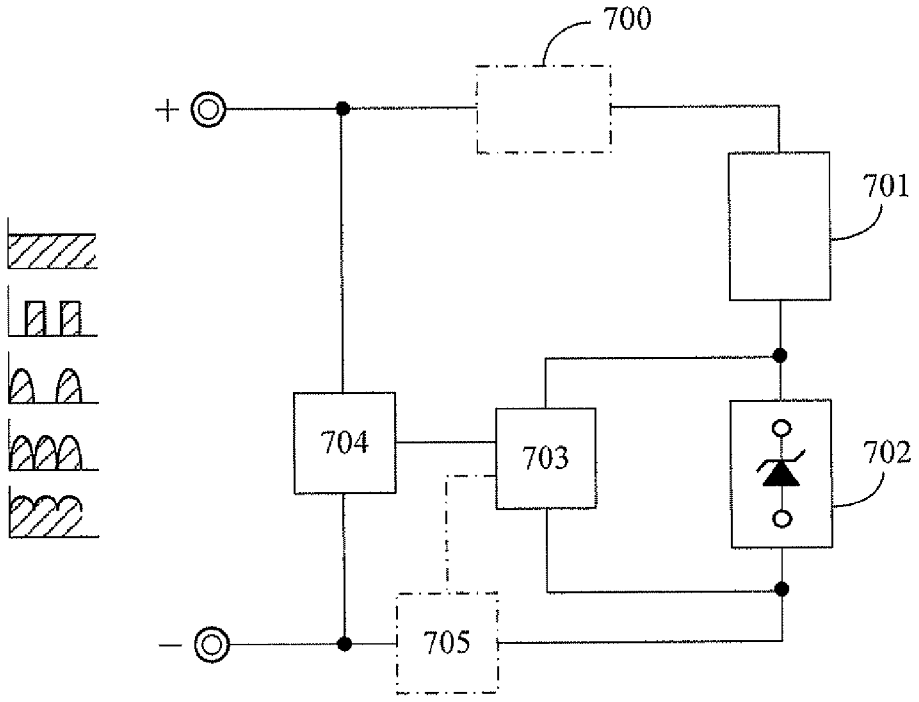
FIG. 7 is a schematic view showing the circuit blocks of the 4$^{th}$ embodiment of the present invention.

As shown in FIG. 7, which is a schematic view of the 4$^{th}$ embodiment of the present invention for applying to a DC power source driven DC main load, which has the Zener diode as the voltage-dividing component, the main components including:

current equalizing impedance (700): related to a current equalizing impedance (700) connected with the DC main load (701) in series, which is constituted by the inductor or coil with inductive impedance, or constituted by the impedance connecting the capacitor and the inductor or coil in parallel for being in parallel resonance with the ripple frequency of the passing current, arranged to reduce the ripple value of the current passing through the current equalizing impedance (700); the current equalizing impedance (700) is optionally installed upon demanded;

DC main load (701): related to a main load driven by DC or pulsating DC power, constituted by one or more than one kind of main loads including DC electric energy to luminous energy main load, DC electric energy to thermal energy main load, DC electric energy to mechanical energy main load, DC electric energy to chemical energy main load, and DC electric energy to acoustic energy main load;

voltage-dividing Zener diode (702): constituted by one or more Zener Diodes connected in series, connected in parallel, or connected in series-parallel, arranged to be connected with the DC main load (701) in series, and connected with DC power control device (703) in parallel, for being driven by DC or pulsating DC power, and for the current passing through the voltage-dividing Zener diode (702) to be shunted regulation by the DC power control device (703);

DC power control device (703): constituted by electromechanical switch device, solid-state semiconductor-type switch device, or solid-state semiconductor-type linear variable impedance device, to be connected with two ends of the voltage-dividing Zener diode (702) in parallel; when the DC power source is utilized to perform chopping control, the DC power control device (703) is operated to perform shunt regulation of alternate chopping frequency, or shunt regulation of PWM (Pulse Width Modulation) of chopping conduction time ratio, or shunt regulation of PWM of alternate chopping frequency and chopping conduction time ratio at the same time; or the DC power control device (703) is operated to perform shunt regulation of switch type turn-on or cut-off, or the linear impedance value of the DC power control device (703) is regulated so as to operate the DC power control device (703) to perform shunt regulation for the current passing through the voltage-dividing Zener diode (702);

In the current regulator drive circuit shunting current by voltage-dividing load, control means of the DC power control unit (703) includes one or more than one of the following control means including: 1) being controlled through installation of the DC voltage detector (704); 2) being controlled through installation of the DC current detector (705); 3) being controlled through installation of the DC voltage detector (704) and the DC current detector (705); 4) being controlled through setting circuit to perform regular shunt to the voltage-dividing load; 5) being controlled through a manually-operated control interface device to perform shunt regulation to the voltage-dividing load; 6) being controlled through inputting external signals to perform shunt regulation to the voltage-dividing load;

when one or both of the DC voltage detector (704) and the DC current detector (705) are selected to be installed for performing shunt regulation to the DC power control unit (703), the configurations and operational functions of the DC voltage detector (704) and the DC current detector (705) are as followings:

DC voltage detector (704): related to a voltage detector constituted by electromechanical and/or solid-state electronic components, for detecting the supply voltage, or the value of the voltage at two ends of one or both of the DC main load (701) and the DC power control unit (703), or of the total load of the both connected in series, to regulate the DC power control unit (703) over the following functions, including:

if the voltage detected by the DC voltage detector (704) is lower than a predetermined value, the DC power control unit (703) is operated to perform shunt regulation for increasing the current passing through the DC main load (701); or if the voltage detected by the DC voltage detector (704) is higher than a predetermined value, the DC power control unit (703) is operated to perform shunt regulation for decreasing the current passing through the DC main load (701); and DC current detector (705): related to a current detector constituted by electromechanical and/or solid-state electronic components, for detecting the value of one or more than one current passing through the DC main load (701), the voltage-dividing Zener diode (702) and the DC power control unit (703), to regulate the power control unit (103) over the following functions, including:

if the current detected by the DC current detector (705) is lower than a predetermined value, the power DC control unit (703) is operated to perform shunt regulation for increasing the current passing through the DC main load (701); or if the current detected by the DC current detector (705) is higher than a predetermined value, the DC power control unit (703) is operated to perform shunt regulation for decreasing the current passing through the DC main load (701).

Figure 8:
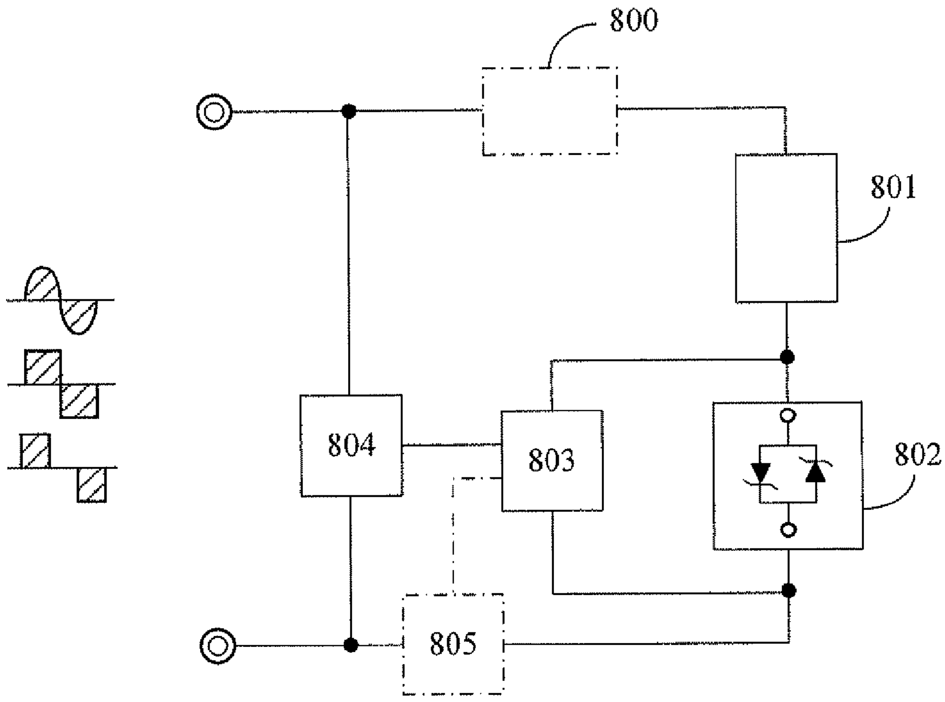
FIG. 8 is a schematic view showing the circuit blocks of the 5$^{th}$ embodiment of the present invention.

As shown in FIG. 8, which is a schematic view of the 5$^{th}$ embodiment of the present invention for applying to an AC power source driven AC main load, which has the two-way Zener diode as the voltage-dividing component, the main components including:

current equalizing impedance (800): related to a current equalizing impedance (800) connected with the AC main load (801) in series, which is constituted by the inductor or coil with inductive impedance, or constituted by the impedance connecting the capacitor and the inductor or coil in parallel for being in parallel resonance with the ripple frequency of the passing current, arranged to reduce the ripple value of the current passing through the current equalizing impedance (800); the current equalizing impedance (800) is optionally installed upon demanded;

AC main load (801): related to a main load driven by AC power, constituted by one or more than one kind of main loads including AC electric energy to luminous energy main load, AC electric energy to thermal energy main load, AC electric energy to mechanical energy main load, AC electric energy to chemical energy main load, and AC electric energy to acoustic energy main load;

voltage-dividing two-way Zener diode (802): constituted by two or more Zener Diodes connected, with different working polarity, in series or connected in parallel, and arranged to be connected with the AC main load (801) in series, and connected with AC power control device (803) in parallel, for being driven by AC power, and for the current passing through the voltage-dividing two-way Zener diode (802) to be shunted regulation by the AC power control device (803);

AC power control device (803): constituted by electromechanical switch device, solid-state semiconductor-type switch device, or solid-state semiconductor-type linear variable impedance device, to be connected with two ends of the voltage-dividing two-way Zener diode (802) in parallel, for being controlled by the AC power control device (803), to perform shunt regulation of conductive phase angle, or shunt regulation of switch type turn-on or cut-off, or the linear impedance value of the AC power control device (803) is regulated to perform shunt regulation for the current passing through the voltage-dividing two-way Zener diode (802);

In the current regulator drive circuit shunting current by voltage-dividing load, control means of the AC power control unit (803) includes one or more than one of the following control means including: 1) being controlled through installation of the AC voltage detector (804); 2) being controlled through installation of the AC current detector (805); 3) being controlled through installation of the AC voltage detector (804) and the AC current detector (805); 4) being controlled through setting circuit to perform regular shunt to the voltage-dividing load; 5) being controlled through a manually-operated control interface device to perform shunt regulation to the voltage-dividing load; 6) being controlled through inputting external signals to perform shunt regulation to the voltage-dividing load;

when one or both of the AC voltage detector (804) and the AC current detector (805) are selected to be installed for performing shunt regulation to the AC power control unit (803), the configurations and operational functions of the AC voltage detector (804) and the AC current detector (805) are as followings:

AC voltage detector (804): related to an AC voltage detector constituted by electromechanical and/or solid-state electronic components, for detecting the AC supply voltage, or the value of the voltage of one or both of the AC main load (801) and the AC power control device (803), or the value of the voltage at two ends of the total load of the above two connected in series, to regulate the AC power control device (803) over the following functions, including:

if the voltage detected by the AC voltage detector (804) is lower than a predetermined value, the AC power control device (803) is operated to perform shunt regulation for lowering the total impedance of the load so as to increase the current passing through the AC main load (801); or if the voltage detected by the AC voltage detector (804) is higher than a predetermined value, the AC power control unit (803) is operated to perform shunt regulation for decreasing the current passing through the AC main load (801); and AC current detector (805): related to a AC current detector constituted by electromechanical and/or solid-state electronic components, for detecting the value of one or more than one current passing through the AC main load (801), voltage-dividing two-way Zener diode (802) and the AC power control unit (803), to regulate the AC power control unit (803) over the following functions, including:

if the current detected by the AC current detector (805) is lower than a predetermined value, the AC power control unit (803) is operated to perform shunt regulation for increasing the current passing through the AC main load (801); or if the current detected by the AC current detector (805) is higher than a predetermined value, the AC power control unit (803) is operated to perform shunt regulation for decreasing the current passing through the AC main load (801).

Figure 9:
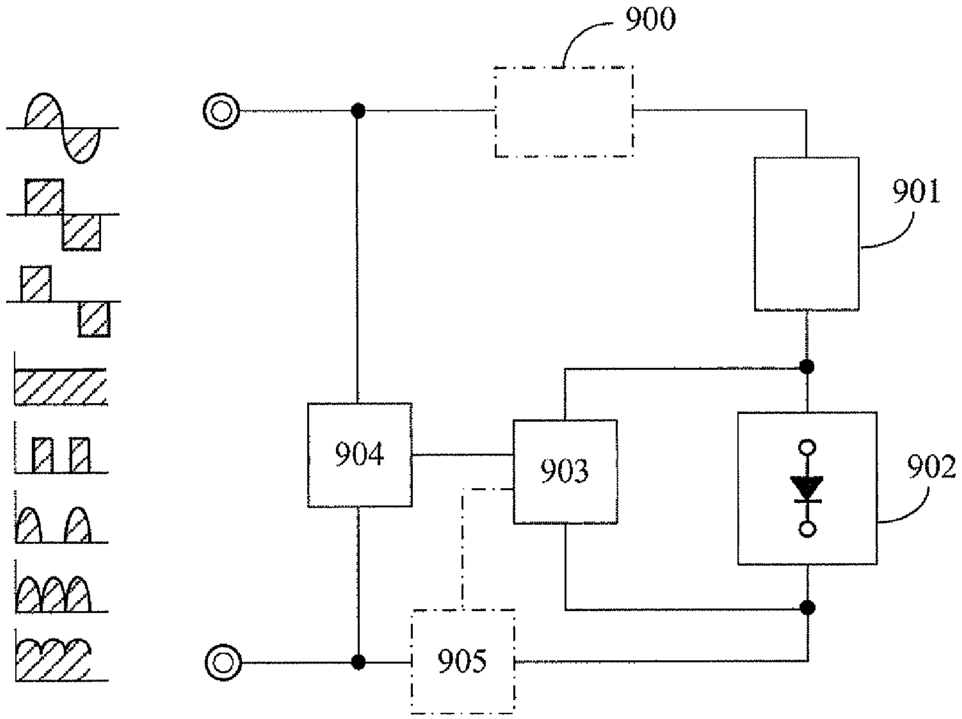
FIG. 9 is a schematic view showing the circuit blocks of the 6$^{th}$ embodiment of the present invention.

As shown in FIG. 9, which is a schematic view of the 6$^{th}$ embodiment of the present invention for applying to AC-DC main load driven by AC or DC power source, which has the rectifier diode as the AC/DC switching and voltage-dividing component, the main components including:

current equalizing impedance (900): related to a current equalizing impedance (900) connected with the AC-DC main load (901) in series, which is constituted by the inductor or coil with inductive impedance, or constituted by the impedance connecting the capacitor and the inductor or coil in parallel for being in parallel resonance with the ripple frequency of the passing current, arranged to reduce the ripple value of the current passing through the current equalizing impedance (900); the current equalizing impedance (900) is optionally installed upon demanded;

AC-DC main load (901): related to a main load driven by AC or DC power, constituted by one or more than one kind of main loads including AC or DC electric energy to luminous energy main load, AC or DC electric energy to thermal energy main load, AC or DC electric energy to mechanical energy main load, AC or DC electric energy to chemical energy main load, and AC or DC electric energy to acoustic energy main load;

rectifier diode (902): constituted by one or more rectifier diodes connected in series, connected in parallel, or connected in series-parallel, and arranged to be connected with the AC-DC main load (901) in series, and connected with power control unit (903) in parallel, to serve as a switching component for rectifying AC power source into half-wave DC, and to serve as a voltage-dividing component for the current with another flow direction separated by the rectifier diode (902) to be parallelly shunted regulation by the power control unit (903);

power control unit (903): constituted by electromechanical switch device, solid-state semiconductor-type switch device, or solid-state semiconductor-type linear variable impedance device; when DC power source is utilized to perform chopping control, the power control unit (903) is operated to perform shunt regulation of alternate chopping frequency, or shunt regulation of PWM (Pulse Width Modulation) of chopping conduction time ratio, or shunt regulation of PWM of alternate chopping frequency and chopping conduction time ratio at the same time; when a two-way periodical alternate polarity power source is used, the power control unit (903) is operated to perform shunt regulation of conductive phase angle; when an DC power source or two-way periodical alternate polarity power source is used, the power control unit (903) is operated to perform shunt regulation of switch type turn-on or cut-off, or the linear impedance value of the power control unit (903) is regulated so as to operate the power control unit (903) to perform shunt regulation to the current passing through the rectifier diode (902) and the current with another flow direction separated by the rectifier diode (902);

In the current regulator drive circuit shunting current by voltage-dividing load, control means of the power control unit (903) includes one or more than one of the following control means including: 1) being controlled through installation of the voltage detector (904); 2) being controlled through installation of the current detector (905); 3) being controlled through installation of the voltage detector (904) and the current detector (905); 4) being controlled through setting circuit to perform regular shunt to the voltage-dividing load; 5) being controlled through a manually-operated control interface device to perform shunt regulation to the voltage-dividing load; 6) being controlled through inputting external signals to perform shunt regulation to the voltage-dividing load;

when one or both of the voltage detector (904) and the current detector (905) are selected to be installed for performing shunt regulation to the power control unit (903), the configurations and operational functions of the voltage detector (904) and the current detector (905) are as followings:

voltage detector (904): related to a voltage detector constituted by electromechanical and/or solid-state electronic components, for detecting the supply voltage, or the value of the voltage at two ends of one or both of the AC-DC main load (901) and the power control unit (903), or of the total load of the both connected in series, to regulate the power control unit (903) over the following functions, including:

if the voltage detected by the voltage detector (904) is lower than a predetermined value, the power control unit (903) is operated to perform shunt regulation for increasing the current passing through the AC-DC main load (901); or if the voltage detected by the voltage detector (904) is higher than a predetermined value, the power control unit (903) is operated to perform shunt regulation for decreasing the current passing through the AC-DC main load (901); and current detector (905): related to a AC current detector constituted by electromechanical and/or solid-state electronic components, for detecting the value of one or more than one current passing through the AC-DC main load (901), the rectifier diode (902) and the power control unit (903), to regulate the power control unit (903) over the following functions, including:

if the current detected by the current detector (905) is lower than a predetermined value, the power control unit (903) is operated to perform shunt regulation for increasing the current passing through the AC-DC main load (901); or if the current detected by the current detector (905) is higher than a predetermined value, the power control unit (903) is operated to perform shunt regulation for decreasing the current passing through the AC-DC main load (901).

Figure 10:
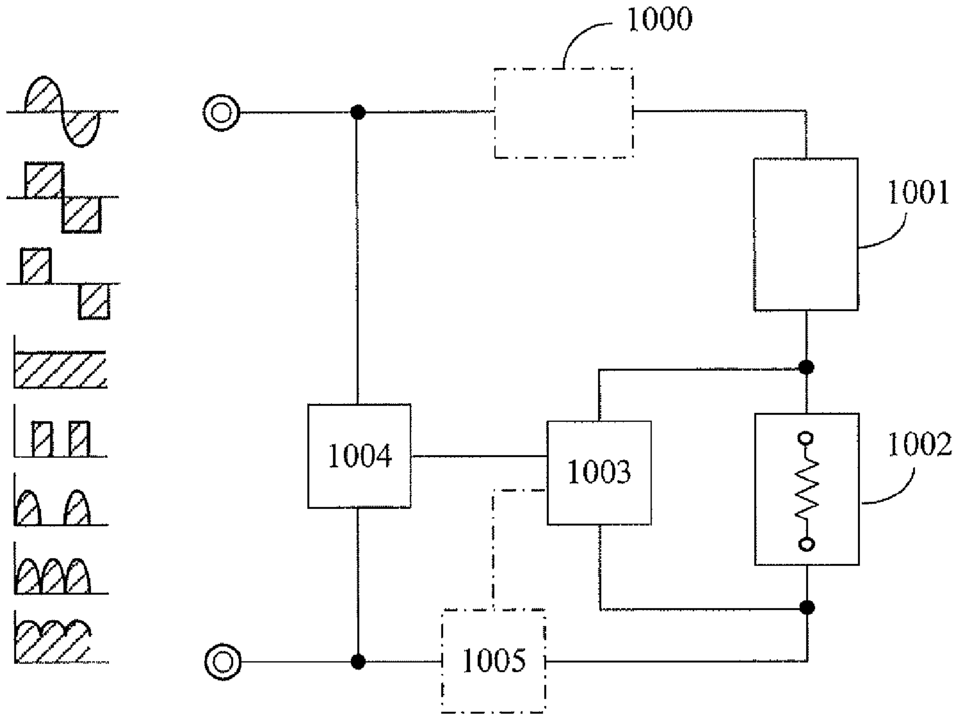
FIG. 10 is a schematic view showing the circuit blocks of the 7$^{th}$ embodiment of the present invention.

As shown in FIG. 10, which is a schematic view of the $7^{th}$ embodiment of the present invention for applying to a main load, which has the impedance component as the voltage-dividing component, driven by AC or DC power source, the main components including:

current equalizing impedance (1000): related to a current equalizing impedance (1000) connected with the main load (1001) in series, which is constituted by the inductor or coil with inductive impedance, or constituted by the impedance connecting the capacitor and the inductor or coil in parallel for being in parallel resonance with the ripple frequency of the passing current, arranged to reduce the ripple value of the current passing through the current equalizing impedance (1000); the current equalizing impedance (1000) is optionally installed upon demanded;

main load (1001): related to a main load driven by AC, DC, or pulsating DC power, constituted by one or more than one kind of main loads including electric energy to luminous energy main load, electric energy to thermal energy main load, electric energy to mechanical energy main load, electric energy to chemical energy main load, and electric energy to acoustic energy main load;

voltage-dividing impedance (1002): related to one or more than one resistive impedance component allowing AC, DC, or pulsating DC power passing through, which is constituted by one or more than one kind of resistive impedance components, and is arranged to be connected with the main load (1001) in series, and connected with the power control unit (1003) in parallel, for the current passing through the voltage-dividing impedance (1002) to be shunted regulation in parallel connection by the power control unit (1003);

power control unit (1003): constituted by electromechanical switch device, solid-state semiconductor-type switch device, or solid-state semiconductor-type linear variable impedance device; when DC power source is utilized to perform chopping control, the power control unit (1003) is operated to perform shunt regulation of alternate chopping frequency, or shunt regulation of PWM (Pulse Width Modulation) of chopping conduction time ratio, or shunt regulation of PWM of alternate chopping frequency and chopping conduction time ratio at the same time; when a two-way periodical alternate polarity power source is used, the power control unit (1003) is operated to perform shunt regulation of conductive phase angle; when an DC power source or two-way periodical alternate polarity power source is used, the power control unit (1003) is operated to perform shunt regulation of switch type turn-on or cut-off, or the linear impedance value of the power control unit (1003) is regulated so as to operate the power control unit (1003) to perform shunt regulation to the current passing through the voltage-dividing impedance (1002);

In the current regulator drive circuit shunting current by voltage-dividing load, control means of the power control unit (1003) includes one or more than one of the following control means including: 1) being controlled through installation of the voltage detector (1004); 2) being controlled through installation of the current detector (1005); 3) being controlled through installation of the voltage detector (1004) and the current detector (1005); 4) being controlled through setting circuit to perform regular shunt to the voltage-dividing load; 5) being controlled through a manually-operated control interface device to perform shunt regulation to the voltage-dividing load; 6) being controlled through inputting external signals to perform shunt regulation to the voltage-dividing load;

when one or both of the voltage detector (1004) and the current detector (1005) are selected to be installed for performing shunt regulation to the power control unit (1003), the configurations and operational functions of the voltage detector (1004) and the current detector (1005) are as followings:

voltage detector (1004): related to a voltage detector constituted by electromechanical and/or solid-state electronic components, for detecting the supply voltage, or the value of the voltage at two ends of one or both of the main load (1001) and the power control unit (1003), or of the total load of the both connected in series, to regulate the power control unit (1003) over the following functions, including:

if the voltage detected by the voltage detector (1004) is lower than a predetermined value, the power control unit (1003) is operated to perform shunt regulation for increasing the current passing through the main load (1001); or if the voltage detected by the voltage detector (1004) is higher than a predetermined value, the power control unit (1003) is operated to perform shunt regulation for decreasing the current passing through the main load (1001); and current detector (1005): related to a current detector constituted by electromechanical and/or solid-state electronic components, for detecting the value of one or more than one current passing through the main load (1001), the voltage-dividing impedance (1002) and the power control unit (1003), to regulate the power control unit (1003) over the following functions, including:

if the current detected by the current detector (1005) is lower than a predetermined value, the power control unit (100) is operated to perform shunt regulation for increasing the current passing through the main load (1001); or if the current detected by the current detector (1005) is higher than a predetermined value, the power control unit (1003) is operated to perform shunt regulation for decreasing the current passing through the main load (1001).

Figure 11:
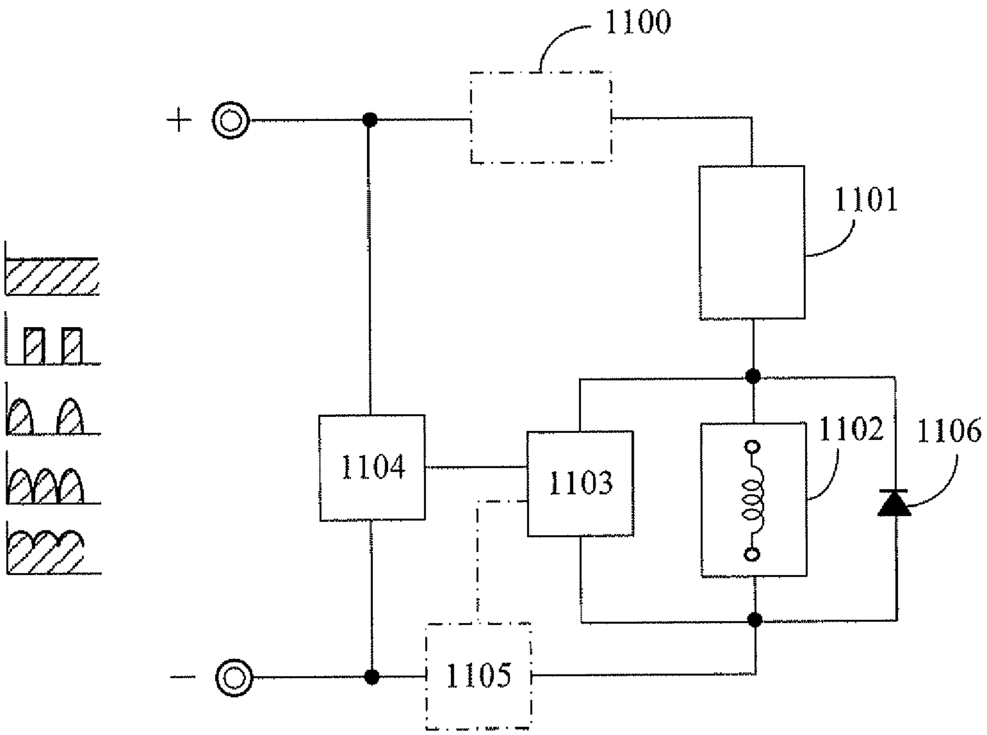
FIG. 11 is a schematic view showing the circuit blocks of the 8$^{th}$ embodiment of the present invention.

As shown in FIG. 11, which is a schematic view of the 8*th* embodiment of the present invention, for applying to a main load, which has the inductive impedance component as the voltage-dividing component, driven by DC power source, the main components including:

current equalizing impedance (1100): related to a current equalizing impedance (1100) connected with the main load (1101) in series, which is constituted by the inductor or coil with inductive impedance, or constituted by the impedance connecting the capacitor and the inductor or coil in parallel for being in parallel resonance with the ripple frequency of the passing current, arranged to reduce the ripple value of the current passing through the current equalizing impedance (1100); the current equalizing impedance (1100) is optionally installed upon demanded;

main load (1101): related to a main load driven by DC or pulsating DC power, constituted by one or more than one kind of main loads including electric energy to luminous energy main load, electric energy to thermal energy main load, electric energy to mechanical energy main load, electric energy to chemical energy main load, and electric energy to acoustic energy main load;

inductive voltage-dividing impedance component (1102): related to one or more than one inductive impedance component allowing DC or pulsating DC power passing through, arranged to be connected with the main load (1101) in series, and connected with the DC power control device (1103) in parallel, for the current passing through the inductive voltage-dividing impedance component (1102) to be shunted regulation in parallel connection by the DC power control device (1103)

flywheel diode (1106): constituted by diode or high-speed diode, for being connected with two ends of the inductive voltage-dividing impedance component (1102) in parallel with a reverse polarity means; if a flywheel is built-in at two ends of the power of the DC power control device (1103), then the mentioned flywheel diode (1106) can be optionally installed;

DC power control device (1103): constituted by electromechanical switch device, solid-state semiconductor-type switch device, or solid-state semiconductor-type linear variable impedance device, when DC power source is utilized to perform chopping control, the DC power control device (1103) is operated to perform shunt regulation of alternate chopping frequency, or shunt regulation of PWM (Pulse Width Modulation) of chopping conduction time ratio, or shunt regulation of PWM of alternate chopping frequency and chopping conduction time ratio at the same time; or the DC power control device (1103) is operated to perform shunt regulation of switch type turn-on or cut-off, or the linear impedance value of the DC power control device (1103) is regulated so as to operate the DC power control device (1103) to perform shunt regulation for the current passing through the inductive voltage-dividing impedance component (1102);

In the current regulator drive circuit shunting current by voltage-dividing load, control means of the DC power control device (1103) includes one or more than one of the following control means including: 1) being controlled through installation of the voltage detector (1104); 2) being controlled through installation of the current detector (1105); 3) being controlled through installation of the voltage detector (1104) and the current detector (1105); 4) being controlled through setting circuit to perform regular shunt to the voltage-dividing load; 5) being controlled through a manually-operated control interface device to perform shunt regulation to the voltage-dividing load; 6) being controlled through inputting external signals to perform shunt regulation to the voltage-dividing load;

when one or both of the voltage detector (1104) and the current detector (1105) are selected to be installed for performing shunt regulation to the DC power control device (1103), the configurations and operational functions of the voltage detector (1104) and the current detector (1105) are as followings:

voltage detector (1104): related to a voltage detector constituted by electromechanical and/or solid-state electronic components, for detecting the supply voltage, or the value of the voltage at two ends of one or both of the main load (1101) and the DC power control device (1103), or of the total load of the both connected in series, to regulate the DC power control device (1103) over the following functions, including:

if the voltage detected by the voltage detector (1104) is lower than a predetermined value, the DC power control device (1103) is operated to perform shunt regulation for increasing the current passing through the main load (1101); or if the voltage detected by the voltage detector (1104) is higher than a predetermined value, the DC power control device (1103) is operated to perform shunt regulation for decreasing the current passing through the main load (1101); and current detector (1105): related to a current detector constituted by electromechanical and/or solid-state electronic components, for detecting the value of one or more than one current passing through the main load (1101), the inductive voltage-dividing impedance component (1102) and the DC power control device (1103), to regulate the DC power control device (1103) over the following functions, including:

if the current detected by the current detector (1105) is lower than a predetermined value, the DC power control device (1103) is operated to perform shunt regulation for increasing the current passing through the main load (1101); or if the current detected by the current detector (1105) is higher than a predetermined value, the DC power control device (1103) is operated to perform shunt regulation for decreasing the current passing through the main load (1101).

Figure 12:
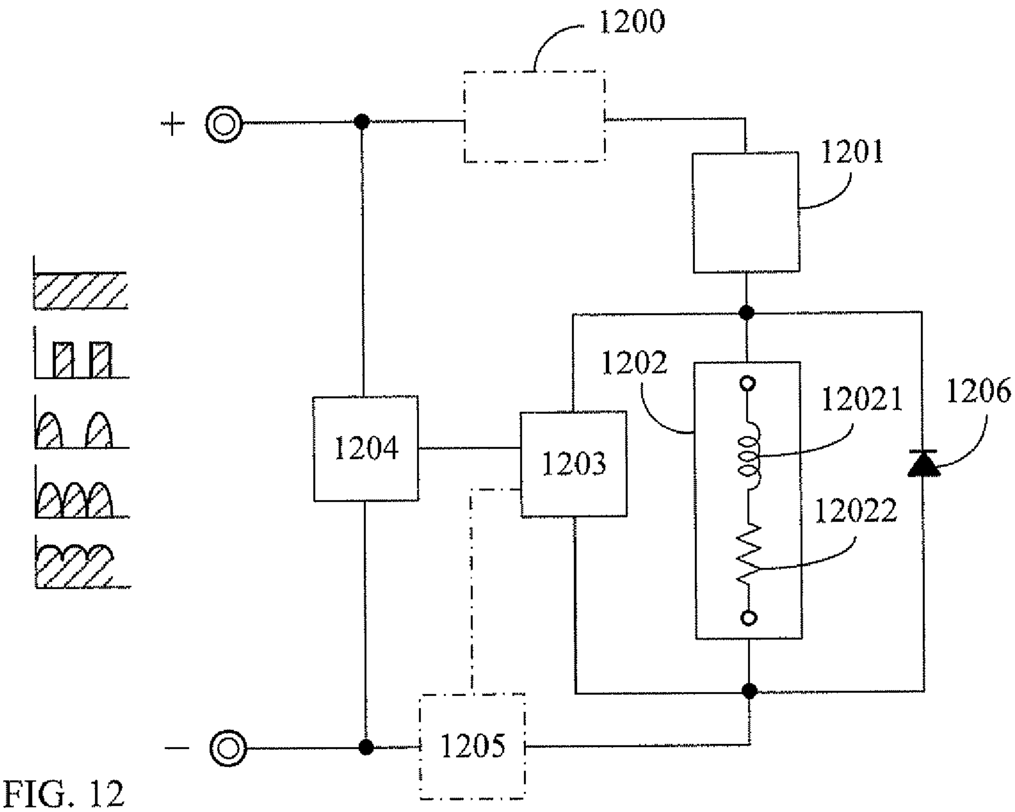
FIG. 12 is a schematic view showing the circuit blocks of the 9$^{th}$ embodiment of the present invention.

As shown in FIG. 12, which is a schematic view of the 9$^{th}$ embodiment of the present invention being applied in the main load driven by DC power source, and the impedance component of inductive series resistance serving as a voltage-dividing component, the main components including:

current equalizing impedance (1200): related to a current equalizing impedance (1200) connected with the main load (1201) in series, which is constituted by the inductor or coil with inductive impedance, or constituted by the impedance connecting the capacitor and the inductor or coil in parallel for being in parallel resonance with the ripple frequency of the passing current, arranged to reduce the ripple value of the current passing through the current equalizing impedance (1200); the current equalizing impedance (1200) is optionally installed upon demanded;

main load (1201): related to a main load driven by DC or pulsating DC power, which is constituted by one or more than one kind of main loads, including electric energy to luminous energy main load, electric energy to thermal energy main load, electrical energy to mechanical energy main load, electrical energy to chemical energy main load, or electrical energy to acoustic energy main load;

voltage-dividing impedance component of inductive series resistance (1202): constituted by one or more than one of inductive impedance component (12021), that allows DC or pulsating DC power passing through, being connected with resistance (12022) in series, and serving to be connected with the main load (1201) in series and with the AC power control device (1203) in parallel, and allowing the DC power control device (1203) to perform parallel shunt regulation to the current passing through the voltage-dividing impedance component of inductive series resistance (1202);

flywheel diode (1206): constituted by diode or high-speed diode, for being connected with two ends of the voltage-dividing impedance component of inductive series resistance (1202) in parallel with a reverse polarity means; if a flywheel is built-in at two ends of the power of the DC power control device (1203), then the mentioned flywheel diode (1206) can be optionally installed;

DC power control device (1203): constituted by electromechanical switch device, solid-state semiconductor-type switch device, or solid-state semiconductor-type linear variable impedance device, when DC power source is utilized to perform chopping control, the DC power control device (1203) is operated to perform shunt regulation of alternate chopping frequency, or shunt regulation of PWM (Pulse Width Modulation) of chopping conduction time ratio, or shunt regulation of PWM of alternate chopping frequency and chopping conduction time ratio at the same time; or the DC power control device (1203) is operated to perform shunt regulation of switch type turn-on or cut-off, or the linear impedance value of the DC power control device (1203) is regulated so as to operate the DC power control device (1203) to perform shunt regulation for the current passing through the voltage-dividing impedance component (1202);

In the current regulator drive circuit shunting current by voltage-dividing load, control means of the DC power control device (1203) includes one or more than one of the following control means including: 1) being controlled through installation of the voltage detector (1204); 2) being controlled through installation of the current detector (1205); 3) being controlled through installation of the voltage detector (1204) and the current detector (1205); 4) being controlled through setting circuit to perform regular shunt to the voltage-dividing load; 5) being controlled through a manually-operated control interface device to perform shunt regulation to the voltage-dividing load; 6) being controlled through inputting external signals to perform shunt regulation to the voltage-dividing load;

when one or both of the voltage detector (1204) and the current detector (1205) are selected to be installed for performing shunt regulation to the DC power control device (1203), the configurations and operational functions of the voltage detector (1204) and the current detector (1205) are as followings:

voltage detector (1204): related to a voltage detector constituted by electromechanical and/or solid-state electronic components, for detecting the supply voltage, or the value of the voltage at two ends of one or both of the main load (1201) and the DC power control device (1203), or of the total load of the both connected in series, to regulate the DC power control device (1203) over the following functions, including:

if the voltage detected by the voltage detector (1204) is lower than a predetermined value, the DC power control device (1203) is operated to perform shunt regulation for increasing the current passing through the main load (1201); or if the voltage detected by the voltage detector (1204) is higher than a predetermined value, the DC power control device (1203) is operated to perform shunt regulation for decreasing the current passing through the main load (1201); and current detector (1205): related to a current detector constituted by electromechanical and/or solid-state electronic components, for detecting the value of one or more than one current passing through the main load (1201), the voltage-dividing impedance component of inductive series resistance (1202) and the DC power control device (1203), to regulation the DC power control device (1203) over the following functions, including:

if the current detected by the current detector (1205) is lower than a predetermined value, the DC power control device (1203) is operated to perform shunt regulation for increasing the current passing through the main load (1201); or if the current detected by the current detector (1205) is higher than a predetermined value, the DC power control device (1203) is operated to perform shunt regulation for decreasing the current passing through the main load (1201).

Figure 13:
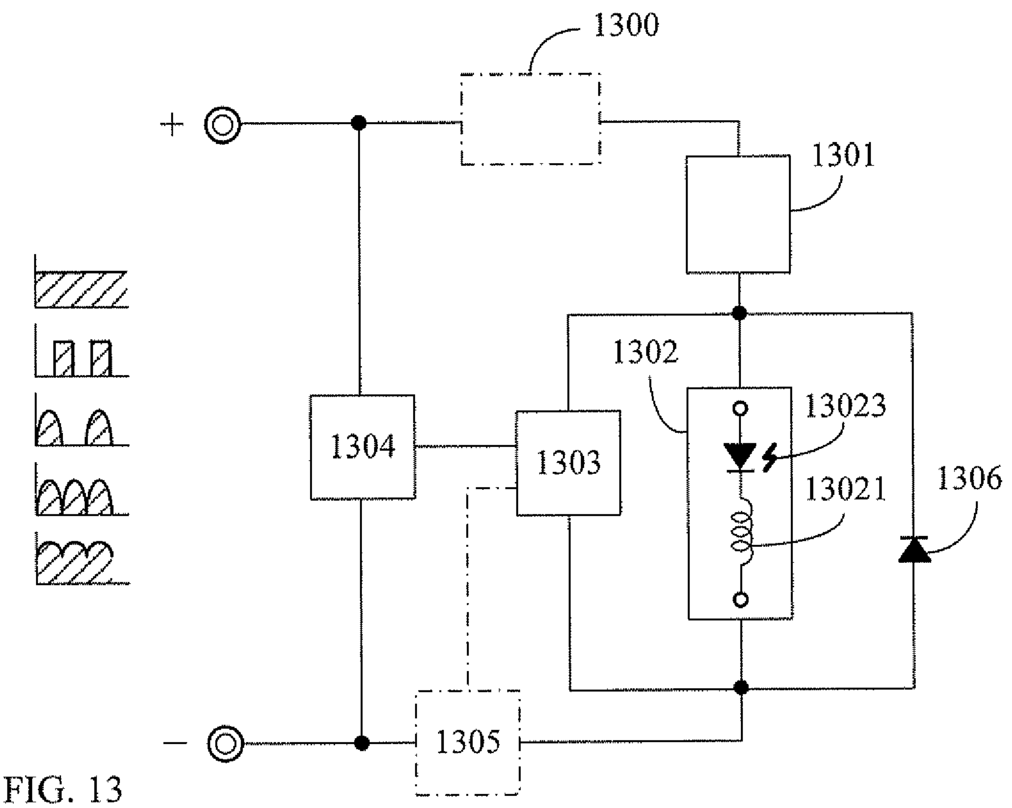
FIG. 13 is a schematic view showing the circuit blocks of the 10$^{th}$ embodiment of the present invention.

As shown in FIG. 13, which is a schematic view of the $10^{th}$ embodiment of the present invention being applied in the main load driven by DC power source, and the impedance component of the inductive series LED serving as a voltage-dividing component, the main components including;

current equalizing impedance (1300): related to a current equalizing impedance (1300) connected with the main load (1301) in series, which is constituted by the inductor or coil with inductive impedance, or constituted by the impedance connecting the capacitor and the inductor or coil in parallel for being in parallel resonance with the ripple frequency of the passing current, arranged to reduce the ripple value of the current passing through the current equalizing impedance (1300); the current equalizing impedance (1300) is optionally installed upon demanded;

main load (1301): related to a main load driven by DC, or pulsating DC power, which is constituted by one or more than one kind of main loads, including electrical energy to luminous energy main load, electrical energy to thermal energy main load, electrical energy to mechanical energy main load, electrical energy to chemical energy main load, or electrical energy to acoustic energy main load;

voltage-dividing impedance component of inductive series LED (1302): constituted by one or more than one of inductive impedance component (13021), that allows DC or pulsating DC power passing through, being connected with LED (13023) in series, and serving to be connected with the main load (1301) in series and connected with the DC power control device (1303) in parallel, and allowing the DC power control device (1303) to perform parallel shunt regulation to the current passing through the voltage-dividing impedance component of inductive series LED (1302);

flywheel diode (1306): constituted by diode or high-speed diode, for being connected with two ends of the voltage-dividing impedance component of inductive series LED (1302) in parallel with a reverse polarity means; if a flywheel is built-in at two ends of the power of the DC power control device (1303), then the mentioned flywheel diode (1306) can be optionally installed;

DC power control device (1303): constituted by electromechanical switch device, solid-state semiconductor-type switch device, or solid-state semiconductor-type linear variable impedance device; when DC power source is utilized to perform chopping control, the DC power control device (1303) is operated to perform shunt regulation of alternate chopping frequency, or shunt regulation of PWM (Pulse Width Modulation) of chopping conduction time ratio, or shunt regulation of PWM of alternate chopping frequency and chopping conduction time ratio at the same time; or the DC power control device (1303) is operated to perform shunt regulation of switch type turn-on or cut-off, or the linear impedance value of the DC power control device (1303) is regulated so as to operate the DC power control device (1303) to perform shunt regulation for the current passing through the voltage-dividing impedance component of inductive series LED (1302);

In the current regulator drive circuit shunting current by voltage-dividing load, control means of the DC power control device (1303) includes one or more than one of the following control means including: 1) being controlled through installation of the voltage detector (1304); 2) being controlled through installation of the current detector (1305); 3) being controlled through installation of the voltage detector (1304) and the current detector (1305); 4) being controlled through setting circuit to perform regular shunt to the voltage-dividing load; 5) being controlled through a manually-operated control interface device to perform shunt regulation to the voltage-dividing load; 6) being controlled through inputting external signals to perform shunt regulation to the voltage-dividing load;

when one or both of the voltage detector (1304) and the current detector (1305) are selected to be installed for performing shunt regulation to the DC power control device (1303), the configurations and operational functions of the voltage detector (1304) and the current detector (1305) are as followings:

voltage detector (1304): related to a voltage detector constituted by electromechanical and/or solid-state electronic components, for detecting the supply voltage, or the value of the voltage at two ends of one or both of the main load (1301) and the DC power control device (1303), or of the total load of the both connected in series, to regulate the DC power control unit (1303) over the following functions, including:

if the voltage detected by the voltage detector (1304) is lower than a predetermined value, the DC power control device (1303) is operated to perform shunt regulation for increasing the current passing through the main load (1301); or if the voltage detected by the voltage detector (1304) is higher than a predetermined value, the DC power control device (1303) is operated to perform shunt regulation for decreasing the current passing through the main load (1301); and current detector (1305): related to a current detector constituted by electromechanical and/or solid-state electronic components, for detecting the value of one or more than one current passing through the main load (1301), the voltage-dividing impedance component of inductive series LED (1302) and the DC power control device (1303), to regulate the DC power control device (1303) over the following functions, including:

if the current detected by the current detector (1305) is lower than a predetermined value, the DC power control device (1303) is operated to perform shunt regulation for increasing the current passing through the main load (1301); or if the current detected by the current detector (1305) is higher than a predetermined value, the DC power control device (1303) is operated to perform shunt regulation for decreasing the current passing through the main load (1301).

Figure 14:
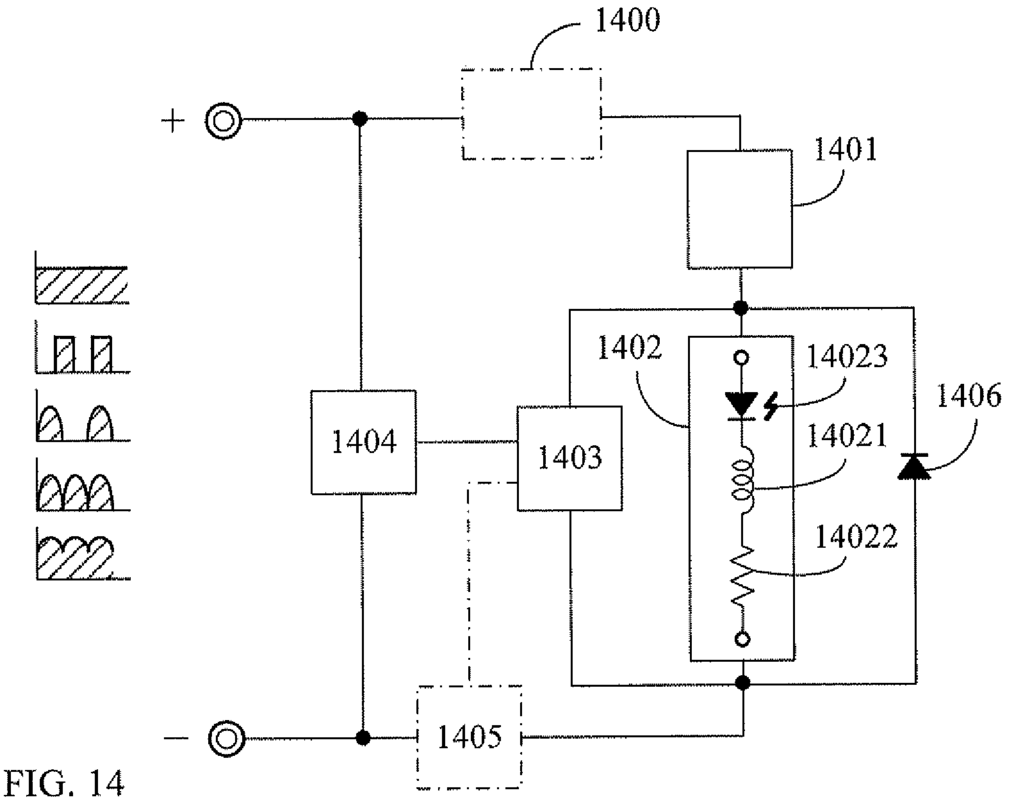
FIG. 14 is a schematic view showing the circuit blocks of the 11$^{th}$ embodiment of the present invention.

As shown in FIG. 14, which is a schematic view of the $11^{th}$ embodiment of the present invention being applied in the main load driven by DC power source, and the impedance component of the inductive series resistance and series LED serving as a voltage-dividing component, the main components including:

current equalizing impedance (1400): related to a current equalizing impedance (1400) connected with the main load (1401) in series, which is constituted by the inductor or coil with inductive impedance, or constituted by the impedance connecting the capacitor and the inductor or coil in parallel for being in parallel resonance with the ripple frequency of the passing current, arranged to reduce the ripple value of the current passing through the current equalizing impedance (1400); the current equalizing impedance (1400) is optionally installed upon demanded;

main load (1401): related to a main load driven by DC, or pulsating DC power, which is constituted by one or more than one kind of main loads, including electrical energy to luminous energy main load, electrical energy to thermal energy main load, electrical energy to mechanical energy main load, electrical energy to chemical energy main load, or electrical energy to acoustic energy main load;

voltage-dividing impedance component of inductive series resistance and series LED (1402): constituted by one or more than one of inductive impedance component (14021), that allows DC or pulsating DC power passing through, being connected with the resistance in series and connected with the LED in series, and serving to be connected with the main load (1401) in series and be connected with the DC power control device (1403) in parallel, and allowing the DC power control device (1403) to perform parallel shunt regulation to voltage-dividing impedance component of inductive series resistance and series LED (1402);

flywheel diode (1406): constituted by diode or high-speed diode, for being connected with two ends of the voltage-dividing impedance component of inductive series resistance and series LED (1402) in parallel with a reverse polarity means; if a flywheel is built-in at two ends of the power of the DC power control device (1403), then the mentioned flywheel diode (1406) can be optionally installed;

DC power control device (1403): constituted by electromechanical switch device, solid-state semiconductor-type switch device, or solid-state semiconductor-type linear variable impedance device, when DC power source is utilized to perform chopping control, the DC power control device (1403) is operated to perform shunt regulation of alternate chopping frequency, or shunt regulation of PWM (Pulse Width Modulation) of chopping conduction time ratio, or shunt regulation of PWM of alternate chopping frequency and chopping conduction time ratio at the same time; or the DC power control device (1403) is operated to perform shunt regulation of switch type turn-on or cut-off, or the linear impedance value of the DC power control device (1403) is regulated so as to operate the DC power control device (1403) to perform shunt regulation for the current passing through the voltage-dividing impedance component of inductive series resistance and series LED (1402);

In the current regulator drive circuit shunting current by voltage-dividing load, control means of the DC power control device (1403) includes one or more than one of the following control means including: 1) being controlled through installation of the voltage detector (1404); 2) being controlled through installation of the current detector (1405); 3) being controlled through installation of the voltage detector (1404) and the current detector (1405); 4) being controlled through setting circuit to perform regular shunt to the voltage-dividing load; 5) being controlled through a manually-operated control interface device to perform shunt regulation to the voltage-dividing load; 6) being controlled through inputting external signals to perform shunt regulation to the voltage-dividing load;

when one or both of the voltage detector (1404) and the current detector (1405) are selected to be installed for performing shunt regulation to the DC power control device (1403), the configurations and operational functions of the voltage detector (1404) and the current detector (1405) are as followings:

voltage detector (1404): related to a voltage detector constituted by electromechanical and/or solid-state electronic components, for detecting the supply voltage, or the value of the voltage at two ends of one or both of the main load (1401) and the DC power control device (1403), or of the total load of the both connected in series, to regulate the DC power control device (1403) over the following functions, including:

if the voltage detected by the voltage detector (1404) is lower than a predetermined value, the DC power control device (1403) is operated to perform shunt regulation for increasing the current passing through the main load (1401); or if the voltage detected by the voltage detector (1404) is higher than a predetermined value, the DC power control device (1403) is operated to perform shunt regulation for decreasing the current passing through the main load (1401); and current detector (1405): related to a current detector constituted by electromechanical and/or solid-state electronic components, for detecting the value of one or more than one current passing through the main load (1401), the voltage-dividing impedance component of inductive series resistance and series LED (1402) and the DC power control device (1403), to regulation the DC power control device (1403) over the following functions, including:

if the current detected by the current detector (1405) is lower than a predetermined value, the DC power control device (1403) is operated to perform shunt regulation for increasing the current passing through the main load (1401); or if the current detected by the current detector (1405) is higher than a predetermined value, the DC power control device (140) is operated to perform shunt regulation for decreasing the current passing through the main load (1401).

Figure 15:
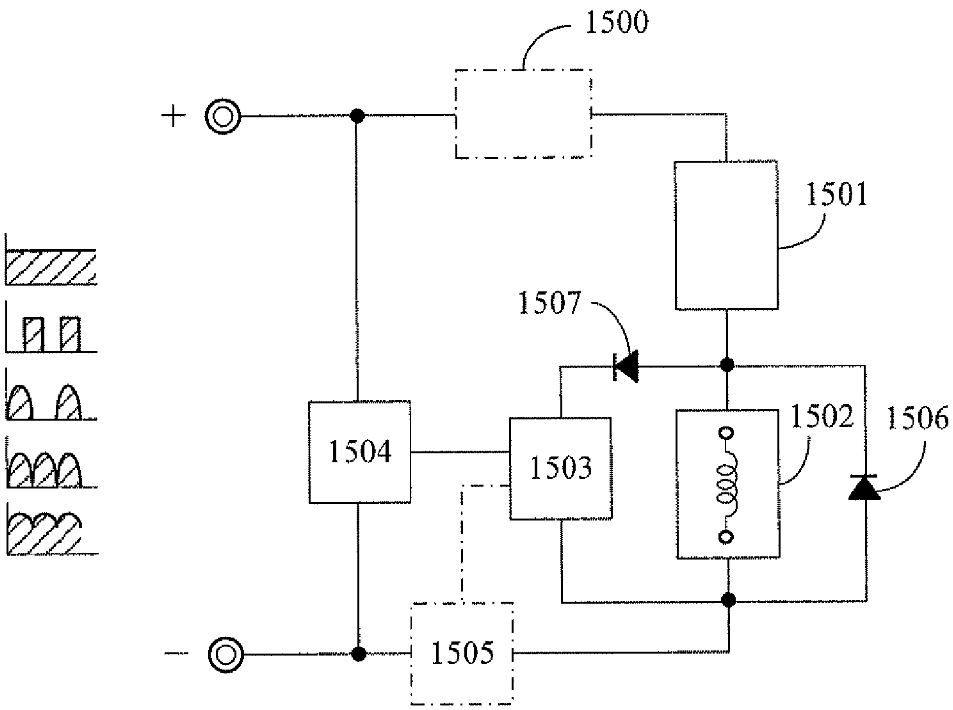
FIG. 15 is a schematic view showing the circuit blocks of the 12$^{th}$ embodiment of the present invention.

As shown in FIG. 15, which is a schematic view of the $12^{th}$ embodiment of the present invention being applied in the main load driven by DC power source, and the inductive impedance component serving as a voltage-dividing component and the DC power control device (1503) being further connected with shield diode, the main components including:

current equalizing impedance (1500): related to a current equalizing impedance (1500) connected with the main load (1501) in series, which is constituted by the inductor or coil with inductive impedance, or constituted by the impedance connecting the capacitor and the inductor or coil in parallel for being in parallel resonance with the ripple frequency of the passing current, arranged to reduce the ripple value of the current passing through the current equalizing impedance (1500); the current equalizing impedance (1500) is optionally installed upon demanded;

main load (1501): related to a main load driven by DC or pulsating DC power, which is constituted by one or more than one kind of main loads, including electrical energy to luminous energy main load, electrical energy to thermal energy main load, electrical energy to mechanical energy main load, electrical energy to chemical energy main load, or electrical energy to acoustic energy main load;

inductive voltage-dividing impedance component (1502): constituted by one or more than one of inductive impedance component allowing DC or pulsating DC power passing through, and serving to be connected with the main load (1501) in series and be connected in parallel with two ends defined through the shield diode (1507) being in series connected with the DC power control device (1503) with a means of consequent to the power polarity, and allowing the DC power control device (1503) to perform parallel shunt regulation to the inductive voltage-dividing impedance component (1502);

flywheel diode (1506): constituted by diode or high-speed diode, for being connected with two ends of the inductive voltage-dividing impedance component (1502) in parallel with a reverse polarity means; if a flywheel is built-in at two ends of the power of the DC power control device (1503), then the mentioned flywheel diode (1506) can be optionally installed;

shield diode (1507): constituted by LED or high-speed LED, for being connected in series with the DC power control device (1503) in the forward power polarity;

DC power control device (1503): constituted by electromechanical switch device, solid-state semiconductor-type switch device, or solid-state semiconductor-type linear variable impedance device, when DC power source is utilized to perform chopping control, the DC power control device (1503) is operated to perform shunt regulation of alternate chopping frequency, or shunt regulation of PWM (Pulse Width Modulation) of chopping conduction time ratio, or shunt regulation of PWM of alternate chopping frequency and chopping conduction time ratio at the same time; or the DC power control device (1503) is operated to perform shunt regulation of switch type turn-on or cut-off, or the linear impedance value of the DC power control device (1503) is regulated so as to operate the DC power control device (1503) to perform shunt regulation for the current passing through the Inductive voltage-dividing impedance component (1502);

In the current regulator drive circuit shunting current by voltage-dividing load, control means of the DC power control device (1203) includes one or more than one of the following control means including: 1) being controlled through installation of the voltage detector (1504); 2) being controlled through installation of the current detector (1505); 3) being controlled through installation of the voltage detector 1504 and the current detector (1505); 4) being controlled through setting circuit to perform regular shunt to the voltage-dividing load; 5) being controlled through a manually-operated control interface device to perform shunt regulation to the voltage-dividing load; 6) being controlled through inputting external signals to perform shunt regulation to the voltage-dividing load;

when one or both of the voltage detector (1504) and the current detector (1505) are selected to be installed for performing shunt regulation to the DC power control device (1503), the configurations and operational functions of the voltage detector (1504) and the current detector (1505) are as followings:

voltage detector (1504): related to a voltage detector constituted by electromechanical and/or solid-state electronic components, for detecting the supply voltage, or the value of the voltage at two ends of one or both of the main load (1501) and the DC power control device (1503), or of the total load of the both connected in series, to regulate the DC power control device (1503) over the following functions, including:

if the voltage detected by the voltage detector (1504) is lower than a predetermined value, the DC power control device (1503) is operated to perform shunt regulation for increasing the current passing through the main load (1501); or if the voltage detected by the voltage detector (1504) is higher than a predetermined value, the DC power control device (1503) is operated to perform shunt regulation for decreasing the current passing through the main load (1501); and current detector (1505): related to a current detector constituted by electromechanical and/or solid-state electronic components, for detecting the value of one or more than one current passing through the main load (1501), the inductive voltage-dividing impedance component (1502) and the DC power control device (1503), to regulation the DC power control device (1203) over the following functions, including:

if the current detected by the current detector (1505) is lower than a predetermined value, the DC power control device (1503) is operated to perform shunt regulation for increasing the current passing through the main load (1501); or if the current detected by the current detector (1505) is higher than a predetermined value, the DC power control device (1503) is operated to perform shunt regulation for decreasing the current passing through the main load (1501).

Figure 16:
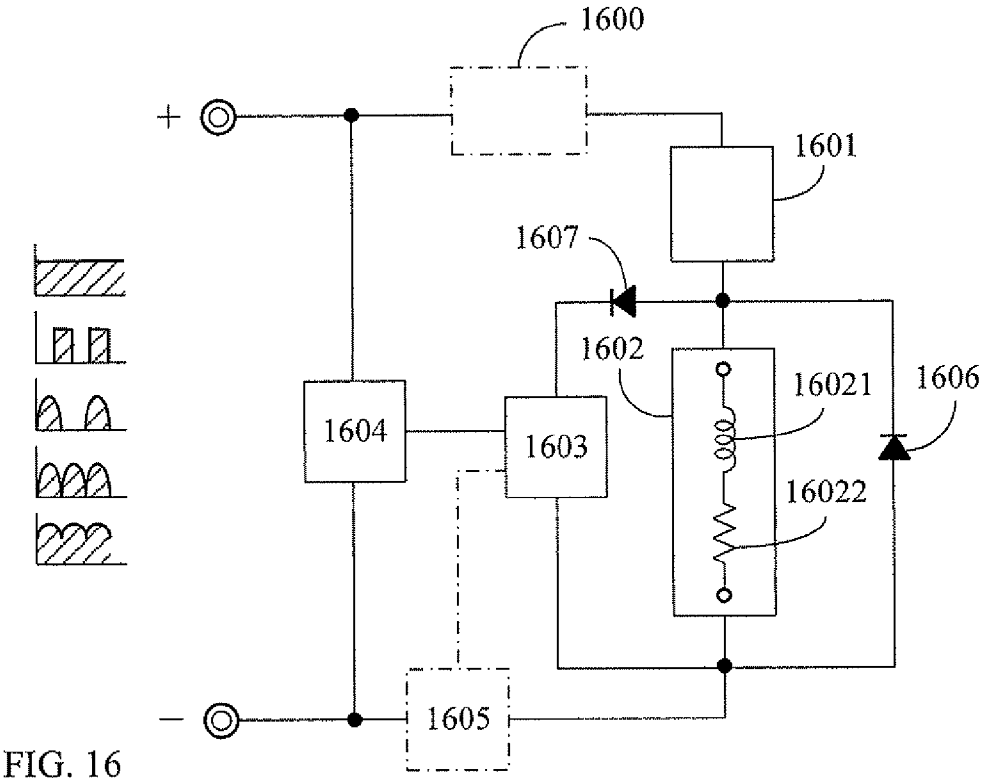
FIG. 16 is a schematic view showing the circuit blocks of the 13$^{th}$ embodiment of the present invention.

As shown in FIG. 16, which is a schematic view of the 13$^{th}$ embodiment of the present invention being applied in the main load driven by DC power source, and the impedance component of inductive series resistance serving as a voltage-dividing component and the DC power control device (1603) being further connected with shield diode, the main components including:

current equalizing impedance (1600): related to a current equalizing impedance (1600) connected with the main load (1601) in series, which is constituted by the inductor or coil with inductive impedance, or constituted by the impedance connecting the capacitor and the inductor or coil in parallel for being in parallel resonance with the ripple frequency of the passing current, arranged to reduce the ripple value of the current passing through the current equalizing impedance (1600); the current equalizing impedance (1600) is optionally installed upon demanded;

main load (1601): related to a main load driven by DC or pulsating DC power, which is constituted by one or more than one kind of main loads, including electrical energy to luminous energy main load, electrical energy to thermal energy main load, electrical energy to mechanical energy main load, electrical energy to chemical energy main load, or electrical energy to acoustic energy main load;

voltage-dividing impedance component of inductive series resistance (1602): constituted by one or more than one of inductive impedance component (16021), that allows DC or pulsating DC power passing through, being connected with resistance (16022) in series, and serving to be connected with the main load (1601) in series and be connected in parallel with two ends defined through the shield diode (1607) being in series connected with the DC power control device (1603) with a means of consequent to the power polarity, and allowing the DC power control device (1603) to perform parallel shunt regulation to the voltage-dividing impedance component of inductive series resistance (1602);

flywheel diode (1606): constituted by diode or high-speed diode, for being connected with two ends of the voltage-dividing impedance component of inductive series resistance (1602) in parallel with a reverse polarity means; if a flywheel diode is built-in at two ends of the power of the DC power control device (1603), then the mentioned flywheel diode (1206) can be optionally installed;

shield diode (1607): constituted by diode or high-speed diode, for being connected in series with the DC power control device (1603) in the forward power polarity;

DC power control device (1603): constituted by electromechanical switch device, solid-state semiconductor-type switch device, or solid-state semiconductor-type linear variable impedance device, when DC power source is utilized to perform chopping control, the DC power control device (1603) is operated to perform shunt regulation of alternate chopping frequency, or shunt regulation of PWM (Pulse Width Modulation) of chopping conduction time ratio, or shunt regulation of PWM of alternate chopping frequency and chopping conduction time ratio at the same time; or the DC power control device (1603) is operated to perform shunt regulation of switch type turn-on or cut-off, or the linear impedance value of the DC power control device (1603) is regulated so as to operate the DC power control device (1603) to perform shunt regulation for the current passing through the voltage-dividing impedance component of inductive series resistance (1602);

In the current regulator drive circuit shunting current by voltage-dividing load, control means of the DC power control device (1203) includes one or more than one of the following control means including: 1) being controlled through installation of the voltage detector (1604); 2) being controlled through installation of the current detector (1605); 3) being controlled through installation of the voltage detector (1604) and the current detector (1605); 4) being controlled through setting circuit to perform regular shunt to the voltage-dividing load; 5) being controlled through a manually-operated control interface device to perform shunt regulation to the voltage-dividing load; 6) being controlled through inputting external signals to perform shunt regulation to the voltage-dividing load;

when one or both of the voltage detector (1604) and the current detector (1605) are selected to be installed for performing shunt regulation to the DC power control device (1603), the configurations and operational functions of the voltage detector (1604) and the current detector (1605) are as followings:

voltage detector (1604): related to a voltage detector constituted by electromechanical and/or solid-state electronic components, for detecting the supply voltage, or the value of the voltage at two ends of one or both of the main load (1601) and the DC power control device (1603), or of the total load of the both connected in series, to regulate the DC power control device (1603) over the following functions, including:

if the voltage detected by the voltage detector (1604) is lower than a predetermined value, the DC power control device (1603) is operated to perform shunt regulation for increasing the current passing through the main load (1601); or if the voltage detected by the voltage detector (1604) is higher than a predetermined value, the DC power control device (1603) is operated to perform shunt regulation for decreasing the current passing through the main load (1601); and current detector (1605): related to a current detector constituted by electromechanical and/or solid-state electronic components, for detecting the value of one or more than one current passing through the main load (1601), the voltage-dividing impedance component of inductive series resistance (1602) and the DC power control device (1603), to regulation the DC power control device (1603) over the following functions, including:

if the current detected by the current detector (1605) is lower than a predetermined value, the DC power control device (1603) is operated to perform shunt regulation for increasing the current passing through the main load (1601); or if the current detected by the current detector (1605) is higher than a predetermined value, the DC power control device (1603) is operated to perform shunt regulation for decreasing the current passing through the main load (1601).

Figure 17:
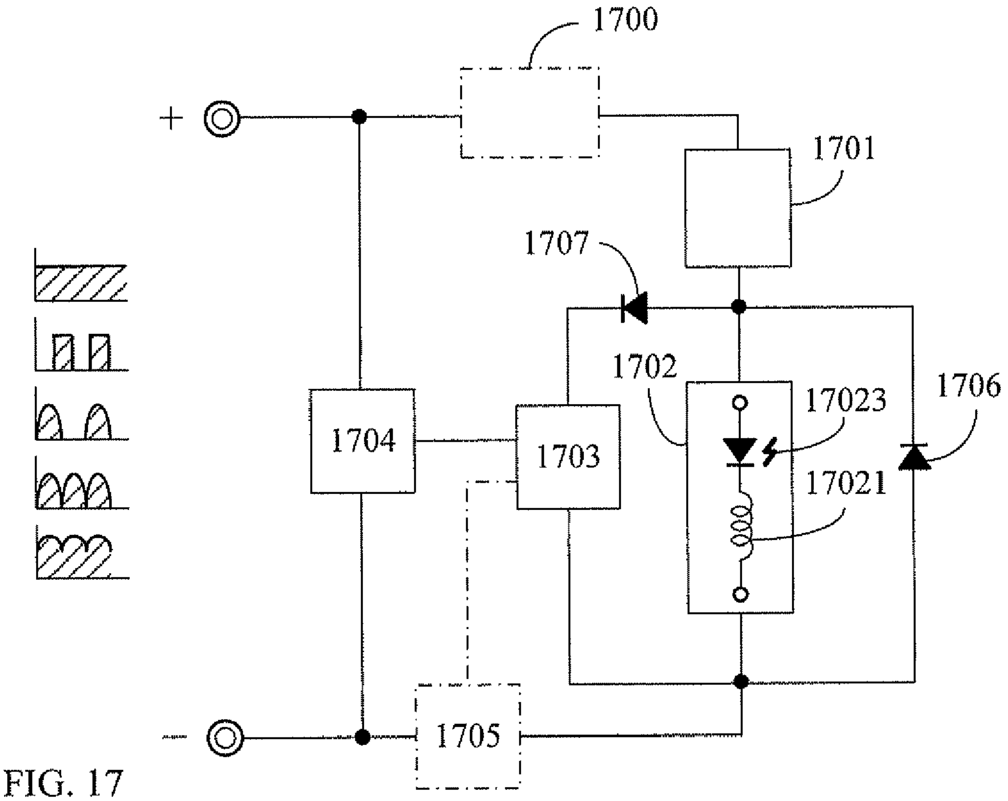
FIG. 17 is a schematic view showing the circuit blocks of the 14$^{th}$ embodiment of the present invention.

As shown in FIG. 17, which is a schematic view of the 14$^{th}$ embodiment of the present invention being applied in the main load driven by DC power source, and the impedance component of inductive series LED serving as a voltage-dividing component and the DC power control device (1703) being further connected with shield diode, the main components including:

current equalizing impedance (1700): related to a current equalizing impedance (1700) connected with the main load (1701) in series, which is constituted by the inductor or coil with inductive impedance, or constituted by the impedance connecting the capacitor and the inductor or coil in parallel for being in parallel resonance with the ripple frequency of the passing current, arranged to reduce the ripple value of the current passing through the current equalizing impedance (1700); the current equalizing impedance (1700) is optionally installed upon demanded;

main load (1701): related to a main load driven by DC or pulsating DC power, which is constituted by one or more than one kind of main loads, including electrical energy to luminous energy main load, electrical energy to thermal energy main load, electrical energy to mechanical energy main load, electrical energy to chemical energy main load, or electrical energy to acoustic energy main load;

voltage-dividing impedance component of inductive series LED (1702): constituted by one or more than one of inductive impedance component (17021), that allows DC or pulsating DC power passing through, being connected with LED (17023) in series, and serving to be connected with the main load (1701) in series and be connected in parallel with two ends defined through the shield diode (1707) being in series connected with the DC power control device (1703) with a means of consequent to the power polarity, and allowing the DC power control device (1703) to perform parallel shunt regulation to the current passing through the voltage-dividing impedance component of inductive series LED (1702);

flywheel diode (1706): constituted by diode or high-speed diode, for being connected with two ends of the voltage-dividing impedance component of inductive series LED (1702) in parallel with a reverse polarity means; if a flywheel diode is built-in at two ends of the power of the DC power control device (1703), then the mentioned flywheel diode 1206 can be optionally installed;

shield diode (1707): constituted by diode or high-speed diode, for being connected in series with the DC power control device (1703) in the forward power polarity;

DC power control device (1703): constituted by electromechanical switch device, solid-state semiconductor-type switch device, or solid-state semiconductor-type linear variable impedance device, when DC power source is utilized to perform chopping control, the DC power control device (1703) is operated to perform shunt regulation of alternate chopping frequency, or shunt regulation of PWM (Pulse Width Modulation) of chopping conduction time ratio, or shunt regulation of PWM of alternate chopping frequency and chopping conduction time ratio at the same time; or the DC power control device (1703) is operated to perform shunt regulation of switch type turn-on or cut-off, or the linear impedance value of the DC power control device (1703) is regulated so as to operate the DC power control device (1703) to perform shunt regulation for the current passing through the voltage-dividing impedance component of inductive series LED (1702);

In the current regulator drive circuit shunting current by voltage-dividing load, control means of the DC power control device (1703) includes one or more than one of the following control means including: 1) being controlled through installation of the voltage detector (1704); 2) being controlled through installation of the current detector (1705); 3) being controlled through installation of the voltage detector (1704) and the current detector (1705); 4) being controlled through setting circuit to perform regular shunt to the voltage-dividing load; 5) being controlled through a manually-operated control interface device to perform shunt regulation to the voltage-dividing load; 6) being controlled through inputting external signals to perform shunt regulation to the voltage-dividing load;

when one or both of the DC voltage detector (1704) and the current detector (1705) are selected to be installed for performing shunt regulation to the DC power control device (1703), the configurations and operational functions of the voltage detector (1704) and the current detector (1705) are as followings:

voltage detector (1704): related to a voltage detector constituted by electromechanical and/or solid-state electronic components, for detecting the supply voltage, or the value of the voltage at two ends of one or both of the main load (1701) and the DC power control device (1703), or of the total load of the both connected in series, to regulate the DC power control device (1703) over the following functions, including:

if the voltage detected by the voltage detector (1704) is lower than a predetermined value, the DC power control device (1703) is operated to perform shunt regulation for increasing the current passing through the main load (1701); or if the voltage detected by the voltage detector (1704) is higher than a predetermined value, the DC power control device (1703) is operated to perform shunt regulation for decreasing the current passing through the main load (1701); and current detector (1705): related to a current detector constituted by electromechanical and/or solid-state electronic components, for detecting the value of one or more than one current passing through the main load (1701), the voltage-dividing impedance component of inductive series LED (1702) and the DC power control device (1703), to regulation the DC power control device (1703) over the following functions, including:

if the current detected by the current detector (1705) is lower than a predetermined value, the DC power control device (1703) is operated to perform shunt regulation for increasing the current passing through the main load (1701); or if the current detected by the current detector (1705) is higher than a predetermined value, the DC power control device (1703) is operated to perform shunt regulation for decreasing the current passing through the main load (1701).

Figure 18:
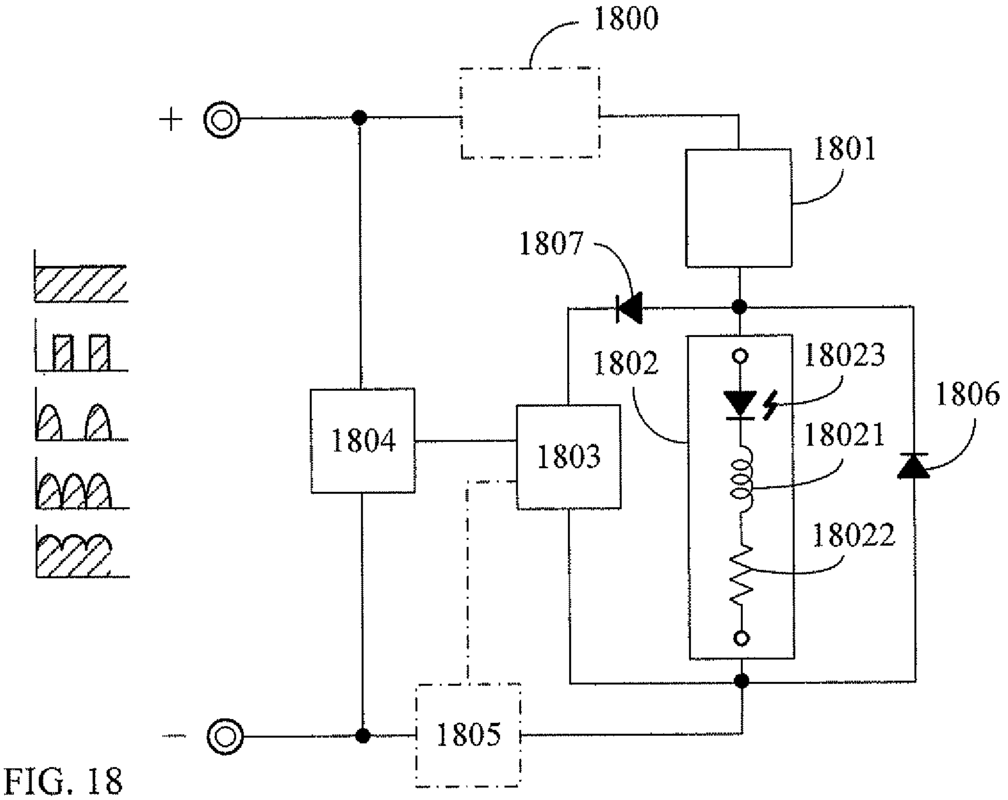
FIG. 18 is a schematic view showing the circuit blocks of the 15$^{th}$ embodiment of the present invention.

As shown in FIG. 18, which is a schematic view of the 15$^{th}$ embodiment of the present invention being applied in the main load driven by DC power source, and the impedance component of inductive series resistance and series LED serving as a voltage-dividing component and the DC power control device (1803) being further connected with the shield diode, the main components including:

current equalizing impedance (1800): related to a current equalizing impedance (1800) connected with the main load (1801) in series, which is constituted by the inductor or coil with inductive impedance, or constituted by the impedance connecting the capacitor and the inductor or coil in parallel for being in parallel resonance with the ripple frequency of the passing current, arranged to reduce the ripple value of the current passing through the current equalizing impedance (1800); the current equalizing impedance (1800) is optionally installed upon demanded;

main load (1801): related to a main load driven by DC, or pulsating DC power, which is constituted by one or more than one kind of main loads, including electrical energy to luminous energy main load, electrical energy to thermal energy main load, electrical energy to mechanical energy main load, electrical energy to chemical energy main load, or electrical energy to acoustic energy main load;

voltage-dividing impedance component of inductive series resistance and series LED (1802): constituted by one or more than one of inductive impedance component (18021), that allows DC or pulsating DC power passing through, being connected with resistance (18022) in series then connected with LED (18023) in series, and serving to be connected with the main load (1801) in series and be connected in parallel with two ends defined through the shield diode (1807) being in series connected with the DC power control device (1803) with a means of consequent to the power polarity, and allowing the DC power control device (1803) to perform parallel shunt regulation to the current passing through the voltage-dividing impedance component of inductive series resistance and series LED (1802);

flywel diode (1806): constituted by diode or high-speed diode, for being connected with two ends of the voltage-dividing impedance component of inductive series resistance and series LED (1802) in parallel with a reverse polarity means; if a flywheel diode is built-in at two ends of the power of the DC power control device (1803), then the mentioned flywheel diode (1806) can be optionally installed;

shield diode (1807): constituted by diode or high-speed diode, for being connected in series with the DC power control device (1803) in the forward power polarity;

DC power control device (1803): constituted by electromechanical switch device, solid-state semiconductor-type switch device, or solid-state semiconductor-type linear variable impedance device, when DC power source is utilized to perform chopping control, the DC power control device (1803) is operated to perform shunt regulation of alternate chopping frequency, or shunt regulation of PWM (Pulse Width Modulation) of chopping conduction time ratio, or shunt regulation of PWM of alternate chopping frequency and chopping conduction time ratio at the same time; or the DC power control device (1803) is operated to perform shunt regulation of switch type turn-on or cut-off, or the linear impedance value of the DC power control device (1803) is regulated so as to operate the DC power control device (1803) to perform shunt regulation for the current passing through the voltage-dividing impedance component of inductive series resistance and series LED (1802);

In the current regulator drive circuit shunting current by voltage-dividing load, control means of the DC power control device (1803) includes one or more than one of the following control means including: 1) being controlled through installation of the voltage detector (1804); 2) being controlled through installation of the current detector (1805); 3) being controlled through installation of the voltage detector (1804) and the current detector (1805); 4) being controlled through setting circuit to perform regular shunt to the voltage-dividing load; 5) being controlled through a manually-operated control interface device to perform shunt regulation to the voltage-dividing load; 6) being controlled through inputting external signals to perform shunt regulation to the voltage-dividing load;

when one or both of the voltage detector (1804) and the current detector (1805) are selected to be installed for performing shunt regulation to the DC power control device (1803), the configurations and operational functions of the voltage detector (1804) and the current detector (1805) are as followings:

voltage detector (1804): related to a voltage detector constituted by electromechanical and/or solid-state electronic components, for detecting the supply voltage, or the value of the voltage at two ends of one or both of the main load (1801) and the DC power control device (1803), or of the total load of the both connected in series, to regulate the DC power control device (1803) over the following functions, including:

if the voltage detected by the voltage detector (1804) is lower than a predetermined value, the DC power control device (1803) is operated to perform shunt regulation for increasing the current passing through the main load (1801); or if the voltage detected by the voltage detector (1804) is higher than a predetermined value, the DC power control device (1803) is operated to perform shunt regulation for decreasing the current passing through the main load (1801); and current detector (1805): related to a current detector constituted by electromechanical and/or solid-state electronic components, for detecting the value of one or more than one current passing through the main load (1801), the voltage-dividing impedance component of inductive series resistance and series LED (1802) and the DC power control device (1803), to regulation the DC power control device (1803) over the following functions, including:

if the current detected by the current detector (1805) is lower than a predetermined value, the DC power control device (1803) is operated to perform shunt regulation for increasing the current passing through the main load (1801); or if the current detected by the current detector (1805) is higher than a predetermined value, the DC power control device (1803) is operated to perform shunt regulation for decreasing the current passing through the main load (1801).

Figure 19:
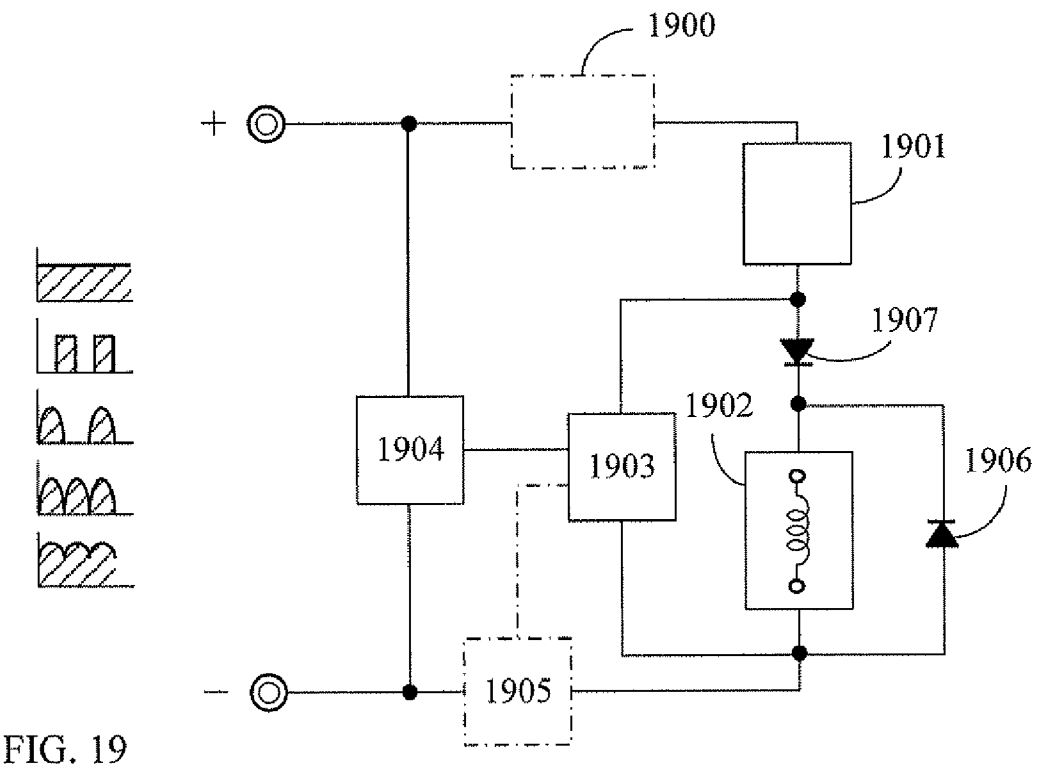
FIG. 19 is a schematic view showing the circuit blocks of the 16$^{th}$ embodiment of the present invention.

As shown in FIG. 19, which is a schematic view of the 16$^{th}$ embodiment of the present invention being applied in the main load driven by DC power source, and the inductive impedance component serving as a voltage-dividing component and being connected with the shield diode in series, the main components including:

current equalizing impedance (1900): related to a current equalizing impedance (1900) connected with the main load (1901) in series, which is constituted by the inductor or coil with inductive impedance, or constituted by the impedance connecting the capacitor and the inductor or coil in parallel for being in parallel resonance with the ripple frequency of the passing current, arranged to reduce the ripple value of the current passing through the current equalizing impedance (1900); the current equalizing impedance (1900) is optionally installed upon demanded;

main load (1901): related to a main load driven by DC or pulsating DC power, which is constituted by one or more than one kind of main loads, including electrical energy to luminous energy main load, electrical energy to thermal energy main load, electrical energy to mechanical energy main load, electrical energy to chemical energy main load, or electrical energy to acoustic energy main load;

inductive voltage-dividing impedance component (1902): constituted by one or more than one of inductive impedance component allowing DC or pulsating DC power passing through, and serving to be in series connected with the shield diode (1907) and the main load (1901) with a means of consequent to the power polarity, two ends thereof defined through being in series connected with the shield diode (1907) are connected with the DC power control device (1903) in series, and allowing the DC power control device (1903) to perform parallel shunt regulation to the current passing through inductive voltage-dividing impedance component (1902);

flywheel diode (1906): constituted by diode or high-speed diode, with a reverse polarity means for being in parallel connected with two ends defined through the Inductive voltage-dividing impedance component (1902) being in series connected with the shield diode (1907);

shield diode (1907): constituted by diode or high-speed diode, for being connected in series with the inductive voltage-dividing impedance component (1902) in the forward power polarity;

DC power control device (1903): constituted by electromechanical switch device, solid-state semiconductor-type switch device, or solid-state semiconductor-type linear variable impedance device, when DC power source is utilized to perform chopping control, the DC power control device (1903) is operated to perform shunt regulation of alternate chopping frequency, or shunt regulation of PWM (Pulse Width Modulation) of chopping conduction time ratio, or shunt regulation of PWM of alternate chopping frequency and chopping conduction time ratio at the same time; or the DC power control device (1903) is operated to perform shunt regulation of switch type turn-on or cut-off, or the linear impedance value of the DC power control device (1903) is regulated so as to operate the DC power control device (1903) to perform shunt regulation for the current passing through the inductive voltage-dividing impedance component (1902);

In the current regulator drive circuit shunting current by voltage-dividing load, control means of the DC power control device (1903) includes one or more than one of the following control means including: 1) being controlled through installation of the voltage detector (1904); 2) being controlled through installation of the current detector (1905); 3) being controlled through installation of the voltage detector (1904) and the current detector (1905); 4) being controlled through setting circuit to perform regular shunt to the voltage-dividing load; 5) being controlled through a manually-operated control interface device to perform shunt regulation to the voltage-dividing load; 6) being controlled through inputting external signals to perform shunt regulation to the voltage-dividing load;

when one or both of the voltage detector (1904) and the current detector (1905) are selected to be installed for performing shunt regulation to the DC power control device (1903), the configurations and operational functions of the voltage detector (1904) and the current detector (1905) are as followings:

voltage detector (1904): related to a voltage detector constituted by electromechanical and/or solid-state electronic components, for detecting the supply voltage, or the value of the voltage at two ends of one or both of the main load (1901) and the DC power control device (1903), or of the total load of the both connected in series, to regulate the DC power control device (1903) over the following functions, including:

if the voltage detected by the voltage detector (1904) is lower than a predetermined value, the DC power control device (1903) is operated to perform shunt regulation for increasing the current passing through the main load (1901); or if the voltage detected by the voltage detector (1904) is higher than a predetermined value, the DC power control device (1903) is operated to perform shunt regulation for decreasing the current passing through the main load (1901); and current detector (1905): related to a current detector constituted by electromechanical and/or solid-state electronic components, for detecting the value of one or more than one current passing through one or more than one of the DC main load (1901), the inductive voltage-dividing impedance component (1902) and the DC power control device (1903), to regulation the DC power control device (1903) over the following functions, including:

if the current detected by the current detector (1905) is lower than a predetermined value, the DC power control device (1903) is operated to perform shunt regulation for increasing the current passing through the main load (1901); or if the current detected by the current detector (1905) is higher than a predetermined value, the DC power control device (1903) is operated to perform shunt regulation for decreasing the current passing through the main load (1901).

Figure 20:
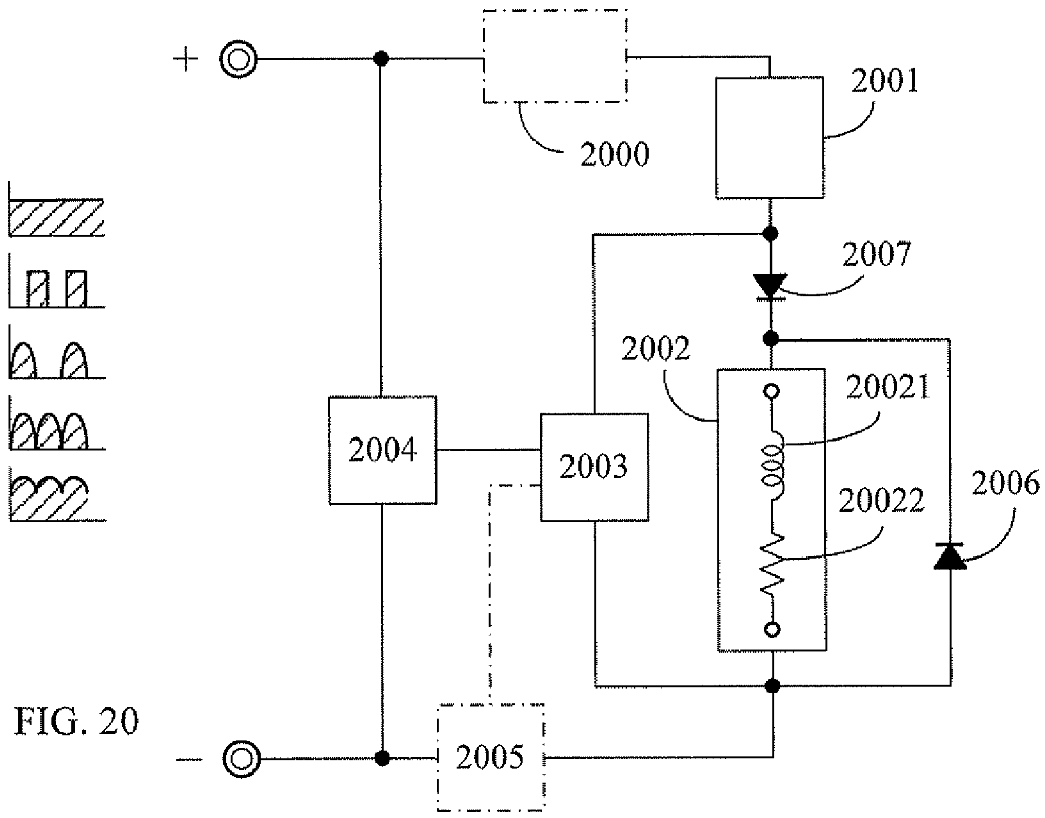
FIG. 20 is a schematic view showing the circuit blocks of the 17$^{th}$ embodiment of the present invention.

As shown in FIG. 20, which is a schematic view of the 17$^{th}$ embodiment of the present invention being applied in the main load driven by DC power source, and the impedance component of inductive series resistance serving as a voltage-dividing component and being connected with the shield diode in series, the main components including:

current equalizing impedance (2000): related to a current equalizing impedance (2000) connected with the main load (2001) in series, which is constituted by the inductor or coil with inductive impedance, or constituted by the impedance connecting the capacitor and the inductor or coil in parallel for being in parallel resonance with the ripple frequency of the passing current, arranged to reduce the ripple value of the current passing through the current equalizing impedance (2000); the current equalizing impedance (2000) is optionally installed upon demanded;

main load (2001): related to a main load driven by DC or pulsating DC power, which is constituted by one or more than one kind of main loads, including electrical energy to luminous energy main load, electrical energy to thermal energy main load, electrical energy to mechanical energy main load, electrical energy to chemical energy main load, or electrical energy to acoustic energy main load;

voltage-dividing impedance component of inductive series resistance (2002): constituted by one or more than one of inductive impedance component (20021), that allows DC or pulsating DC power passing through, being connected with resistance (20022) in series, and serving to be in series connected with the shield diode (2007) and the main load (2001) with a means of consequent to the power polarity, two ends thereof defined through being in series connected with the shield diode (2007) are connected with the DC power control device (2003) in parallel, and allowing the DC power control device (2003) to perform parallel shunt regulation to the current passing through the voltage-dividing impedance component of inductive series resistance (2002);

flywheel diode (2006): constituted by diode or high-speed diode, with a reverse polarity means for being in parallel connected with two ends defined through the voltage-dividing impedance component of inductive series resistance (2002) being in series connected with the shield diode (2007);

shield diode (2007): constituted by diode or high-speed diode, for being connected in series with the voltage-dividing impedance component of inductive series resistance (2002) in the forward power polarity;

DC power control device (2003): constituted by electromechanical switch device, solid-state semiconductor-type switch device, or solid-state semiconductor-type linear variable impedance device, when DC power source is utilized to perform chopping control, the DC power control device (2003) is operated to perform shunt regulation of alternate chopping frequency, or shunt regulation of PWM (Pulse Width Modulation) of chopping conduction time ratio, or shunt regulation of PWM of alternate chopping frequency and chopping conduction time ratio at the same time; or the DC power control device (2003) is operated to perform shunt regulation of switch type turn-on or cut-off, or the linear impedance value of the DC power control device (2003)

is regulated so as to operate the DC power control device (2003) to perform shunt regulation for the current passing through the voltage-dividing impedance component of inductive series resistance (2002);

In the current regulator drive circuit shunting current by voltage-dividing load, control means of the DC power control device (2003) includes one or more than one of the following control means including: 1) being controlled through installation of the voltage detector (2004); 2) being controlled through installation of the current detector (2005); 3) being controlled through installation of the voltage detector (2004) and the current detector (2005); 4) being controlled through setting circuit to perform regular shunt to the voltage-dividing load; 5) being controlled through a manually-operated control interface device to perform shunt regulation to the voltage-dividing load; 6) being controlled through inputting external signals to perform shunt regulation to the voltage-dividing load;

when one or both of the voltage detector (2004) and the current detector (2005) are selected to be installed for performing shunt regulation to the DC power control device (2003), the configurations and operational functions of the voltage detector (2004) and the current detector (2005) are as followings:

voltage detector (2004): related to a voltage detector constituted by electromechanical and/or solid-state electronic components, for detecting the supply voltage, or the value of the voltage at two ends of one or both of the main load (2001) and the DC power control device (2003), or of the total load of the both connected in series, to regulate the DC power control device (2003) over the following functions, including:

if the voltage detected by the voltage detector (2004) is lower than a predetermined value, the DC power control device (2003) is operated to perform shunt regulation for increasing the current passing through the main load (2001); or if the voltage detected by the voltage detector (2004) is higher than a predetermined value, the DC power control device (2003) is operated to perform shunt regulation for decreasing the current passing through the main load (2001); and current detector (2005): related to a current detector constituted by electromechanical and/or solid-state electronic components, for detecting the value of one or more than one current passing through the main load (2001), the voltage-dividing impedance component of inductive series resistance (2002) and the DC power control device (2003), to regulation the DC power control device (2003) over the following functions, including:

if the current detected by the current detector (2005) is lower than a predetermined value, the DC power control device (2003) is operated to perform shunt regulation for increasing the current passing through the main load (2001); or if the current detected by the current detector (2005) is higher than a predetermined value, the DC power control device (2003) is operated to perform shunt regulation for decreasing the current passing through the main load (2001).

Figure 21:
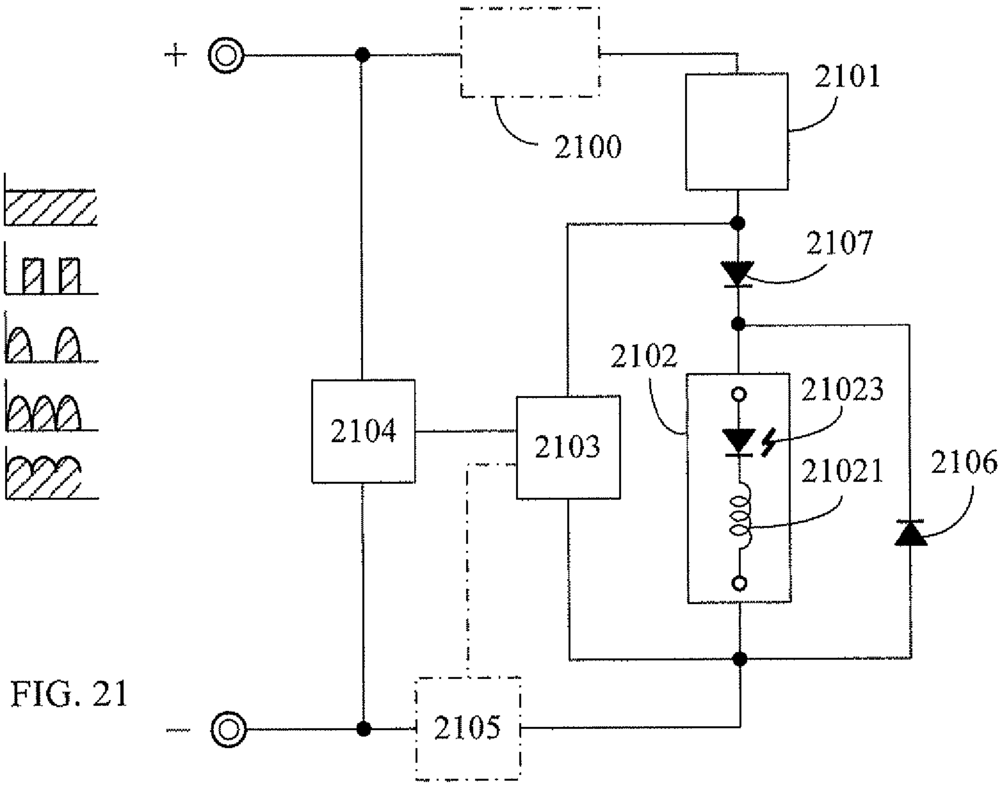
FIG. 21 is a schematic view showing the circuit blocks of the 18$^{th}$ embodiment of the present invention.

As shown in FIG. 21, which is a schematic view of the 18$^{th}$ embodiment of the present invention being applied in the main load driven by DC power source, and the impedance component of inductive series LED serving as a voltage-dividing component and being connected with shield diode in series, the main components including:

current equalizing impedance (2100): related to a current equalizing impedance (2100) connected with the main load (2101) in series, which is constituted by the inductor or coil with inductive impedance, or constituted by the impedance connecting the capacitor and the inductor or coil in parallel for being in parallel resonance with the ripple frequency of the passing current, arranged to reduce the ripple value of the current passing through the current equalizing impedance (2100); the current equalizing impedance (2100) is optionally installed upon demanded;

main load (2101): related to a main load driven by DC or pulsating DC power, which is constituted by one or more than one kind of main loads, including electrical energy to luminous energy main load, electrical energy to thermal energy main load, electrical energy to mechanical energy main load, electrical energy to chemical energy main load, or electrical energy to acoustic energy main load;

voltage-dividing impedance component of inductive series LED (2102): constituted by one or more than one of inductive impedance component (21021), that allows DC or pulsating DC power passing through, being connected with LED (21023) in series, and serving to be in series connected with the shield diode (2107) and the main load (2101) with a means of consequent to the power polarity, two ends thereof defined through being in series connected with the shield diode (2107) are connected with the DC power control device (2103) in parallel, and allowing the DC power control device (2103) to perform parallel shunt regulation to the current passing through the voltage-dividing impedance component of inductive series LED (2102);

flywheel diode (2106): constituted by diode or high-speed diode, with a reverse polarity means for being in parallel connected with two ends defined through the voltage-dividing impedance component of inductive series LED (2102) being in series connected with the shield diode (2107);

shield diode (2107): constituted by diode or high-speed diode, for being connected in series with the voltage-dividing impedance component of inductive series LED (2102) in the forward power polarity;

DC power control device (2103): constituted by electromechanical switch device, solid-state semiconductor-type switch device, or solid-state semiconductor-type linear variable impedance device, when DC power source is utilized to perform chopping control, the DC power control device (2103) is operated to perform shunt regulation of alternate chopping frequency, or shunt regulation of PWM (Pulse Width Modulation) of chopping conduction time ratio, or shunt regulation of PWM of alternate chopping frequency and chopping conduction time ratio at the same time; or the DC power control device (2103) is operated to perform shunt regulation of switch type turn-on or cut-off, or the linear impedance value of the DC power control device (2103) is regulated so as to operate the DC power control device (2103) to perform shunt regulation for the current passing through the voltage-dividing impedance component of inductive series LED (2102);

In the current regulator drive circuit shunting current by voltage-dividing load, control means of the DC power control device (2103) includes one or more than one of the following control means including: 1) being controlled through installation of the voltage detector (2104); 2) being controlled through installation of the current detector (2105); 3) being controlled through installation of the voltage detector (2104) and the current detector (2105); 4) being controlled through setting circuit to perform regular shunt to the voltage-dividing load; 5) being controlled through a manually-operated control interface device to perform shunt regulation to the voltage-dividing load; 6) being controlled through inputting external signals to perform shunt regulation to the voltage-dividing load;

when one or both of the voltage detector (2104) and the current detector (2105) are selected to be installed for performing shunt regulation to the DC power control device (2103), the configurations and operational functions of the voltage detector (2104) and the current detector (2105) are as followings:

voltage detector (2104): related to a voltage detector constituted by electromechanical and/or solid-state electronic components, for detecting the supply voltage, or the value of the voltage at two ends of one or both of the main load (2101) and the DC power control device (2103), or of the total load of the both connected in series, to regulate the DC power control device (2103) over the following functions, including:

if the voltage detected by the voltage detector (2104) is lower than a predetermined value, the DC power control device (2103) is operated to perform shunt regulation for increasing the current passing through the main load (2101); or if the voltage detected by the voltage detector (2104) is higher than a predetermined value, the DC power control device (2103) is operated to perform shunt regulation for decreasing the current passing through the main load (2101); and current detector (2105): related to a current detector constituted by electromechanical and/or solid-state electronic components, for detecting the value of one or more than one current passing through the main load (2101), the voltage-dividing impedance component of inductive series LED (2102) and the DC power control device (2103), to regulation the DC power control device (2103) over the following functions, including:

if the current detected by the current detector (2105) is lower than a predetermined value, the DC power control device (2103) is operated to perform shunt regulation for increasing the current passing through the main load (2101); or if the current detected by the current detector (2105) is higher than a predetermined value, the DC power control device (2103) is operated to perform shunt regulation for decreasing the current passing through the main load (2101).

Figure 22:
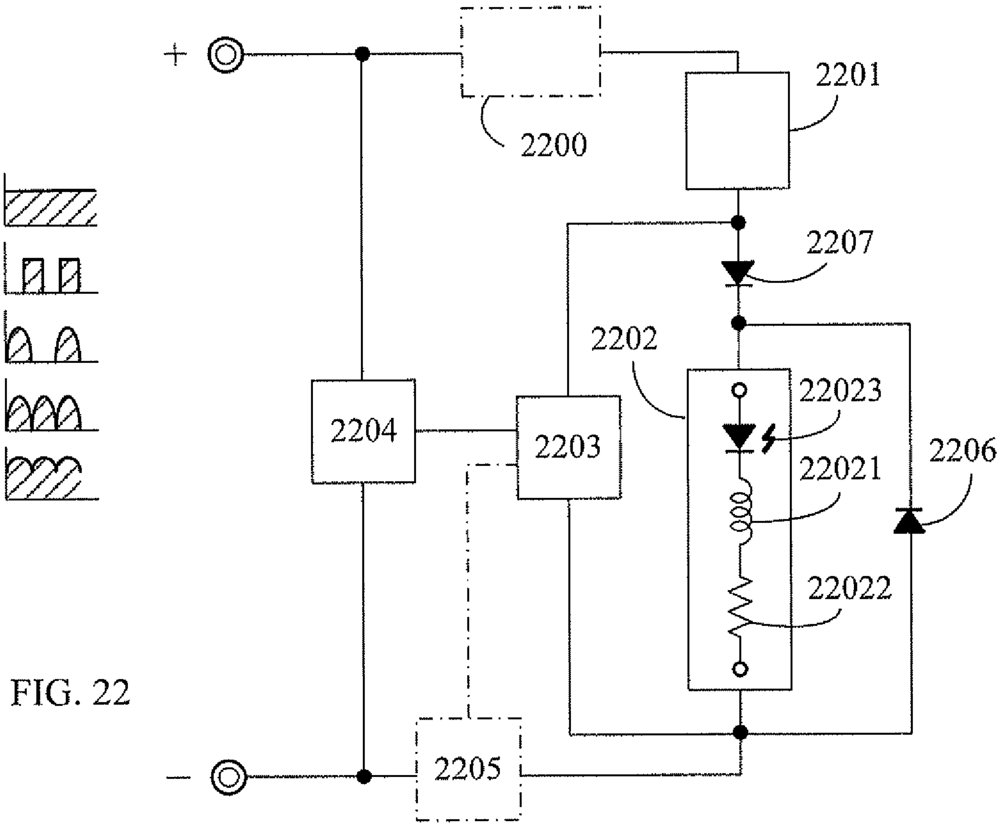
FIG. 22 is a schematic view showing the circuit blocks of the 19$^{th}$ embodiment of the present invention.

As shown in FIG. 22, which is a schematic view of the 19$^{th}$ embodiment of the present invention being applied in the main load driven by DC power source, and the impedance component of inductive series resistance and series LED serving as a voltage-dividing component and being connected with the shield diode in series, the main components including:

current equalizing impedance (2200): related to a current equalizing impedance (2200) connected with the main load (2201) in series, which is constituted by the inductor or coil with inductive impedance, or constituted by the impedance connecting the capacitor and the inductor or coil in parallel for being in parallel resonance with the ripple frequency of the passing current, arranged to reduce the ripple value of the current passing through the current equalizing impedance (2200); the current equalizing impedance (2200) is optionally installed upon demanded;

main load (2201): related to a main load driven by DC or pulsating DC power, which is constituted by one or more than one kind of main loads, including electrical energy to luminous energy main load, electrical energy to thermal energy main load, electrical energy to mechanical energy main load, electrical energy to chemical energy main load, or electrical energy to acoustic energy main load;

voltage-dividing impedance component of inductive series resistance (2002): constituted by one or more than one of inductive impedance component (20021), that allows DC or pulsating DC power passing through, being connected with resistance (20022) and LED (22023) in series, and serving to be in series connected with the shield diode (2207) and the main load (2201) with a means of consequent to the power polarity, two ends thereof defined through being in series connected with the shield diode (2207) are connected with the DC power control device (2203) in parallel, and allowing the DC power control device (2203) to perform parallel shunt regulation to the current passing through the voltage-dividing impedance component of inductive series resistance and series LED (2202);

flywheel diode (2206): constituted by diode or high-speed diode, with a reverse polarity means for being in parallel connected with two ends defined through the voltage-dividing impedance component of inductive series resistance and series LED (2202) being in series connected with the shield diode (2207);

shield diode (2207): constituted by diode or high-speed diode, for being connected in series with the voltage-dividing impedance component of inductive series resistance and series LED (2202) in the forward power polarity;

DC power control device (2203): constituted by electromechanical switch device, solid-state semiconductor-type switch device, or solid-state semiconductor-type linear variable impedance device, when DC power source is utilized to perform chopping control, the DC power control device (2203) is operated to perform shunt regulation of alternate chopping frequency, or shunt regulation of PWM (Pulse Width Modulation) of chopping conduction time ratio, or shunt regulation of PWM of alternate chopping frequency and chopping conduction time ratio at the same time; or the DC power control device (2203) is operated to perform shunt regulation of switch type turn-on or cut-off, or the linear impedance value of the DC power control device (2203) is regulated so as to operate the DC power control device (2203) to perform shunt regulation for the current passing through the voltage-dividing impedance component of inductive series resistance and series LED (2202);

In the current regulator drive circuit shunting current by voltage-dividing load, control means of the DC power control device (2203) includes one or more than one of the following control means including: 1) being controlled through installation of the voltage detector (2204); 2) being controlled through installation of the current detector (2205); 3) being controlled through installation of the voltage detector (2204) and the current detector (2205); 4) being controlled through setting circuit to perform regular shunt to the voltage-dividing load; 5) being controlled through a manually-operated control interface device to perform shunt regulation to the voltage-dividing load; 6) being controlled through inputting external signals to perform shunt regulation to the voltage-dividing load;

when one or both of the voltage detector (2204) and the current detector (2205) are selected to be installed for performing shunt regulation to the DC power control device (2203), the configurations and operational functions of the voltage detector (2204) and the current detector (2205) are as followings:

voltage detector (2204): related to a voltage detector constituted by electromechanical and/or solid-state electronic components, for detecting the supply voltage, or the value of the voltage at two ends of one or both of the main load (2201) and the DC power control device (2203), or of the total load of the both connected in series, to regulate the DC power control device (2203) over the following functions, including:

if the voltage detected by the voltage detector (2204) is lower than a predetermined value, the DC power control device (203) is operated to perform shunt regulation for increasing the current passing through the main load (2201); or if the voltage detected by the voltage detector (2204) is higher than a predetermined value, the DC power control device (2203) is operated to perform shunt regulation for decreasing the current passing through the main load (2201); and current detector (2205): related to a current detector constituted by electromechanical and/or solid-state electronic components, for detecting the value of one or more than one current passing through the main load (2201), the voltage-dividing impedance component of inductive series registance and series LED (2202) and the DC power control device (2203), to regulation the DC power control device (2203) over the following functions, including:

if the current detected by the current detector (2205) is lower than a predetermined value, the DC power control device (2203) is operated to perform shunt regulation for increasing the current passing through the main load (2201); or if the current detected by the current detector (2205) is higher than a predetermined value, the DC power control device (2203) is operated to perform shunt regulation for decreasing the current passing through the main load (2201).

The invention claimed is:

1. A current regulator drive circuit shunting current by voltage-dividing load, wherein a main load and a voltage-dividing load connect in series; and a power control unit, which is served to perform regular shunt or manual control, control through inputting external signals, or feedback control through detected signals detected by a voltage detector and/or a current detector to the voltage-dividing load, connects in parallel with the voltage-dividing load for performing shunt regulation, the main components including:

current equalizing impedance (100): related to a current equalizing impedance (100) connected with the main load (101) in series, which is constituted by the inductor or coil with inductive impedance, or constituted by the impedance connecting the capacitor and the inductor or coil in parallel for being in parallel resonance with the ripple frequency of the passing current, arranged to reduce the ripple value of the current passing through the current equalizing impedance (100); the current equalizing impedance (100) is optionally installed upon demanded;

main load (101): related to a main load driven by AC, DC, or pulsating DC power, which is constituted by one or more than one kind of main loads, including electric energy to luminous energy main load, electric energy to thermal energy main load, electrical energy to mechanical energy main load, electrical energy to chemical energy main load, or electrical energy to acoustic energy main load;

voltage-dividing load (102): related to a voltage-dividing load, which is same or different with the main load (101), driven by AC, DC, or pulsating DC power, constituted by one or more than one kind of voltage-dividing loads including electric energy to luminous energy voltage-dividing load, electric energy to thermal energy voltage-dividing load, electrical energy to mechanical energy voltage-dividing load, electrical energy to chemical energy voltage-dividing load, or electrical energy to acoustic energy voltage-dividing load, connected with the main load (101) in series, and connected with the power control unit (103) in parallel, for being driven by electric energy, and for the current passing through the voltage-dividing load (102) to be shunted regulation by the power control unit (103);

power control unit (103): constituted by electromechanical switch device, solid-state semiconductor-type switch device, or solid-state semiconductor-type linear variable impedance device; when DC power source is utilized to perform chopping control, the power control unit (103) is operated to perform shunt regulation of alternate chopping frequency, or shunt regulation of PWM (Pulse Width Modulation) of chopping conduction time ratio, or shunt regulation of PWM of alternate chopping frequency and chopping conduction time ratio at the same time; when a two-way periodical alternate polarity power source is used, the power control unit (103) is operated to perform shunt regulation of conductive phase angle; when an DC power source or two-way periodical alternate polarity power source is used, the power control unit (103) is operated to perform shunt regulation of switch type turn-on or cut-off, or the linear impedance value of the power control unit (103) is regulated so as to operate the power control unit (103) to perform shunt regulation to the current passing through the voltage-dividing load (102);

wherein in the current regulator drive circuit shunting current by voltage-dividing load, control means of the power control unit (103) includes one or more than one of the following control means including: 1) being controlled through installation of the voltage detector (104); 2) being controlled through installation of the current detector (105); 3) being controlled through installation of the voltage detector (104) and the current detector (105); 4) being controlled through setting circuit to perform regular shunt to the voltage-dividing load; 5) being controlled through a manually-operated control interface device to perform shunt regulation to the voltage-dividing load; 6) being controlled through inputting external signals to perform shunt regulation to the voltage-dividing load.

2. The current regulator drive circuit shunting current by voltage-dividing load according to claim 1, when one or both of the voltage detector (104) and the current detector (105) are selected to be installed for performing shunt regulation to the power control unit (103), the configurations and operational functions of the voltage detector (104) and the current detector (105) are as follows:

voltage detector (104): related to a voltage detector constituted by electromechanical and/or solid-state electronic components, for detecting the supply voltage, or the value of the voltage at two ends of one or both of the main load (101) and the power control unit (103), or of the total load of the both connected in series, to regulate the power control unit (103) over the following functions, including:

if the voltage detected by the voltage detector (104) is lower than a predetermined value, the power control unit (103) is operated to perform shunt regulation for increasing the current passing through the main load (101); or if the voltage detected by the voltage detector (104) is higher than a predetermined value, the power control unit (103) is operated to perform shunt regulation for decreasing the current passing through the main load (101); and current detector (105): related to a current detector constituted by electromechanical and/or solid-state electronic components, for detecting the value of one or more than one current passing through the main load (101), the voltage-dividing load (102) and the power control unit (103), to regulate the power control unit (103) over the following functions, including:

if the current detected by the current detector (105) is lower than a predetermined value, the power control unit (103) is operated to perform shunt regulation for increasing the current passing through the main load (101); or if the current detected by the current detector (105) is higher than a predetermined value, the power control unit (103) is operated to perform shunt regulation for decreasing the current passing through the main load (101).

3. The current regulator drive circuit shunting current by voltage-dividing load according to claim 1, wherein the circuit is applied to the DC power source, the main components including:

current equalizing impedance (200): related to a current equalizing impedance (200) connected with the DC main load (201) in series, which is constituted by the inductor or coil with inductive impedance, or constituted by the impedance connecting the capacitor and the inductor or coil in parallel for being in parallel resonance with the ripple frequency of the passing current, arranged to reduce the ripple value of the current passing through the current equalizing impedance (200); the current equalizing impedance (200) is optionally installed upon demanded;

DC main load (201): related to a main load driven by DC or pulsating DC power, which is constituted by one or more than one kind of main loads, including DC electric energy to luminous energy main load, DC electric energy to thermal energy main load, DC electrical energy to mechanical energy main load, DC electrical energy to chemical energy main load, or DC electrical energy to acoustic energy main load;

DC voltage-dividing load (202): related to a voltage-dividing load, which is same or different with the DC main load (201), driven by DC or pulsating DC power, constituted by one or more than one kind of voltage-dividing loads including DC electric energy to luminous energy voltage-dividing load, DC electric energy to thermal energy voltage-dividing load, DC electrical energy to mechanical energy voltage-dividing load, DC electrical energy to chemical energy voltage-dividing load, or DC electrical energy to acoustic energy voltage-dividing load, connected with the DC main load (201) in series, and connected with the DC power control device (203) in parallel, for being driven by electric energy, and for the current passing through the DC voltage-dividing load (202) to be shunted regulation by the DC power control device (203);

DC power control device (203): constituted by electromechanical switch device, solid-state semiconductor-type switch device, or solid-state semiconductor-type linear variable impedance device, when DC power source is utilized to perform chopping control, the DC power control device (203) is operated to perform shunt regulation of alternate chopping frequency, or shunt regulation of PWM (Pulse Width Modulation) of chopping conduction time ratio, or shunt regulation of PWM of alternate chopping frequency and chopping conduction time ratio at the same time; or the DC power control device (203) is operated to perform shunt regulation of switch type turn-on or cut-off, or the linear impedance value of the DC power control device (203) is regulated so as to operate the DC power control device (203) to perform shunt regulation for the current passing through the DC voltage-dividing load (202);

wherein in the current regulator drive circuit shunting current by voltage-dividing load, control means of the DC power control device (203) includes one or more than one of the following control means including: 1) being controlled through installation of the DC voltage detector (204); 2) being controlled through installation of the DC current detector (205); 3) being controlled through installation of the DC voltage detector (204) and the DC current detector (205); 4) being controlled through setting circuit to perform regular shunt to the voltage-dividing load; 5) being controlled through a manually-operated control interface device to perform shunt regulation to the voltage-dividing load; 6) being controlled through inputting external signals to perform shunt regulation to the voltage-dividing load.

4. The current regulator drive circuit shunting current by voltage-dividing load according to claim 3, when one or both of the DC voltage detector (204) and the DC current detector (205) are selected to be installed for performing shunt regulation to the DC power control unit (203), the configurations and operational functions of the DC voltage detector (204) and the DC current detector 205 are as follows:

DC voltage detector (204): related to a DC voltage detector constituted by electromechanical and/or solid-state electronic components, for detecting the DC supply voltage, or the value of the voltage at two ends of one or both of the DC main load (201) and the DC power control device (203), or of the total load of the both connected in series, to regulate the DC power control device (203) over the following functions, including:

if the voltage detected by the DC voltage detector (204) is lower than a predetermined value, the DC power control device (203) is operated to perform shunt regulation for increasing the current passing through the DC main load (201); or if the voltage detected by the DC voltage detector (204) is higher than a predetermined value, the DC power control device (203) is operated to perform shunt regulation for decreasing the current passing through the DC main load (201); and DC current detector (205): related to a DC current detector constituted by electromechanical and/or solid-state electronic components, for detecting the value of one or more than one current passing through the DC main load (201), the DC voltage-dividing load (202) and the DC power control device (203), to regulation the DC power control device (203) over the following functions, including:

if the current detected by the DC current detector (205) is lower than a predetermined value, the DC power control device (203) is operated to perform shunt regulation for increasing the current passing through the DC main load (201); or if the current detected by the DC current detector (205) is higher than a predetermined value, the DC power control device (203) is operated to perform shunt regulation for decreasing the current passing through the DC main load (201).

5. The current regulator drive circuit shunting current by voltage-dividing load according to claim 1, wherein the circuit is applied to the AC power source, the main components including:

current equalizing impedance (300): related to a current equalizing impedance (300) connected with the AC main load (301) in series, which is constituted by the inductor or coil with inductive impedance, or constituted by the impedance connecting the capacitor and the inductor or coil in parallel for being in parallel resonance with the ripple frequency of the passing current, arranged to reduce the ripple value of the current passing through the current equalizing impedance (300); the current equalizing impedance (300) is optionally installed upon demanded;

AC main load (301): related to a main load driven by AC power, including one or more than one kind of main loads including AC electric energy to luminous energy main load, AC electric energy to thermal energy main load, AC electrical energy to mechanical energy main load, AC electrical energy to chemical energy main load, or AC electrical energy to acoustic energy main load;

AC voltage-dividing load (302): related to a voltage-dividing load, which is same or different with the AC main load (301), driven by AC power, constituted by one or more than one kind of voltage-dividing loads including AC electric energy to luminous energy voltage-dividing load, AC electric energy to thermal energy voltage-dividing load, AC electrical energy to mechanical energy voltage-dividing load, AC electrical energy to chemical energy voltage-dividing load, or AC electrical energy to acoustic energy voltage-dividing load, connected with the AC main load (301) in series, and connected with the AC power control device (303) in parallel, for being driven by electric energy, and for the current passing through the AC voltage-dividing load (302) to be shunted regulation by the AC power control device (303);

AC power control device (303): constituted by electromechanical switch device, solid-state semiconductor-type switch device, or solid-state semiconductor-type linear variable impedance device, for being controlled by the AC power control device (303) to perform shunt regulation of conductive phase angle, or shunt regulation of switch type turn-on or cut-off, or the linear impedance value of the AC power control device (303) is regulated to perform shunt regulation for the current passing through the AC voltage-dividing load (302);

wherein in the current regulator drive circuit shunting current by voltage-dividing load, control means of the AC power control device (303) includes one or more than one of the following control means including: 1) being controlled through installation of the AC voltage detector (304); 2) being controlled through installation of the AC current detector (305); 3) being controlled through installation of the AC voltage detector (304) and the AC current detector (305); 4) being controlled through setting circuit to perform regular shunt to the voltage-dividing load; 5) being controlled through a manually-operated control interface device to perform shunt regulation to the voltage-dividing load; 6) being controlled through inputting external signals to perform shunt regulation to the voltage-dividing load.

6. The current regulator drive circuit shunting current by voltage-dividing load according to claim 5, when one or both of the AC voltage detector (304) and the AC current detector (305) are selected to be installed for performing shunt regulation to the AC power control unit (303), the configurations and operational functions of the AC voltage detector (304) and the AC current detector (305) are as follows:

AC voltage detector (304): related to a AC voltage detector constituted by electromechanical and/or solid-state electronic components, for detecting the AC supply voltage, or the value of the voltage at two ends of one or both of the AC main load (301) and the AC power control device (303), or of the total load of the both connected in series, to regulate the AC power control device (303) over the following functions, including:

if the voltage detected by the AC voltage detector (304) is lower than a predetermined value, the AC power control unit (303) is operated to perform shunt regulation for increasing the current passing through the AC main load (301); or if the voltage detected by the AC voltage detector (304) is higher than a predetermined value, the AC power control unit (303) is operated to perform shunt regulation for decreasing the current passing through the AC main load (301); and AC current detector (305): related to a current detector constituted by electromechanical and/or solid-state electronic components, for detecting the value of one or more than one current passing through the AC main load (301), the AC voltage-dividing load (302) and the AC power control unit (303), to regulate the AC power control unit (303) over the following functions, including:

if the current detected by the AC current detector (305) is lower than a predetermined value, the AC power control unit (303) is operated to perform shunt regulation for increasing the current passing through the AC main load (301); or if the current detected by the AC current detector (305) is higher than a predetermined value, the AC power control unit (303) is operated to perform shunt regulation for decreasing the current passing through the AC main load (301);

the current regulator drive circuit shunting current by voltage-dividing load of the present invention is widely applied to the load driven by various types of electric energy, the common application cases provided as following.

7. The current regulator drive circuit shunting current by voltage-dividing load according to claim 1, wherein the circuit is applied to the light-emitting diode (LED) driven by DC power source, the main components including:

current equalizing impedance (400): related to a current equalizing impedance (400) connected with the main light-emitting diode (LED) (401) in series, which is constituted by the inductor or coil with inductive impedance, or constituted by the impedance connecting the capacitor and the inductor or coil in parallel for being in parallel resonance with the ripple frequency of the passing current, arranged to reduce the ripple value of the current passing through the current equalizing impedance (400); the current equalizing impedance (400) is optionally installed upon demanded;

main light-emitting diode (LED) (401): constituted by one or more LEDs connected in series, connected in parallel, or connected in series-parallel, for being driven by DC power or pulsating DC power;

voltage-dividing light-emitting diode (LED) (402): constituted by one or more LEDs connected in series, connected in parallel, or connected in series-parallel, to be connected with the main light-emitting diode (LED) (401) in series, and to be connected with DC power control device (403) in parallel, for being driven by DC power or pulsating DC power, and for the current passing through the voltage-dividing light-emitting diode (LED) (402) to be shunted regulation by the DC power control device (403);

DC power control device (403): constituted by electromechanical switch device, solid-state semiconductor-type switch device, or solid-state semiconductor-type linear variable impedance device, to be connected with two ends of the voltage-dividing light-emitting diode (LED) (402) in parallel; when DC power source is utilized to perform chopping control, the DC power control device 403 is operated to perform shunt regulation of alternate chopping frequency, or shunt regulation of PWM (Pulse Width Modulation) of chopping conduction time ratio, or shunt regulation of PWM of alternate chopping frequency and chopping conduction time ratio at the same time; or the DC power control device 403 is operated to perform shunt regulation of switch type turn-on or cut-off, or the linear impedance value of the DC power control device 403 is regulated so as to operate the DC power control device 403 to perform shunt regulation for the current passing through the voltage-dividing light-emitting diode (LED) (402);

wherein in the current regulator drive circuit shunting current by voltage-dividing load, control means of the DC power control device (403) includes one or more than one of the following control means including: 1) being controlled through installation of the voltage detector (404); 2) being controlled through installation of the current detector (405); 3) being controlled through installation of the voltage detector (404) and the current detector (405); 4) being controlled through setting circuit to perform regular shunt to the voltage-dividing load; 5) being controlled through a manually-operated control interface device to perform shunt regulation to the voltage-dividing load; 6) being controlled through inputting external signals to perform shunt regulation to the voltage-dividing load.

8. The current regulator drive circuit shunting current by voltage-dividing load according to claim 7, when one or both of the voltage detector (404) and the current detector (405) are selected to be installed for performing shunt regulation to the DC power control device (403), the configurations and operational functions of the voltage detector (404) and the current detector (405) are as follows:

voltage detector (404): related to a DC voltage detector constituted by electromechanical and/or solid-state electronic components, for detecting the DC supply voltage, or the value of the voltage at two ends of one or both of the main light-emitting diode (LED) (401) and the DC power control device (403), or of the total load of the both connected in series, to regulate the DC power control device (403) over the following functions, including:

if the voltage detected by the voltage detector (404) is lower than a predetermined value, the DC power control device (403) is operated to perform shunt regulation for increasing the current passing through the main light-emitting diode (LED) (401); or if the voltage detected by the voltage detector (404) is higher than a predetermined value, the DC power control device (403) is operated to perform shunt regulation for decreasing the current passing through main light-emitting diode (LED) (401); and current detector (405): related to a current detector constituted by electromechanical and/or solid-state electronic components, for detecting the value of one or more than one current passing through the main light-emitting diode (LED) (401), the voltage-dividing light-emitting diode (LED) (402) and the DC power control device (403), to regulation the DC power control device (403) over the following functions, including:

if the current detected by the current detector (405) is lower than a predetermined value, the DC power control device (403) is operated to perform shunt regulation for increasing the current passing through the main light-emitting diode (LED) (401); or if the current detected by the current detector (405) is higher than a predetermined value, the DC power control device (203) is operated to perform shunt regulation for decreasing the current passing through the main light-emitting diode (LED) (401).

9. The current regulator drive circuit shunting current by voltage-dividing load according to claim 1, wherein a AC LED driven by AC power source, the main components including:

current equalizing impedance (500): related to a current equalizing impedance (500) connected with the AC main light-emitting diode (LED) (501) in series, which is constituted by the inductor or coil with inductive impedance, or constituted by the impedance connecting the capacitor and the inductor or coil in parallel for being in parallel resonance with the ripple frequency of the passing current, arranged to reduce the ripple value of the current passing through the current equalizing impedance (500); the current equalizing impedance (500) is optionally installed upon demanded;

AC main light-emitting diode (LED) (501): constituted by one or more AC LEDs connected in series, connected in parallel, or connected in series-parallel, in which AC LED is constituted by two or more LEDs parallel connected in reverse polarity, for being driven by AC power;

AC voltage-dividing light-emitting diode (LED) (502): constituted by one or more AC LEDs connected in series, connected in parallel, or connected in series-parallel, in which AC LED is constituted by two or more LEDs parallel connected in reverse polarity, to be connected with the AC main light-emitting diode (LED) (501) in series, and to be connected with AC power control device (503) in parallel, for being driven by AC power, and for the current passing through the AC voltage-dividing light-emitting diode (LED) (502) to be shunted regulation by the AC power control device (503);

AC power control device (503): constituted by electromechanical switch device, solid-state semiconductor-type switch device, or solid-state semiconductor-type linear variable impedance device, to be connected with two ends of the AC voltage-dividing light-emitting diode (LED) (502) in parallel, for being controlled by the AC power control device (503), to perform shunt regulation of conductive phase angle, or shunt regulation of switch type turn-on or cut-off, or the linear impedance value of the AC power control device (503) is regulated to perform shunt regulation for the current passing through the AC voltage-dividing light-emitting diode (LED) (502);

wherein in the current regulator drive circuit shunting current by voltage-dividing load, control means of the AC power control unit (503) includes one or more than one of the following control means including:

1) being controlled through installation of the AC voltage detector (504); 2) being controlled through installation of the AC current detector (505); 3) being controlled through installation of the AC voltage detector (504) and the AC current detector (505); 4) being controlled through setting circuit to perform regular shunt to the voltage-dividing load; 5) being controlled through a manually-operated control interface device to perform shunt regulation to the voltage-dividing load; 6) being controlled through inputting external signals to perform shunt regulation to the voltage-dividing load.

10. The current regulator drive circuit shunting current by voltage-dividing load according to claim 9, when one or both of the AC voltage detector (504) and the AC current detector (505) are selected to be installed for performing shunt regulation to the AC power control unit (503), the configurations and operational functions of the AC voltage detector (504) and the AC current detector (505) are as follows:

AC voltage detector (504): related to a AC voltage detector constituted by electromechanical and/or solid-state electronic components, for detecting the AC supply voltage, or the value of the voltage at two ends of one of the AC main light-emitting diode (LED) (501) and the AC power control device (503), or of the total load of the both connected in series, to regulate the AC power control device (503) over the following functions, including:

if the voltage detected by the AC voltage detector (504) is lower than a predetermined value, the AC power control device (503) is operated to perform shunt regulation for increasing the current passing through the AC main light-emitting diode(LED) (501); or if the voltage detected by the AC voltage detector (504) is higher than a predetermined value, the AC power control device (503) is operated to perform shunt regulation for decreasing the current passing through the AC main light-emitting diode(LED) (501); and AC current detector (505): related to a current detector constituted by electromechanical and/or solid-state electronic components, for detecting the value of one or more than one current passing through the AC main light-emitting diode(LED) (502) and the AC power control device (503), to regulate the AC power control unit (503) over the following functions, including:

if the current detected by the AC current detector (505) is lower than a predetermined value, the AC power control device (503) is operated to perform shunt regulation for increasing the current passing through the AC main light-emitting diode (LED)(501); or if the current detected by the AC current detector (505) is higher than a predetermined value, the AC power control device (503) is operated to perform shunt regulation for decreasing the current passing through the AC main light-emitting diode (LED)(501).

11. The current regulator drive circuit shunting current by voltage-dividing load according to claim 1, wherein the circuit is applied to electrothermal device driven by AC or DC power source, the main components including:

current equalizing impedance (600): related to a current equalizing impedance (600) connected with the electrothermal main load (601) in series, which is constituted by the inductor or coil with inductive impedance, or constituted by the impedance connecting the capacitor and the inductor or coil in parallel for being in parallel resonance with the ripple frequency of the passing current, arranged to reduce the ripple value of the current passing through the current equalizing impedance (600); the current equalizing impedance (600) is optionally installed upon demanded;

electrothermal main load (601): related to a AC or DC power driven main load, which converts electric energy to thermal energy;

electrothermal voltage-dividing load (602): constituted by a AC or DC power driven electrothermal voltage-dividing load, which converts electric energy to thermal energy, to be connected with the electrothermal main load (601) in series, and connected with the power control unit (603) in parallel, for being driven by electric energy, and for the current passing through the electrothermal voltage-dividing load (602) to be shunted regulation by the power control unit (603);

power control unit (603): constituted by electromechanical switch device, solid-state semiconductor-type switch device, or solid-state semiconductor-type linear variable impedance device; when DC power source is utilized to perform chopping control, the power control unit (603) is operated to perform shunt regulation of alternate chopping frequency, or shunt regulation of PWM (Pulse Width Modulation) of chopping conduction time ratio, or shunt regulation of PWM of alternate chopping frequency and chopping conduction time ratio at the same time; when a two-way periodical alternate polarity power source is used, the power control unit (603) is operated to perform shunt regulation of conductive phase angle; when an DC power source or two-way periodical alternate polarity power source is used, the power control unit (603) is operated to perform shunt regulation of switch type turn-on or cut-off, or the linear impedance value of the power control unit (603) is regulated so as to operate the power control unit (603) to perform shunt regulation to the current passing through the electrothermal voltage-dividing load (602);

wherein in the current regulator drive circuit shunting current by voltage-dividing load, control means of the power control unit (603) includes one or more than one of the following control means including: 1) being controlled through installation of the voltage detector (604); 2) being controlled through installation of the current detector (605); 3) being controlled through installation of the voltage detector (604) and the current detector (605); 4) being controlled through setting circuit to perform regular shunt to the voltage-dividing load; 5) being controlled through a manually-operated control interface device to perform shunt regulation to the voltage-dividing load; 6) being controlled through inputting external signals to perform shunt regulation to the voltage-dividing load.

12. The current regulator drive circuit shunting current by voltage-dividing load according to claim 1, when one or both of the voltage detector (604) and the current detector (605) are selected to be installed for performing shunt regulation to the power control unit (603), the configurations and operational functions of the voltage detector (604) and the current detector (605) are as follows:

voltage detector (604): related to a voltage detector constituted by electromechanical and/or solid-state electronic components, for detecting the supply voltage, or the value of the voltage at two ends of one or both of the electrothermal main load (601) and the power control unit (603), or of the total load of the both connected in series, to regulate the power control unit (603) over the following functions, including:

if the voltage detected by the voltage detector (604) is lower than a predetermined value, the power control unit (603) is operated to perform shunt regulation for increasing the current passing through the electrothermal main load(601); or if the voltage detected by the voltage detector (604) is higher than a predetermined value, the power control unit (603) is operated to perform shunt regulation for decreasing the current passing through the electrothermal main load (601); and current detector (605): related to a current detector constituted by electromechanical and/or solid-state electronic components, for detecting the value of one or more than one current passing through the electrothermal main load (601), the electrothermal voltage-dividing load (602) and the power control unit (603), to regulate the power control unit (603) over the following functions, including:

if the current detected by the current detector (605) is lower than a predetermined value, the power control unit (603) is operated to perform shunt regulation for increasing the current passing through the electrothermal main load (601); or if the current detected by the current detector (605) is higher than a predetermined value, the power control unit (603) is operated to perform shunt regulation for decreasing the current passing through the electrothermal main load (601).

13. The current regulator drive circuit shunting current by voltage-dividing load according to claim 1, wherein the circuit is applied to the DC main load driven by DC power source, which has the Zener diode as the voltage-dividing component, the main components including:

current equalizing impedance (700): related to a current equalizing impedance (700) connected with the DC main load (701) in series, which is constituted by the inductor or coil with inductive impedance, or constituted by the impedance connecting the capacitor and the inductor or coil in parallel for being in parallel resonance with the ripple frequency of the passing current, arranged to reduce the ripple value of the current passing through the current equalizing impedance (700); the current equalizing impedance (700) is optionally installed upon demanded;

DC main load (701): related to a main load driven by DC or pulsating DC power, constituted by one or more than one kind of main loads including DC electric energy to luminous energy main load, DC electric energy to thermal energy main load, DC electric energy to mechanical energy main load, DC electric energy to chemical energy main load, and DC electric energy to acoustic energy main load;

voltage-dividing Zener diode (702): constituted by one or more Zener Diodes connected in series, connected in parallel, or connected in series-parallel, arranged to be connected with the DC main load (701) in series, and connected with DC power control device (703) in parallel, for being driven by DC or pulsating DC power, and for the current passing through the voltage-dividing Zener diode (702) to be shunted regulation by the DC power control device (703);

DC power control device (703): constituted by electromechanical switch device, solid-state semiconductor-type switch device, or solid-state semiconductor-type linear variable impedance device, to be connected with two ends of the voltage-dividing Zener diode 702 in parallel; when the DC power source is utilized to perform chopping control, the DC power control device (703) is operated to perform shunt regulation of alternate chopping frequency, or shunt regulation of PWM (Pulse Width Modulation) of chopping conduction time ratio, or shunt regulation of PWM of alternate chopping frequency and chopping conduction time ratio at the same time; or the DC power control device (703) is operated to perform shunt regulation of switch type turn-on or cut-off, or the linear impedance value of the DC power control device (703) is regulated so as to operate the DC power control device (703) to perform shunt regulation for the current passing through the voltage-dividing Zener diode (702);

wherein in the current regulator drive circuit shunting current by voltage-dividing load, control means of the DC power control unit (703) includes one or more than one of the following control means including: 1) being controlled through installation of the DC voltage detector (704); 2) being controlled through installation of the DC current detector (705); 3) being controlled through installation of the DC voltage detector (704) and the DC current detector (705); 4) being controlled through setting circuit to perform regular shunt to the voltage-dividing load; 5) being controlled through a manually-operated control interface device to perform shunt regulation to the voltage-dividing load; 6) being controlled through inputting external signals to perform shunt regulation to the voltage-dividing load.

14. The current regulator drive circuit shunting current by voltage-dividing load according to claim 1, when one or both of the DC voltage detector (704) and the DC current detector (705) are selected to be installed for performing shunt regulation to the DC power control unit (703), the configurations and operational functions of the DC voltage detector (704) and the DC current detector (705) are as follows:

DC voltage detector (704): related to a voltage detector constituted by electromechanical and/or solid-state electronic components, for detecting the supply voltage, or the value of the voltage at two ends of one or both of the DC main load (701) and the DC power control unit (703), or of the total load of the both connected in series, to regulate the DC power control unit (703) over the following functions, including:

if the voltage detected by the DC voltage detector (704) is lower than a predetermined value, the DC power control unit (703) is operated to perform shunt regulation for increasing the current passing through the DC main load (701); or if the voltage detected by the DC voltage detector (704) is higher than a predetermined value, the DC power control unit (703) is operated to perform shunt regulation for decreasing the current passing through the DC main load (701); and DC current detector (705): related to a current detector constituted by electromechanical and/or solid-state electronic components, for detecting the value of one or more than one current passing through the DC main load (701), the voltage-dividing Zener diode (702) and the DC power control unit (703), to regulate the power control unit (103) over the following functions, including:

if the current detected by the DC current detector (705) is lower than a predetermined value, the power DC control unit (703) is operated to perform shunt regulation for increasing the current passing through the DC main load (701); or if the current detected by the DC current detector (705) is higher than a predetermined value, the DC power control unit (703) is operated to perform shunt regulation for decreasing the current passing through the DC main load (701).

15. The current regulator drive circuit shunting current by voltage-dividing load according to claim 1, wherein the circuit is applied to AC main load driven by AC power source, which has the two-way Zener diode as the voltage-dividing component, the main components including:

current equalizing impedance (800): related to a current equalizing impedance (800) connected with the AC main load (801) in series, which is constituted by the inductor or coil with inductive impedance, or constituted by the impedance connecting the capacitor and the inductor or coil in parallel for being in parallel resonance with the ripple frequency of the passing current, arranged to reduce the ripple value of the current passing through the current equalizing impedance (800); the current equalizing impedance (800) is optionally installed upon demanded;

AC main load (801): related to a main load driven by AC power, constituted by one or more than one kind of main loads including AC electric energy to luminous energy main load, AC electric energy to thermal energy main load, AC electric energy to mechanical energy main load, AC electric energy to chemical energy main load, and AC electric energy to acoustic energy main load;

voltage-dividing two-way Zener diode (802): constituted by two or more Zener Diodes connected, with different working polarity, in series or connected in parallel, and arranged to be connected with the AC main load (801) in series, and connected with AC power control device (803) in parallel, for being driven by AC power, and for the current passing through the voltage-dividing two-way Zener diode (802) to be shunted regulation by the AC power control device (803);

AC power control device (803): constituted by electromechanical switch device, solid-state semiconductor-type switch device, or solid-state semiconductor-type linear variable impedance device, to be connected with two ends of the voltage-dividing two-way Zener diode (802) in parallel, for being controlled by the AC power control device (803), to perform shunt regulation of conductive phase angle, or shunt regulation of switch type turn-on or cut-off, or the linear impedance value of the AC power control device (803) is regulated to perform shunt regulation for the current passing through the voltage-dividing two-way Zener diode (802);

wherein in the current regulator drive circuit shunting current by voltage-dividing load, control means of the AC power control unit (803) includes one or more than one of the following control means including: 1) being controlled through installation of the AC voltage detector (804); 2) being controlled through installation of the AC current detector (80); 3) being controlled through installation of the AC voltage detector (804) and the AC current detector (805); 4) being controlled through setting circuit to perform regular shunt to the voltage-dividing load; 5) being controlled through a manually-operated control interface device to perform shunt regulation to the voltage-dividing load; 6) being controlled through inputting external signals to perform shunt regulation to the voltage-dividing load.

16. The current regulator drive circuit shunting current by voltage-dividing load according to claim 15, when one or both of the AC voltage detector (804) and the AC current detector (805) are selected to be installed for performing shunt regulation to the AC power control unit (803), the configurations and operational functions of the AC voltage detector (804) and the AC current detector (805) are as follows:

AC voltage detector (804): related to an AC voltage detector constituted by electromechanical and/or solid-state electronic components, for detecting the AC supply voltage, or the value of the voltage of one or both of the AC main load (801) and the AC power control device (803), or the value of the voltage at two ends of the total load of the above two connected in series, to regulate the AC power control device (803) over the following functions, including:

if the voltage detected by the AC voltage detector (804) is lower than a predetermined value, the AC power control device (803) is operated to perform shunt regulation for lowering the total impedance of the load so as to increase the current passing through the AC main load (801); or if the voltage detected by the AC voltage detector (804) is higher than a predetermined value, the AC power control unit (803) is operated to perform shunt regulation for decreasing the current passing through the AC main load (801); and AC current detector (805): related to a AC current detector constituted by electromechanical and/or solid-state electronic components, for detecting the value of one or more than one current passing through the AC main load (801), voltage-dividing two-way Zener diode (802) and the AC power control unit (803), to regulate the AC power control unit (803) over the following functions, including:

if the current detected by the AC current detector (805) is lower than a predetermined value, the AC power control unit (803) is operated to perform shunt regulation for increasing the current passing through the AC main load (801); or if the current detected by the AC current detector (805) is higher than a predetermined value, the AC power control unit (803) is operated to perform shunt regulation for decreasing the current passing through the AC main load (801).

17. The current regulator drive circuit shunting current by voltage-dividing load according to claim 1, wherein the circuit is applied to AC-DC main load driven by AC or DC power source, which has the rectifier diode as the AC/DC switching and voltage-dividing component, the main components including:

current equalizing impedance (900): related to a current equalizing impedance (900) connected with the AC-DC main load (901) in series, which is constituted by the inductor or coil with inductive impedance, or constituted by the impedance connecting the capacitor and the inductor or coil in parallel for being in parallel resonance with the ripple frequency of the passing current, arranged to reduce the ripple value of the current passing through the current equalizing impedance (900); the current equalizing impedance (900) is optionally installed upon demanded;

AC-DC main load (901): related to a main load driven by AC or DC power, constituted by one or more than one kind of main loads including AC or DC electric energy to luminous energy main load, AC or DC electric energy to thermal energy main load, AC or DC electric energy to mechanical energy main load, AC or DC electric energy to chemical energy main load, and AC or DC electric energy to acoustic energy main load;

rectifier diode (902): constituted by one or more rectifier diodes connected in series, connected in parallel, or connected in series-parallel, and arranged to be connected with the AC-DC main load (901) in series, and connected with power control unit (903) in parallel, to serve as a switching component for rectifying AC power source into half-wave DC, and to serve as a voltage-dividing component for the current with another flow direction separated by the rectifier diode (902) to be parallelly shunted regulation by the power control unit (903);

power control unit (903): constituted by electromechanical switch device, solid-state semiconductor-type switch device, or solid-state semiconductor-type linear variable impedance device; when DC power source is utilized to perform chopping control, the power control unit (903) is operated to perform shunt regulation of alternate chopping frequency, or shunt regulation of PWM (Pulse Width Modulation) of chopping conduction time ratio, or shunt regulation of PWM of alternate chopping frequency and chopping conduction time ratio at the same time; when a two-way periodical alternate polarity power source is used, the power control unit (903) is operated to perform shunt regulation of conductive phase angle; when an DC power source or two-way periodical alternate polarity power source is used, the power control unit (903) is operated to perform shunt regulation of switch type turn-on or cut-off, or the linear impedance value of the power control unit (903) is regulated so as to operate the power control unit (903) to perform shunt regulation to the current passing through the rectifier diode (902) and the current with another flow direction separated by the rectifier diode(902);

wherein in the current regulator drive circuit shunting current by voltage-dividing load, control means of the power control unit (903) includes one or more than one of the following control means including: 1) being controlled through installation of the voltage detector (904); 2) being controlled through installation of the current detector (905); 3) being controlled through installation of the voltage detector (904) and the current detector (905); 4) being controlled through setting circuit to perform regular shunt to the voltage-dividing load; 5) being controlled through a manually-operated control interface device to perform shunt regulation to the voltage-dividing load; 6) being controlled through inputting external signals to perform shunt regulation to the voltage-dividing load.

18. The current regulator drive circuit shunting current by voltage-dividing load according to claim 17, when one or both of the voltage detector (904) and the current detector (905) are selected to be installed for performing shunt regulation to the power control unit (903), the configurations and operational functions of the voltage detector (904) and the current detector (905) are as follows:

voltage detector (904): related to a voltage detector constituted by electromechanical and/or solid-state electronic components, for detecting the supply voltage, or the value of the voltage at two ends of one or both of the AC-DC main load (901) and the power control unit (903), or of the total load of the both connected in series, to regulate the power control unit (903) over the following functions, including:

if the voltage detected by the voltage detector (904) is lower than a predetermined value, the power control unit (903) is operated to perform shunt regulation for increasing the current passing through the AC-DC main load (901); or if the voltage detected by the voltage detector (904) is higher than a predetermined value, the power control unit (903) is operated to perform shunt regulation for decreasing the current passing through the AC-DC main load (901); and current detector (905): related to a AC current detector constituted by electromechanical and/or solid-state electronic components, for detecting the value of one or more than one current passing through the AC-DC main load (901), the rectifier diode (902) and the power control unit (903), to regulate the power control unit (903) over the following functions, including:

if the current detected by the current detector (905) is lower than a predetermined value, the power control unit (903) is operated to perform shunt regulation for increasing the current passing through the AC-DC main load (901); or if the current detected by the current detector (905) is higher than a predetermined value, the power control unit (903) is operated to perform shunt regulation for decreasing the current passing through the AC-DC main load (901).

19. The current regulator drive circuit shunting current by voltage-dividing load according to claim 1, wherein the circuit is applied to the main load driven by AC or DC power source, which has the impedance component as the voltage-dividing component, the main components including:

current equalizing impedance (1000): related to a current equalizing impedance (1000) connected with the main load (1001) in series, which is constituted by the inductor or coil with inductive impedance, or constituted by the impedance connecting the capacitor and the inductor or coil in parallel for being in parallel resonance with the ripple frequency of the passing current, arranged to reduce the ripple value of the current passing through the current equalizing impedance (1000); the current equalizing impedance (1000) is optionally installed upon demanded;

main load (1001): related to a main load driven by AC, DC, or pulsating DC power, constituted by one or more than one kind of main loads including electric energy to luminous energy main load, electric energy to thermal energy main load, electric energy to mechanical energy main load, electric energy to chemical energy main load, and electric energy to acoustic energy main load;

voltage-dividing impedance (1002): related to one or more than one resistive impedance component allowing AC, DC, or pulsating DC power passing through, which is constituted by one or more than one kind of resistive impedance components, and is arranged to be connected with the main load (1001) in series, and connected with the power control unit (1003) in parallel, for the current passing through the voltage-dividing impedance (1002) to be shunted regulation in parallel connection by the power control unit (1003);

power control unit (1003): constituted by electromechanical switch device, solid-state semiconductor-type switch device, or solid-state semiconductor-type linear variable impedance device; when DC power source is utilized to perform chopping control, the power control unit (1003) is operated to perform shunt regulation of alternate chopping frequency, or shunt regulation of PWM (Pulse Width Modulation) of chopping conduction time ratio, or shunt regulation of PWM of alternate chopping frequency and chopping conduction time ratio at the same time; when a two-way periodical alternate polarity power source is used, the power control unit (1003) is operated to perform shunt regulation of conductive phase angle; when an DC power source or two-way periodical alternate polarity power source is used, the power control unit (1003) is operated to perform shunt regulation of switch type turn-on or cut-off, or the linear impedance value of the power control unit (1003) is regulated so as to operate the power control unit (1003) to perform shunt regulation to the current passing through the voltage-dividing impedance (1002);

wherein in the current regulator drive circuit shunting current by voltage-dividing load, control means of the power control unit (1003) includes one or more than one of the following control means including: 1) being controlled through installation of the voltage detector (1004); 2) being controlled through installation of the current detector (1005); 3) being controlled through installation of the voltage detector (1004) and the current detector (1005); 4) being controlled through setting circuit to perform regular shunt to the voltage-dividing load; 5) being controlled through a manually-operated control interface device to perform shunt regulation to the voltage-dividing load; 6) being controlled through inputting external signals to perform shunt regulation to the voltage-dividing load.

20. The current regulator drive circuit shunting current by voltage-dividing load according to claim 19, when one or both of the voltage detector (1004) and the current detector (1005) are selected to be installed for performing shunt regulation to the power control unit (1003), the configurations and operational functions of the voltage detector (1004) and the current detector (1005) are as follows:

voltage detector (1004): related to a voltage detector constituted by electromechanical and/or solid-state electronic components, for detecting the supply voltage, or the value of the voltage at two ends of one or both of the main load (1001) and the power control unit (1003), or of the total load of the both connected in series, to regulate the power control unit (1003) over the following functions, including:

if the voltage detected by the voltage detector (1004) is lower than a predetermined value, the power control unit (1003) is operated to perform shunt regulation for increasing the current passing through the main load (1001); or if the voltage detected by the voltage detector (1004) is higher than a predetermined value, the power control unit (1003) is operated to perform shunt regulation for decreasing the current passing through the main load (1001); and current detector (1005): related to a current detector constituted by electromechanical and/or solid-state electronic components, for detecting the value of one or more than one current passing through the main load (1001), the voltage-dividing impedance (1002) and the power control unit (1003), to regulate the power control unit (1003) over the following functions, including:

if the current detected by the current detector (1005) is lower than a predetermined value, the power control unit (100) is operated to perform shunt regulation for increasing the current passing through the main load (1001); or if the current detected by the current detector (1005) is higher than a predetermined value, the power control unit (1003) is operated to perform shunt regulation for decreasing the current passing through the main load (1001).

21. The current regulator drive circuit shunting current by voltage-dividing load according to claim 1, wherein the circuit is applied to the main load driven by DC power source, which has the inductive impedance component as the voltage-dividing component, the main components including:

current equalizing impedance (1100): related to a current equalizing impedance (1100) connected with the main load (1101) in series, which is constituted by the inductor or coil with inductive impedance, or constituted by the impedance connecting the capacitor and the inductor or coil in parallel for being in parallel resonance with the ripple frequency of the passing current, arranged to reduce the ripple value of the current passing through the current equalizing impedance (1100); the current equalizing impedance (1100) is optionally installed upon demanded;

main load (1101): related to a main load driven by DC or pulsating DC power, constituted by one or more than one kind of main loads including electric energy to luminous energy main load, electric energy to thermal energy main load, electric energy to mechanical energy main load, electric energy to chemical energy main load, and electric energy to acoustic energy main load;

inductive voltage-dividing impedance component (1102): related to one or more than one inductive impedance component allowing DC or pulsating DC power passing through, arranged to be connected with the main load (1101) in series, and connected with the DC power control device (1103) in parallel, for the current passing through the inductive voltage-dividing impedance component (1102) to be shunted regulation in parallel connection by the DC power control device (1103)

flywheel diode (1106): constituted by diode or high-speed diode, for being connected with two ends of the inductive voltage-dividing impedance component (1102) in parallel with a reverse polarity means; if a flywheel is built-in at two ends of the power of the DC power control device (1103), then the mentioned flywheel diode (1106) can be optionally installed;

DC power control device (1103): constituted by electromechanical switch device, solid-state semiconductor-type switch device, or solid-state semiconductor-type linear variable impedance device, when DC power source is utilized to perform chopping control, the DC power control device (1103) is operated to perform shunt regulation of alternate chopping frequency, or shunt regulation of PWM (Pulse Width Modulation) of chopping conduction time ratio, or shunt regulation of PWM of alternate chopping frequency and chopping conduction time ratio at the same time; or the DC power control device (1103) is operated to perform shunt regulation of switch type turn-on or cut-off, or the linear impedance value of the DC power control device (1103)

is regulated so as to operate the DC power control device (1103) to perform shunt regulation for the current passing through the inductive voltage-dividing impedance component (1102);

wherein in the current regulator drive circuit shunting current by voltage-dividing load, control means of the DC power control device (1103) includes one or more than one of the following control means including: 1) being controlled through installation of the voltage detector (1104); 2) being controlled through installation of the current detector (1105); 3) being controlled through installation of the voltage detector (1104) and the current detector (1105); 4) being controlled through setting circuit to perform regular shunt to the voltage-dividing load; 5) being controlled through a manually-operated control interface device to perform shunt regulation to the voltage-dividing load; 6) being controlled through inputting external signals to perform shunt regulation to the voltage-dividing load.

22. The current regulator drive circuit shunting current by voltage-dividing load according to claim 21, wherein when one or both of the voltage detector (1104) and the current detector (1105) are selected to be installed for performing shunt regulation to the DC power control device (1103), the configurations and operational functions of the voltage detector (1104) and the current detector (1105) are as follows:

voltage detector (1104): related to a voltage detector constituted by electromechanical and/or solid-state electronic components, for detecting the supply voltage, or the value of the voltage at two ends of one or both of the main load (1101) and the DC power control device (1103), or of the total load of the both connected in series, to regulate the DC power control device (1103) over the following functions, including:

if the voltage detected by the voltage detector (1104) is lower than a predetermined value, the DC power control device (1103) is operated to perform shunt regulation for increasing the current passing through the main load (1101); or if the voltage detected by the voltage detector (1104) is higher than a predetermined value, the DC power control device (1103) is operated to perform shunt regulation for decreasing the current passing through the main load (1101); and current detector (1105): related to a current detector constituted by electromechanical and/or solid-state electronic components, for detecting the value of one or more than one current passing through the main load (1101), the inductive voltage-dividing impedance component (1102) and the DC power control device (1103), to regulate the DC power control device (1103) over the following functions, including:

if the current detected by the current detector (1105) is lower than a predetermined value, the DC power control device (1103) is operated to perform shunt regulation for increasing the current passing through the main load (1101); or if the current detected by the current detector (1105) is higher than a predetermined value, the DC power control device (1103) is operated to perform shunt regulation for decreasing the current passing through the main load (1101).

23. The current regulator drive circuit shunting current by voltage-dividing load according to claim 1, wherein the circuit is applied to the main load driven by DC power source, and the impedance component of inductive series resistance serving as a voltage-dividing component, the main components including:

current equalizing impedance (1200): related to a current equalizing impedance (1200) connected with the main load (1201) in series, which is constituted by the inductor or coil with inductive impedance, or constituted by the impedance connecting the capacitor and the inductor or coil in parallel for being in parallel resonance with the ripple frequency of the passing current, arranged to reduce the ripple value of the current passing through the current equalizing impedance (1200); the current equalizing impedance (1200) is optionally installed upon demanded;

main load (1201): related to a main load driven by DC or pulsating DC power, which is constituted by one or more than one kind of main loads, including electric energy to luminous energy main load, electric energy to thermal energy main load, electrical energy to mechanical energy main load, electrical energy to chemical energy main load, or electrical energy to acoustic energy main load;

voltage-dividing impedance component of inductive series resistance (1202): constituted by one or more than one of inductive impedance component (12021), that allows DC or pulsating DC power passing through, being connected with resistance (12022) in series, and serving to be connected with the main load (1201) in series and with the AC power control device (1203) in parallel, and allowing the DC power control device (1203) to perform parallel shunt regulation to the current passing through the voltage-dividing impedance component of inductive series resistance (1202);

flywheel diode (1206): constituted by diode or high-speed diode, for being connected with two ends of the voltage-dividing impedance component of inductive series resistance (1202) in parallel with a reverse polarity means; if a flywheel is built-in at two ends of the power of the DC power control device (1203), then the mentioned flywheel diode (1206) can be optionally installed;

DC power control device (1203): constituted by electromechanical switch device, solid-state semiconductor-type switch device, or solid-state semiconductor-type linear variable impedance device, when DC power source is utilized to perform chopping control, the DC power control device (1203) is operated to perform shunt regulation of alternate chopping frequency, or shunt regulation of PWM (Pulse Width Modulation) of chopping conduction time ratio, or shunt regulation of PWM of alternate chopping frequency and chopping conduction time ratio at the same time; or the DC power control device (1203) is operated to perform shunt regulation of switch type turn-on or cut-off, or the linear impedance value of the DC power control device (1203) is regulated so as to operate the DC power control device (1203) to perform shunt regulation for the current passing through the voltage-dividing impedance component (1202);

wherein in the current regulator drive circuit shunting current by voltage-dividing load, control means of the DC power control device (1203) includes one or more than one of the following control means including: 1) being controlled through installation of the voltage detector (1204); 2) being controlled through installation of the current detector (1205); 3) being controlled through installation of the voltage detector (1204) and the current detector (1205); 4) being controlled through setting circuit to perform regular shunt to the voltage-dividing load; 5) being controlled through a manually-operated control interface device to perform shunt regulation to the voltage-dividing load; 6) being controlled through inputting external signals to perform shunt regulation to the voltage-dividing load.

24. The current regulator drive circuit shunting current by voltage-dividing load according to claim 23, when one or both of the voltage detector (1204) and the current detector (1205) are selected to be installed for performing shunt regulation to the DC power control device (1203), the configurations and operational functions of the voltage detector (1204) and the current detector (1205) are as follows:

voltage detector (1204): related to a voltage detector constituted by electromechanical and/or solid-state electronic components, for detecting the supply voltage, or the value of the voltage at two ends of one or both of the main load (1201) and the DC power control device (1203), or of the total load of the both connected in series, to regulate the DC power control device (1203) over the following functions, including:

if the voltage detected by the voltage detector (1204) is lower than a predetermined value, the DC power control device (1203) is operated to perform shunt regulation for increasing the current passing through the main load (1201); or if the voltage detected by the voltage detector (1204) is higher than a predetermined value, the DC power control device (1203) is operated to perform shunt regulation for decreasing the current passing through the main load (1201); and current detector (1205): related to a current detector constituted by electromechanical and/or solid-state electronic components, for detecting the value of one or more than one current passing through the main load (1201), the voltage-dividing impedance component of inductive series resistance (1202) and the DC power control device (1203), to regulation the DC power control device (1203) over the following functions, including:

if the current detected by the current detector (1205) is lower than a predetermined value, the DC power control device (1203) is operated to perform shunt regulation for increasing the current passing through the main load (1201); or if the current detected by the current detector (1205) is higher than a predetermined value, the DC power control device (1203) is operated to perform shunt regulation for decreasing the current passing through the main load (1201).

25. The current regulator drive circuit shunting current by voltage-dividing load according to claim 1, wherein the circuit is applied to main load driven by DC power source, and the impedance component of the inductive series LED serving as a voltage-dividing component, the main components including;

current equalizing impedance (1300): related to a current equalizing impedance (1300) connected with the main load (1301) in series, which is constituted by the inductor or coil with inductive impedance, or constituted by the impedance connecting the capacitor and the inductor or coil in parallel for being in parallel resonance with the ripple frequency of the passing current, arranged to reduce the ripple value of the current passing through the current equalizing impedance (1300); the current equalizing impedance (1300) is optionally installed upon demanded;

main load (1301): related to a main load driven by DC, or pulsating DC power, which is constituted by one or more than one kind of main loads, including electrical energy to luminous energy main load, electrical energy to thermal energy main load, electrical energy to mechanical energy main load, electrical energy to chemical energy main load, or electrical energy to acoustic energy main load;

voltage-dividing impedance component of inductive series LED (1302): constituted by one or more than one of inductive impedance component (13021), that allows DC or pulsating DC power passing through, being connected with LED (13023) in series, and serving to be connected with the main load (1301) in series and connected with the DC power control device (1303) in parallel, and allowing the DC power control device (1303) to perform parallel shunt regulation to the current passing through the voltage-dividing impedance component of inductive series LED (1302);

flywheel diode (1306): constituted by diode or high-speed diode, for being connected with two ends of the voltage-dividing impedance component of inductive series LED (1302) in parallel with a reverse polarity means; if a flywheel is built-in at two ends of the power of the DC power control device (1303), then the mentioned flywheel diode (1306) can be optionally installed;

DC power control device (1303): constituted by electromechanical switch device, solid-state semiconductor-type switch device, or solid-state semiconductor-type linear variable impedance device; when DC power source is utilized to perform chopping control, the DC power control device (1303) is operated to perform shunt regulation of alternate chopping frequency, or shunt regulation of PWM (Pulse Width Modulation) of chopping conduction time ratio, or shunt regulation of PWM of alternate chopping frequency and chopping conduction time ratio at the same time; or the DC power control device (1303) is operated to perform shunt regulation of switch type turn-on or cut-off, or the linear impedance value of the DC power control device (1303) is regulated so as to operate the DC power control device (1303) to perform shunt regulation for the current passing through the voltage-dividing impedance component of inductive series LED (1302);

wherein in the current regulator drive circuit shunting current by voltage-dividing load, control means of the DC power control device (1303) includes one or more than one of the following control means including: 1) being controlled through installation of the voltage detector (1304); 2) being controlled through installation of the current detector (1305); 3) being controlled through installation of the voltage detector (1304) and the current detector (1305); 4) being controlled through setting circuit to perform regular shunt to the voltage-dividing load; 5) being controlled through a manually-operated control interface device to perform shunt regulation to the voltage-dividing load; 6) being controlled through inputting external signals to perform shunt regulation to the voltage-dividing load.

26. The current regulator drive circuit shunting current by voltage-dividing load according to claim 25, when one or both of the voltage detector (1304) and the current detector (1305) are selected to be installed for performing shunt regulation to the DC power control device (1303), the configurations and operational functions of the voltage detector (1304) and the current detector (1305) are as follows:

voltage detector (1304): related to a voltage detector constituted by electromechanical and/or solid-state electronic components, for detecting the supply voltage, or the value of the voltage at two ends of one or both of the main load (1301) and the DC power control device (1303), or of the total load of the both connected in series, to regulate the DC power control unit (1303) over the following functions, including:

if the voltage detected by the voltage detector (1304) is lower than a predetermined value, the DC power control device (1303) is operated to perform shunt regulation for increasing the current passing through the main load (1301); or if the voltage detected by the voltage detector (1304) is higher than a predetermined value, the DC power control device (1303) is operated to perform shunt regulation for decreasing the current passing through the main load (1301); and current detector (1305): related to a current detector constituted by electromechanical and/or solid-state electronic components, for detecting the value of one or more than one current passing through the main load (1301), the voltage-dividing impedance component of inductive series LED (1302) and the DC power control device (1303), to regulate the DC power control device (1303) over the following functions, including:

if the current detected by the current detector (1305) is lower than a predetermined value, the DC power control device (1303) is operated to perform shunt regulation for increasing the current passing through the main load (1301); or if the current detected by the current detector (1305) is higher than a predetermined value, the DC power control device (1303) is operated to perform shunt regulation for decreasing the current passing through the main load (1301).

27. The current regulator drive circuit shunting current by voltage-dividing load according to claim 1, wherein the circuit is applied to main load driven by DC power source, and the impedance component of the inductive series resistance and series LED serving as a voltage-dividing component, the main components including:

current equalizing impedance (1400): related to a current equalizing impedance (1400) connected with the main load (1401) in series, which is constituted by the inductor or coil with inductive impedance, or constituted by the impedance connecting the capacitor and the inductor or coil in parallel for being in parallel resonance with the ripple frequency of the passing current, arranged to reduce the ripple value of the current passing through the current equalizing impedance (1400); the current equalizing impedance (1400) is optionally installed upon demanded;

main load (1401): related to a main load driven by DC, or pulsating DC power, which is constituted by one or more than one kind of main loads, including electrical energy to luminous energy main load, electrical energy to thermal energy main load, electrical energy to mechanical energy main load, electrical energy to chemical energy main load, or electrical energy to acoustic energy main load;

voltage-dividing impedance component of inductive series resistance and series LED (1402): constituted by one or more than one of inductive impedance component (14021), that allows DC or pulsating DC power passing through, being connected with the resistance in series and connected with the LED in series, and serving to be connected with the main load (1401) in series and be connected with the DC power control device (1403) in parallel, and allowing the DC power control device (1403) to perform parallel shunt regulation to voltage-dividing impedance component of inductive series resistance and series LED (1402);

flywheel diode (1406): constituted by diode or high-speed diode, for being connected with two ends of the voltage-dividing impedance component of inductive series resistance and series LED (1402) in parallel with a reverse polarity means; if a flywheel is built-in at two ends of the power of the DC power control device (1403), then the mentioned flywheel diode (1406) can be optionally installed;

DC power control device (1403): constituted by electromechanical switch device, solid-state semiconductor-type switch device, or solid-state semiconductor-type linear variable impedance device, when DC power source is utilized to perform chopping control, the DC power control device (1403) is operated to perform shunt regulation of alternate chopping frequency, or shunt regulation of PWM (Pulse Width Modulation) of chopping conduction time ratio, or shunt regulation of PWM of alternate chopping frequency and chopping conduction time ratio at the same time; or the DC power control device (1403) is operated to perform shunt regulation of switch type turn-on or cut-off, or the linear impedance value of the DC power control device (1403) is regulated so as to operate the DC power control device (1403) to perform shunt regulation for the current passing through the voltage-dividing impedance component of inductive series resistance and series LED (1402);

wherein in the current regulator drive circuit shunting current by voltage-dividing load, control means of the DC power control device (1403) includes one or more than one of the following control means including: 1) being controlled through installation of the voltage detector (1404); 2) being controlled through installation of the current detector (1405); 3) being controlled through installation of the voltage detector (1404) and the current detector (1405); 4) being controlled through setting circuit to perform regular shunt to the voltage-dividing load; 5) being controlled through a manually-operated control interface device to perform shunt regulation to the voltage-dividing load; 6) being controlled through inputting external signals to perform shunt regulation to the voltage-dividing load.

28. The current regulator drive circuit shunting current by voltage-dividing load according to claim 27, when one or both of the voltage detector (1404) and the current detector (1405) are selected to be installed for performing shunt regulation to the DC power control device (1403), the configurations and operational functions of the voltage detector (1404) and the current detector (1405) are as follows:

voltage detector (1404): related to a voltage detector constituted by electromechanical and/or solid-state electronic components, for detecting the supply voltage, or the value of the voltage at two ends of one or both of the main load (1401) and the DC power control device (1403), or of the total load of the both connected in series, to regulate the DC power control device (1403) over the following functions, including:

if the voltage detected by the voltage detector (1404) is lower than a predetermined value, the DC power control device (1403) is operated to perform shunt regulation for increasing the current passing through the main load (1401); or if the voltage detected by the voltage detector (1404) is higher than a predetermined value, the DC power control device (1403) is operated to perform shunt regulation for decreasing the current passing through the main load (1401); and current detector (1405): related to a current detector constituted by electromechanical and/or solid-state electronic components, for detecting the value of one or more than one current passing through the main load (1401), the voltage-dividing impedance component of inductive series resistance and series LED (1402) and the DC power control device (1403), to regulation the DC power control device (1403) over the following functions, including:

if the current detected by the current detector (1405) is lower than a predetermined value, the DC power control device (1403) is operated to perform shunt regulation for increasing the current passing through the main load (1401); or if the current detected by the current detector (1405) is higher than a predetermined value, the DC power control device (140) is operated to perform shunt regulation for decreasing the current passing through the main load (1401).

29. The current regulator drive circuit shunting current by voltage-dividing load according to claim 1, wherein the circuit is applied to the main load driven by DC power source, and the inductive impedance component serving as a voltage-dividing component and the DC power control device (1503) being further connected with shield diode, the main components including:

current equalizing impedance (1500): related to a current equalizing impedance (1500) connected with the main load (1501) in series, which is constituted by the inductor or coil with inductive impedance, or constituted by the impedance connecting the capacitor and the inductor or coil in parallel for being in parallel resonance with the ripple frequency of the passing current, arranged to reduce the ripple value of the current passing through the current equalizing impedance (1500); the current equalizing impedance (1500) is optionally installed upon demanded;

main load (1501): related to a main load driven by DC or pulsating DC power, which is constituted by one or more than one kind of main loads, including electrical energy to luminous energy main load, electrical energy to thermal energy main load, electrical energy to mechanical energy main load, electrical energy to chemical energy main load, or electrical energy to acoustic energy main load;

inductive voltage-dividing impedance component (1502): constituted by one or more than one of inductive impedance component allowing DC or pulsating DC power passing through, and serving to be connected with the main load (1501) in series and be connected in parallel with two ends defined through the shield diode (1507) being in series connected with the DC power control device (1503) with a means of consequent to the power polarity, and allowing the DC power control device (1503) to perform parallel shunt regulation to the inductive voltage-dividing impedance component (1502);

flywheel diode (1506): constituted by diode or high-speed diode, for being connected with two ends of the inductive voltage-dividing impedance component (1502) in parallel with a reverse polarity means; if a flywheel is built-in at two ends of the power of the DC power control device (1503), then the mentioned flywheel diode (1506) can be optionally installed;

shield diode (1507): constituted by LED or high-speed LED, for being connected in series with the DC power control device (1503) in the forward power polarity;

DC power control device (1503): constituted by electromechanical switch device, solid-state semiconductor-type switch device, or solid-state semiconductor-type linear variable impedance device, when DC power source is utilized to perform chopping control, the DC power control device (1503) is operated to perform shunt regulation of alternate chopping frequency, or shunt regulation of PWM (Pulse Width Modulation) of chopping conduction time ratio, or shunt regulation of PWM of alternate chopping frequency and chopping conduction time ratio at the same time; or the DC power control device (1503) is operated to perform shunt regulation of switch type turn-on or cut-off, or the linear impedance value of the DC power control device (1503) is regulated so as to operate the DC power control device (1503) to perform shunt regulation for the current passing through the Inductive voltage-dividing impedance component (1502);

wherein in the current regulator drive circuit shunting current by voltage-dividing load, control means of the DC power control device (1203) includes one or more than one of the following control means including: 1) being controlled through installation of the voltage detector (1504); 2) being controlled through installation of the current detector (1505); 3) being controlled through installation of the voltage detector 1504 and the current detector (1505); 4) being controlled through setting circuit to perform regular shunt to the voltage-dividing load; 5) being controlled through a manually-operated control interface device to perform shunt regulation to the voltage-dividing load; 6) being controlled through inputting external signals to perform shunt regulation to the voltage-dividing load.

30. The current regulator drive circuit shunting current by voltage-dividing load according to claim 29, when one or both of the voltage detector (1504) and the current detector (1505) are selected to be installed for performing shunt regulation to the DC power control device (1503), the configurations and operational functions of the voltage detector (1504) and the current detector (1505) are as follows:

voltage detector (1504): related to a voltage detector constituted by electromechanical and/or solid-state electronic components, for detecting the supply voltage, or the value of the voltage at two ends of one or both of the main load (1501) and the DC power control device (1503), or of the total load of the both connected in series, to regulate the DC power control device (1503) over the following functions, including:

if the voltage detected by the voltage detector (1504) is lower than a predetermined value, the DC power control device (1503) is operated to perform shunt regulation for increasing the current passing through the main load (1501); or if the voltage detected by the voltage detector (1504) is higher than a predetermined value, the DC power control device (1503) is operated to perform shunt regulation for decreasing the current passing through the main load (1501); and current detector (1505): related to a current detector constituted by electromechanical and/or solid-state electronic components, for detecting the value of one or more than one current passing through the main load (1501), the inductive voltage-dividing impedance component (1502) and the DC power control device (1503), to regulation the DC power control device (1203) over the following functions, including:

if the current detected by the current detector (1505) is lower than a predetermined value, the DC power control device (1503) is operated to perform shunt regulation for increasing the current passing through the main load (1501); or if the current detected by the current detector (1505) is higher than a predetermined value, the DC power control device (1503) is operated to perform shunt regulation for decreasing the current passing through the main load (1501).

31. The current regulator drive circuit shunting current by voltage-dividing load according to claim 1, wherein the circuit is applied to the main load driven by DC power source, and the impedance component of inductive series resistance serving as a voltage-dividing component and the DC power control device (1603) being further connected with shield diode, the main components including:

current equalizing impedance (1600): related to a current equalizing impedance (1600) connected with the main load (1601) in series, which is constituted by the inductor or coil with inductive impedance, or constituted by the impedance connecting the capacitor and the inductor or coil in parallel for being in parallel resonance with the ripple frequency of the passing current, arranged to reduce the ripple value of the current passing through the current equalizing impedance (1600); the current equalizing impedance (1600) is optionally installed upon demanded;

main load (1601): related to a main load driven by DC or pulsating DC power, which is constituted by one or more than one kind of main loads, including electrical energy to luminous energy main load, electrical energy to thermal energy main load, electrical energy to mechanical energy main load, electrical energy to chemical energy main load, or electrical energy to acoustic energy main load;

voltage-dividing impedance component of inductive series resistance (1602): constituted by one or more than one of inductive impedance component (16021), that allows DC or pulsating DC power passing through, being connected with resistance (16022) in series, and serving to be connected with the main load (1601) in series and be connected in parallel with two ends defined through the shield diode (1607) being in series connected with the DC power control device (1603) with a means of consequent to the power polarity, and allowing the DC power control device (1603) to perform parallel shunt regulation to the voltage-dividing impedance component of inductive series resistance (1602);

flywheel diode (1606): constituted by diode or high-speed diode, for being connected with two ends of the voltage-dividing impedance component of inductive series resistance (1602) in parallel with a reverse polarity means; if a flywheel diode is built-in at two ends of the power of the DC power control device (1603), then the mentioned flywheel diode (1206) can be optionally installed;

shield diode (1607): constituted by diode or high-speed diode, for being connected in series with the DC power control device (1603) in the forward power polarity;

DC power control device (1603): constituted by electromechanical switch device, solid-state semiconductor-type switch device, or solid-state semiconductor-type linear variable impedance device, when DC power source is utilized to perform chopping control, the DC power control device (1603) is operated to perform shunt regulation of alternate chopping frequency, or shunt regulation of PWM (Pulse Width Modulation) of chopping conduction time ratio, or shunt regulation of PWM of alternate chopping frequency and chopping conduction time ratio at the same time; or the DC power control device (1603) is operated to perform shunt regulation of switch type turn-on or cut-off, or the linear impedance value of the DC power control device (1603) is regulated so as to operate the DC power control device (1603) to perform shunt regulation for the current passing through the voltage-dividing impedance component of inductive series resistance (1602);

wherein in the current regulator drive circuit shunting current by voltage-dividing load, control means of the DC power control device (1203) includes one or more than one of the following control means including: 1) being controlled through installation of the voltage detector (1604); 2) being controlled through installation of the current detector (1605); 3) being controlled through installation of the voltage detector (1604) and the current detector (1605); 4) being controlled through setting circuit to perform regular shunt to the voltage-dividing load; 5) being controlled through a manually-operated control interface device to perform shunt regulation to the voltage-dividing load; 6) being controlled through inputting external signals to perform shunt regulation to the voltage-dividing load.

32. The current regulator drive circuit shunting current by voltage-dividing load according to claim 31, when one or both of the voltage detector (1604) and the current detector (1605) are selected to be installed for performing shunt regulation to the DC power control device (1603), the configurations and operational functions of the voltage detector (1604) and the current detector (1605) are as follows:

voltage detector (1604): related to a voltage detector constituted by electromechanical and/or solid-state electronic components, for detecting the supply voltage, or the value of the voltage at two ends of one or both of the main load (1601) and the DC power control device (1603), or of the total load of the both connected in series, to regulate the DC power control device (1603) over the following functions, including:

if the voltage detected by the voltage detector (1604) is lower than a predetermined value, the DC power control device (1603) is operated to perform shunt regulation for increasing the current passing through the main load (1601); or if the voltage detected by the voltage detector (1604) is higher than a predetermined value, the DC power control device (1603) is operated to perform shunt regulation for decreasing the current passing through the main load (1601); and current detector (1605): related to a current detector constituted by electromechanical and/or solid-state electronic components, for detecting the value of one or more than one current passing through the main load (1601), the voltage-dividing impedance component of inductive series resistance (1602) and the DC power control device (1603), to regulation the DC power control device (1603) over the following functions, including:

if the current detected by the current detector (1605) is lower than a predetermined value, the DC power control device (1603) is operated to perform shunt regulation for increasing the current passing through the main load (1601); or if the current detected by the current detector (1605) is higher than a predetermined value, the DC power control device (1603) is operated to perform shunt regulation for decreasing the current passing through the main load (1601).

33. The current regulator drive circuit shunting current by voltage-dividing load according to claim 1, wherein the circuit is applied to the main load driven by DC power source, and the impedance component of inductive series LED serving as a voltage-dividing component and the DC power control device (1703) being further connected with shield diode, the main components including:

current equalizing impedance (1700): related to a current equalizing impedance (1700) connected with the main load (1701) in series, which is constituted by the inductor or coil with inductive impedance, or constituted by the impedance connecting the capacitor and the inductor or coil in parallel for being in parallel resonance with the ripple frequency of the passing current, arranged to reduce the ripple value of the current passing through the current equalizing impedance (1700); the current equalizing impedance (1700) is optionally installed upon demanded;

main load (1701): related to a main load driven by DC or pulsating DC power, which is constituted by one or more than one kind of main loads, including electrical energy to luminous energy main load, electrical energy to thermal energy main load, electrical energy to mechanical energy main load, electrical energy to chemical energy main load, or electrical energy to acoustic energy main load;

voltage-dividing impedance component of inductive series LED (1702): constituted by one or more than one of inductive impedance component (17021), that allows DC or pulsating DC power passing through, being connected with LED (17023) in series, and serving to be connected with the main load (1701) in series and be connected in parallel with two ends defined through the shield diode (1707) being in series connected with the DC power control device (1703) with a means of consequent to the power polarity, and allowing the DC power control device (1703) to perform parallel shunt regulation to the current passing through the voltage-dividing impedance component of inductive series LED (1702);

flywheel diode (1706): constituted by diode or high-speed diode, for being connected with two ends of the voltage-dividing impedance component of inductive series LED (1702) in parallel with a reverse polarity means; if a flywheel diode is built-in at two ends of the power of the DC power control device (1703), then the mentioned flywheel diode 1206 can be optionally installed;

shield diode (1707): constituted by diode or high-speed diode, for being connected in series with the DC power control device (1703) in the forward power polarity;

DC power control device (1703): constituted by electromechanical switch device, solid-state semiconductor-type switch device, or solid-state semiconductor-type linear variable impedance device, when DC power source is utilized to perform chopping control, the DC power control device (1703) is operated to perform shunt regulation of alternate chopping frequency, or shunt regulation of PWM (Pulse Width Modulation) of chopping conduction time ratio, or shunt regulation of PWM of alternate chopping frequency and chopping conduction time ratio at the same time; or the DC power control device (1703) is operated to perform shunt regulation of switch type turn-on or cut-off, or the linear impedance value of the DC power control device (1703) is regulated so as to operate the DC power control device (1703) to perform shunt regulation for the current passing through the voltage-dividing impedance component of inductive series LED (1702);

wherein in the current regulator drive circuit shunting current by voltage-dividing load, control means of the DC power control device (1703) includes one or more than one of the following control means including: 1) being controlled through installation of the voltage detector (1704); 2) being controlled through installation of the current detector (1705); 3) being controlled through installation of the voltage detector (1704) and the current detector (1705); 4) being controlled through setting circuit to perform regular shunt to the voltage-dividing load; 5) being controlled through a manually-operated control interface device to perform shunt regulation to the voltage-dividing load; 6) being controlled through inputting external signals to perform shunt regulation to the voltage-dividing load.

34. The current regulator drive circuit shunting current by voltage-dividing load according to claim 33, when one or both of the DC voltage detector (1704) and the current detector (1705) are selected to be installed for performing shunt regulation to the DC power control device (1703), the configurations and operational functions of the voltage detector (1704) and the current detector (1705) are as follows:

voltage detector (1704): related to a voltage detector constituted by electromechanical and/or solid-state electronic components, for detecting the supply voltage, or the value of the voltage at two ends of one or both of the main load (1701) and the DC power control device (1703), or of the total load of the both connected in series, to regulate the DC power control device (1703) over the following functions, including:

if the voltage detected by the voltage detector (1704) is lower than a predetermined value, the DC power control device (1703) is operated to perform shunt regulation for increasing the current passing through the main load (1701); or if the voltage detected by the voltage detector (1704) is higher than a predetermined value, the DC power control device (1703) is operated to perform shunt regulation for decreasing the current passing through the main load (1701); and current detector (1705): related to a current detector constituted by electromechanical and/or solid-state electronic components, for detecting the value of one or more than one current passing through the main load (1701), the voltage-dividing impedance component of inductive series LED (1702) and the DC power control device (1703), to regulation the DC power control device (1703) over the following functions, including:

if the current detected by the current detector (1705) is lower than a predetermined value, the DC power control device (1703) is operated to perform shunt regulation for increasing the current passing through the main load (1701); or if the current detected by the current detector (1705) is higher than a predetermined value, the DC power control device (1703) is operated to perform shunt regulation for decreasing the current passing through the main load (1701).

35. The current regulator drive circuit shunting current by voltage-dividing load according to claim 1, wherein the circuit is applied to the main load driven by DC power source, and the impedance component of inductive series resistance and series LED serving as a voltage-dividing component and the DC power control device (1803) being further connected with the shield diode, the main components including:

current equalizing impedance (1800): related to a current equalizing impedance (1800) connected with the main load (1801) in series, which is constituted by the inductor or coil with inductive impedance, or constituted by the impedance connecting the capacitor and the inductor or coil in parallel for being in parallel resonance with the ripple frequency of the passing current, arranged to reduce the ripple value of the current passing through the current equalizing impedance (1800); the current equalizing impedance (1800) is optionally installed upon demanded;

main load (1801): related to a main load driven by DC, or pulsating DC power, which is constituted by one or more than one kind of main loads, including electrical energy to luminous energy main load, electrical energy to thermal energy main load, electrical energy to mechanical energy main load, electrical energy to chemical energy main load, or electrical energy to acoustic energy main load;

voltage-dividing impedance component of inductive series resistance and series LED (1802): constituted by one or more than one of inductive impedance component (18021), that allows DC or pulsating DC power passing through, being connected with resistance (18022) in series then connected with LED (18023) in series, and serving to be connected with the main load (1801) in series and be connected in parallel with two ends defined through the shield diode (1807) being in series connected with the DC power control device (1803) with a means of consequent to the power polarity, and allowing the DC power control device (1803) to perform parallel shunt regulation to the current passing through the voltage-dividing impedance component of inductive series resistance and series LED (1802);

flywheel diode (1806): constituted by diode or high-speed diode, for being connected with two ends of the voltage-dividing impedance component of inductive series resistance and series LED (1802) in parallel with a reverse polarity means; if a flywheel diode is built-in at two ends of the power of the DC power control device (1803), then the mentioned flywheel diode (1806) can be optionally installed;

shield diode (1807): constituted by diode or high-speed diode, for being connected in series with the DC power control device (1803) in the forward power polarity;

DC power control device (1803): constituted by electromechanical switch device, solid-state semiconductor-type switch device, or solid-state semiconductor-type linear variable impedance device, when DC power source is utilized to perform chopping control, the DC power control device (1803) is operated to perform shunt regulation of alternate chopping frequency, or shunt regulation of PWM (Pulse Width Modulation) of chopping conduction time ratio, or shunt regulation of PWM of alternate chopping frequency and chopping conduction time ratio at the same time; or the DC power control device (1803) is operated to perform shunt regulation of switch type turn-on or cut-off, or the linear impedance value of the DC power control device (1803) is regulated so as to operate the DC power control device (1803) to perform shunt regulation for the current passing through the voltage-dividing impedance component of inductive series resistance and series LED (1802);

wherein in the current regulator drive circuit shunting current by voltage-dividing load, control means of the DC power control device (1803) includes one or more than one of the following control means including: 1) being controlled through installation of the voltage detector (1804); 2) being controlled through installation of the current detector (1805); 3) being controlled through installation of the voltage detector (1804) and the current detector (1805); 4) being controlled through setting circuit to perform regular shunt to the voltage-dividing load; 5) being controlled through a manually-operated control interface device to perform shunt regulation to the voltage-dividing load; 6) being controlled through inputting external signals to perform shunt regulation to the voltage-dividing load.

36. The current regulator drive circuit shunting current by voltage-dividing load according to claim 35, when one or both of the voltage detector (1804) and the current detector (1805) are selected to be installed for performing shunt regulation to the DC power control device (1803), the configurations and operational functions of the voltage detector (1804) and the current detector (1805) are as follows:

voltage detector (1804): related to a voltage detector constituted by electromechanical and/or solid-state electronic components, for detecting the supply voltage, or the value of the voltage at two ends of one or both of the main load (1801) and the DC power control device (1803), or of the total load of the both connected in series, to regulate the DC power control device (1803) over the following functions, including:

if the voltage detected by the voltage detector (1804) is lower than a predetermined value, the DC power control device (1803) is operated to perform shunt regulation for increasing the current passing through the main load (1801); or if the voltage detected by the voltage detector (1804) is higher than a predetermined value, the DC power control device (1803) is operated to perform shunt regulation for decreasing the current passing through the main load (1801); and current detector (1805): related to a current detector constituted by electromechanical and/or solid-state electronic components, for detecting the value of one or more than one current passing through the main load (1801), the voltage-dividing impedance component of inductive series resistance and series LED (1802) and the DC power control device (1803), to regulation the DC power control device (1803) over the following functions, including:

if the current detected by the current detector (1805) is lower than a predetermined value, the DC power control device (1803) is operated to perform shunt regulation for increasing the current passing through the main load (1801); or if the current detected by the current detector (1805) is higher than a predetermined value, the DC power control device (1803) is operated to perform shunt regulation for decreasing the current passing through the main load (1801).

37. The current regulator drive circuit shunting current by voltage-dividing load according to claim 1, wherein the circuit is applied to the main load driven by DC power source, and the inductive impedance component serving as a voltage-dividing component and being connected with the shield diode in series, the main components including:

current equalizing impedance (1900): related to a current equalizing impedance (1900) connected with the main load (1901) in series, which is constituted by the inductor or coil with inductive impedance, or constituted by the impedance connecting the capacitor and the inductor or coil in parallel for being in parallel resonance with the ripple frequency of the passing current, arranged to reduce the ripple value of the current passing through the current equalizing impedance (1900); the current equalizing impedance (1900) is optionally installed upon demanded;

main load (1901): related to a main load driven by DC or pulsating DC power, which is constituted by one or more than one kind of main loads, including electrical energy to luminous energy main load, electrical energy to thermal energy main load, electrical energy to mechanical energy main load, electrical energy to chemical energy main load, or electrical energy to acoustic energy main load;

inductive voltage-dividing impedance component (1902): constituted by one or more than one of inductive impedance component allowing DC or pulsating DC power passing through, and serving to be in series connected with the shield diode (1907) and the main load (1901) with a means of consequent to the power polarity, two ends thereof defined through being in series connected with the shield diode (1907) are connected with the DC power control device (1903) in series, and allowing the DC power control device (1903) to perform parallel shunt regulation to the current passing through inductive voltage-dividing impedance component (1902);

flywheel diode (1906): constituted by diode or high-speed diode, with a reverse polarity means for being in parallel connected with two ends defined through the Inductive voltage-dividing impedance component (1902) being in series connected with the shield diode (1907);

shield diode (1907): constituted by diode or high-speed diode, for being connected in series with the inductive voltage-dividing impedance component (1902) in the forward power polarity;

DC power control device (1903): constituted by electromechanical switch device, solid-state semiconductor-type switch device, or solid-state semiconductor-type linear variable impedance device, when DC power source is utilized to perform chopping control, the DC power control device (1903) is operated to perform shunt regulation of alternate chopping frequency, or shunt regulation of PWM (Pulse Width Modulation) of chopping conduction time ratio, or shunt regulation of PWM of alternate chopping frequency and chopping conduction time ratio at the same time; or the DC power control device (1903) is operated to perform shunt regulation of switch type turn-on or cut-off, or the linear impedance value of the DC power control device (1903) is regulated so as to operate the DC power control device (1903) to perform shunt regulation for the current passing through the inductive voltage-dividing impedance component (1902);

wherein in the current regulator drive circuit shunting current by voltage-dividing load, control means of the DC power control device (1903) includes one or more than one of the following control means including: 1) being controlled through installation of the voltage detector (1904); 2) being controlled through installation of the current detector (1905); 3) being controlled through installation of the voltage detector (1904) and the current detector (1905); 4) being controlled through setting circuit to perform regular shunt to the voltage-dividing load; 5) being controlled through a manually-operated control interface device to perform shunt regulation to the voltage-dividing load; 6) being controlled through inputting external signals to perform shunt regulation to the voltage-dividing load.

38. The current regulator drive circuit shunting current by voltage-dividing load according to claim 37, when one or both of the voltage detector (1904) and the current detector (1905) are selected to be installed for performing shunt regulation to the DC power control device (1903), the configurations and operational functions of the voltage detector (1904) and the current detector (1905) are as follows:

voltage detector (1904): related to a voltage detector constituted by electromechanical and/or solid-state electronic components, for detecting the supply voltage, or the value of the voltage at two ends of one or both of the main load (1901) and the DC power control device (1903), or of the total load of the both connected in series, to regulate the DC power control device (1903) over the following functions, including:

if the voltage detected by the voltage detector (1904) is lower than a predetermined value, the DC power control device (1903) is operated to perform shunt regulation for increasing the current passing through the main load (1901); or if the voltage detected by the voltage detector (1904) is higher than a predetermined value, the DC power control device (1903) is operated to perform shunt regulation for decreasing the current passing through the main load (1901); and current detector (1905): related to a current detector constituted by electromechanical and/or solid-state electronic components, for detecting the value of one or more than one current passing through one or more than one of the DC main load (1901), the inductive voltage-dividing impedance component (1902) and the DC power control device (1903), to regulation the DC power control device (1903) over the following functions, including:

if the current detected by the current detector (1905) is lower than a predetermined value, the DC power control device (1903) is operated to perform shunt regulation for increasing the current passing through the main load (1901); or if the current detected by the current detector (1905) is higher than a predetermined value, the DC power control device (1903) is operated to perform shunt regulation for decreasing the current passing through the main load (1901).

39. The current regulator drive circuit shunting current by voltage-dividing load according to claim 1, wherein the circuit is applied to the main load driven by DC power source, and the impedance component of inductive series resistance serving as a voltage-dividing component and being connected with the shield diode in series, the main components including:

current equalizing impedance (2000): related to a current equalizing impedance (2000) connected with the main load (2001) in series, which is constituted by the inductor or coil with inductive impedance, or constituted by the impedance connecting the capacitor and the inductor or coil in parallel for being in parallel resonance with the ripple frequency of the passing current, arranged to reduce the ripple value of the current passing through the current equalizing impedance (2000); the current equalizing impedance (2000) is optionally installed upon demanded;

main load (2001): related to a main load driven by DC or pulsating DC power, which is constituted by one or more than one kind of main loads, including electrical energy to luminous energy main load, electrical energy to thermal energy main load, electrical energy to mechanical energy main load, electrical energy to chemical energy main load, or electrical energy to acoustic energy main load;

voltage-dividing impedance component of inductive series resistance (2002): constituted by one or more than one of inductive impedance component (20021), that allows DC or pulsating DC power passing through, being connected with resistance (20022) in series, and serving to be in series connected with the shield diode (2007) and the main load (2001) with a means of consequent to the power polarity, two ends thereof defined through being in series connected with the shield diode (2007) are connected with the DC power control device (2003) in parallel, and allowing the DC power control device (2003) to perform parallel shunt regulation to the current passing through the voltage-dividing impedance component of inductive series resistance (2002);

flywheel diode (2006): constituted by diode or high-speed diode, with a reverse polarity means for being in parallel connected with two ends defined through the voltage-dividing impedance component of inductive series resistance (2002) being in series connected with the shield diode (2007);

shield diode (2007): constituted by diode or high-speed diode, for being connected in series with the voltage-dividing impedance component of inductive series resistance (2002) in the forward power polarity;

DC power control device (2003): constituted by electromechanical switch device, solid-state semiconductor-type switch device, or solid-state semiconductor-type linear variable impedance device, when DC power source is utilized to perform chopping control, the DC power control device (2003) is operated to perform shunt regulation of alternate chopping frequency, or shunt regulation of PWM (Pulse Width Modulation) of chopping conduction time ratio, or shunt regulation of PWM of alternate chopping frequency and chopping conduction time ratio at the same time; or the DC power control device (2003) is operated to perform shunt regulation of switch type turn-on or cut-off, or the linear impedance value of the DC power control device (2003) is regulated so as to operate the DC power control device (2003) to perform shunt regulation for the current passing through the voltage-dividing impedance component of inductive series resistance (2002);

wherein in the current regulator drive circuit shunting current by voltage-dividing load, control means of the DC power control device (2003) includes one or more than one of the following control means including: 1) being controlled through installation of the voltage detector (2004); 2) being controlled through installation of the current detector (2005); 3) being controlled through installation of the voltage detector (2004) and the current detector (2005); 4) being controlled through setting circuit to perform regular shunt to the voltage-dividing load; 5) being controlled through a manually-operated control interface device to perform shunt regulation to the voltage-dividing load; 6) being controlled through inputting external signals to perform shunt regulation to the voltage-dividing load.

40. The current regulator drive circuit shunting current by voltage-dividing load according to claim 39, when one or both of the voltage detector (2004) and the current detector (2005) are selected to be installed for performing shunt regulation to the DC power control device (2003), the configurations and operational functions of the voltage detector (2004) and the current detector (2005) are as follows:

voltage detector (2004): related to a voltage detector constituted by electromechanical and/or solid-state electronic components, for detecting the supply voltage, or the value of the voltage at two ends of one or both of the main load (2001) and the DC power control device (2003), or of the total load of the both connected in series, to regulate the DC power control device (2003) over the following functions, including:

if the voltage detected by the voltage detector (2004) is lower than a predetermined value, the DC power control device (2003) is operated to perform shunt regulation for increasing the current passing through the main load (2001); or if the voltage detected by the voltage detector (2004) is higher than a predetermined value, the DC power control device (2003) is operated to perform shunt regulation for decreasing the current passing through the main load (2001); and current detector (2005): related to a current detector constituted by electromechanical and/or solid-state electronic components, for detecting the value of one or more than one current passing through the main load (2001), the voltage-dividing impedance component of inductive series resistance (2002) and the DC power control device (2003), to regulation the DC power control device (2003) over the following functions, including:

if the current detected by the current detector (2005) is lower than a predetermined value, the DC power control device (2003) is operated to perform shunt regulation for increasing the current passing through the main load (2001); or if the current detected by the current detector (2005) is higher than a predetermined value, the DC power control device (2003) is operated to perform shunt regulation for decreasing the current passing through the main load (2001).

41. The current regulator drive circuit shunting current by voltage-dividing load according to claim 1, wherein the circuit is applied to the main load driven by DC power source, and the impedance component of inductive series LED serving as a voltage-dividing component and being connected with shield diode in series, the main components including:

current equalizing impedance (2100): related to a current equalizing impedance (2100) connected with the main load (2101) in series, which is constituted by the inductor or coil with inductive impedance, or constituted by the impedance connecting the capacitor and the inductor or coil in parallel for being in parallel resonance with the ripple frequency of the passing current, arranged to reduce the ripple value of the current passing through the current equalizing impedance (2100); the current equalizing impedance (2100) is optionally installed upon demanded;

main load (2101): related to a main load driven by DC or pulsating DC power, which is constituted by one or more than one kind of main loads, including electrical energy to luminous energy main load, electrical energy to thermal energy main load, electrical energy to mechanical energy main load, electrical energy to chemical energy main load, or electrical energy to acoustic energy main load;

voltage-dividing impedance component of inductive series LED (2102): constituted by one or more than one of inductive impedance component (21021), that allows DC or pulsating DC power passing through, being connected with LED (21023) in series, and serving to be in series connected with the shield diode (2107) and the main load (2101) with a means of consequent to the power polarity, two ends thereof defined through being in series connected with the shield diode (2107) are connected with the DC power control device (2103) in parallel, and allowing the DC power control device (2103) to perform parallel shunt regulation to the current passing through the voltage-dividing impedance component of inductive series LED (2102);

flywheel diode (2106): constituted by diode or high-speed diode, with a reverse polarity means for being in parallel connected with two ends defined through the voltage-dividing impedance component of inductive series LED (2102) being in series connected with the shield diode (2107);

shield diode (2107): constituted by diode or high-speed diode, for being connected in series with the voltage-dividing impedance component of inductive series LED (2102) in the forward power polarity;

DC power control device (2103): constituted by electromechanical switch device, solid-state semiconductor-type switch device, or solid-state semiconductor-type linear variable impedance device, when DC power source is utilized to perform chopping control, the DC power control device (2103) is operated to perform shunt regulation of alternate chopping frequency, or shunt regulation of PWM (Pulse Width Modulation) of chopping conduction time ratio, or shunt regulation of PWM of alternate chopping frequency and chopping conduction time ratio at the same time; or the DC power control device (2103) is operated to perform shunt regulation of switch type turn-on or cut-off, or the linear impedance value of the DC power control device (2103) is regulated so as to operate the DC power control device (2103) to perform shunt regulation for the current passing through the voltage-dividing impedance component of inductive series LED (2102);

wherein in the current regulator drive circuit shunting current by voltage-dividing load, control means of the DC power control device (2103) includes one or more than one of the following control means including: 1) being controlled through installation of the voltage detector (2104); 2) being controlled through installation of the current detector (2105); 3) being controlled through installation of the voltage detector (2104) and the current detector (2105); 4) being controlled through setting circuit to perform regular shunt to the voltage-dividing load; 5) being controlled through a manually-operated control interface device to perform shunt regulation to the voltage-dividing load; 6) being controlled through inputting external signals to perform shunt regulation to the voltage-dividing load.

42. The current regulator drive circuit shunting current by voltage-dividing load according to claim 41, when one or both of the voltage detector (2104) and the current detector (2105) are selected to be installed for performing shunt regulation to the DC power control device (2103), the configurations and operational functions of the voltage detector (2104) and the current detector (2105) are as follows:

voltage detector (2104): related to a voltage detector constituted by electromechanical and/or solid-state electronic components, for detecting the supply voltage, or the value of the voltage at two ends of one or both of the main load (2101) and the DC power control device (2103), or of the total load of the both connected in series, to regulate the DC power control device (2103) over the following functions, including:

if the voltage detected by the voltage detector (2104) is lower than a predetermined value, the DC power control device (2103) is operated to perform shunt regulation for increasing the current passing through the main load (2101); or if the voltage detected by the voltage detector (2104) is higher than a predetermined value, the DC power control device (2103) is operated to perform shunt regulation for decreasing the current passing through the main load (2101); and current detector (2105): related to a current detector constituted by electromechanical and/or solid-state electronic components, for detecting the value of one or more than one current passing through the main load (2101), the voltage-dividing impedance component of inductive series LED (2102) and the DC power control device (2103), to regulation the DC power control device (2103) over the following functions, including:

if the current detected by the current detector (2105) is lower than a predetermined value, the DC power control device (2103) is operated to perform shunt regulation for increasing the current passing through the main load (2101); or if the current detected by the current detector (2105) is higher than a predetermined value, the DC power control device (2103) is operated to perform shunt regulation for decreasing the current passing through the main load (2101).

43. The current regulator drive circuit shunting current by voltage-dividing load according to claim 1, wherein the circuit is applied to the main load driven by DC power source, and the impedance component of inductive series resistance and series LED serving as a voltage-dividing component and being connected with the shield diode in series, the main components including:

current equalizing impedance (2200): related to a current equalizing impedance (2200) connected with the main load (2201) in series, which is constituted by the inductor or coil with inductive impedance, or constituted by the impedance connecting the capacitor and the inductor or coil in parallel for being in parallel resonance with the ripple frequency of the passing current, arranged to reduce the ripple value of the current passing through the current equalizing impedance (2200); the current equalizing impedance (2200) is optionally installed upon demanded;

main load (2201): related to a main load driven by DC or pulsating DC power, which is constituted by one or more than one kind of main loads, including electrical energy to luminous energy main load, electrical energy to thermal energy main load, electrical energy to mechanical energy main load, electrical energy to chemical energy main load, or electrical energy to acoustic energy main load;

voltage-dividing impedance component of inductive series resistance (2002): constituted by one or more than one of inductive impedance component (20021), that allows DC or pulsating DC power passing through, being connected with resistance (20022) and LED (22023) in series, and serving to be in series connected with the shield diode (2207) and the main load (2201) with a means of consequent to the power polarity, two ends thereof defined through being in series connected with the shield diode (2207) are connected with the DC power control device (2203) in parallel, and allowing the DC power control device (2203) to perform parallel shunt regulation to the current passing through the voltage-dividing impedance component of inductive series resistance and series LED (2202);

flywheel diode (2206): constituted by diode or high-speed diode, with a reverse polarity means for being in parallel connected with two ends defined through the voltage-dividing impedance component of inductive series resistance and series LED (2202) being in series connected with the shield diode (2207);

shield diode (2207): constituted by diode or high-speed diode, for being connected in series with the voltage-dividing impedance component of inductive series resistance and series LED (2202) in the forward power polarity;

DC power control device (2203): constituted by electromechanical switch device, solid-state semiconductor-type switch device, or solid-state semiconductor-type linear variable impedance device, when DC power source is utilized to perform chopping control, the DC power control device (2203) is operated to perform shunt regulation of alternate chopping frequency, or shunt regulation of PWM (Pulse Width Modulation) of chopping conduction time ratio, or shunt regulation of PWM of alternate chopping frequency and chopping conduction time ratio at the same time; or the DC power control device (2203) is operated to perform shunt regulation of switch type turn-on or cut-off, or the linear impedance value of the DC power control device (2203) is regulated so as to operate the DC power control device (2203) to perform shunt regulation for the current passing through the voltage-dividing impedance component of inductive series resistance and series LED (2202);

wherein in the current regulator drive circuit shunting current by voltage-dividing load, control means of the DC power control device (2203) includes one or more than one of the following control means including: 1) being controlled through installation of the voltage detector (2204); 2) being controlled through installation of the current detector (2205); 3) being controlled through installation of the voltage detector (2204) and the current detector (2205); 4) being controlled through setting circuit to perform regular shunt to the voltage-dividing load; 5) being controlled through a manually-operated control interface device to perform shunt regulation to the voltage-dividing load; 6) being controlled through inputting external signals to perform shunt regulation to the voltage-dividing load.

44. The current regulator drive circuit shunting current by voltage-dividing load according to claim 43, when one or both of the voltage detector (2204) and the current detector (2205) are selected to be installed for performing shunt regulation to the DC power control device (2203), the configurations and operational functions of the voltage detector (2204) and the current detector (2205) are as follows:

voltage detector (2204): related to a voltage detector constituted by electromechanical and/or solid-state electronic components, for detecting the supply voltage, or the value of the voltage at two ends of one or both of the main load (2201) and the DC power control device (2203), or of the total load of the both connected in series, to regulate the DC power control device (2203) over the following functions, including:

if the voltage detected by the voltage detector (2204) is lower than a predetermined value, the DC power control device (203) is operated to perform shunt regulation for increasing the current passing through the main load (2201); or if the voltage detected by the voltage detector (2204) is higher than a predetermined value, the DC power control device (2203) is operated to perform shunt regulation for decreasing the current passing through the main load (2201); and current detector (2205): related to a current detector constituted by electromechanical and/or solid-state electronic components, for detecting the value of one or more than one current passing through the main load (2201), the voltage-dividing impedance component of inductive series resistance and series LED (2202) and the DC power control device (2203), to regulation the DC power control device (2203) over the following functions, including:

if the current detected by the current detector (2205) is lower than a predetermined value, the DC power control device (2203) is operated to perform shunt regulation for increasing the current passing through the main load (2201); or if the current detected by the current detector (2205) is higher than a predetermined value, the DC power control device (2203) is operated to perform shunt regulation for decreasing the current passing through the main load (2201).

* * * * *